US012687417B1

(12) United States Patent
Vines et al.

(10) Patent No.: US 12,687,417 B1
(45) Date of Patent: Jul. 21, 2026

(54) SEWER CAP MONITORING SYSTEM

(71) Applicant: QuadSprout Technologies LLC,
Conway, SC (US)

(72) Inventors: Richard Vines, Conway, SC (US);
Michael Earle, Somerville, MA (US);
Michael Cronin, Dedham, MA (US);
Timothy Jager, Tinley Park, IL (US);
Alexander Krejcie, Chicago, IL (US)

(73) Assignee: QuadSprout Technologies LLC,
Conway, SC (US)

( * ) Notice: Subject to any disclaimer, the term of this
patent is extended or adjusted under 35
U.S.C. 154(b) by 0 days.

(21) Appl. No.: 19/431,765

(22) Filed: Dec. 23, 2025

Related U.S. Application Data

(63) Continuation-in-part of application No. 19/034,143,
filed on Jan. 22, 2025.

(51) Int. Cl.
*G01F 23/26* (2022.01)
*E03F 5/02* (2006.01)
(Continued)

(52) U.S. Cl.
CPC .............. *G01F 23/265* (2013.01); *E03F 5/02*
(2013.01); *G08B 3/10* (2013.01); *G08B*
*21/082* (2013.01);
(Continued)

(58) Field of Classification Search
CPC ..................................................... G01F 23/265
(Continued)

(56) References Cited

U.S. PATENT DOCUMENTS 4,122,718 A * 10/1978 Gustafson ............. G01F 23/263
73/304 C
4,315,822 A * 2/1982 Jaisinghani ............ B01D 17/08
210/DIG. 5
(Continued)

FOREIGN PATENT DOCUMENTS

CN 205975929 U 2/2017
CN 108824495 A 11/2018
(Continued)

OTHER PUBLICATIONS

Cyclone Valves LLC, Wireless D-Link Cable Alarm Extensions: 3"
DL303 & 4" DL404—Waterproof Brochure, retrieved from Internet
https://cyclonevalves.com/product/d-link-2/ on Dec. 31, 2025, 2
pages.
(Continued)

*Primary Examiner* — Travis R Hunnings
(74) *Attorney, Agent, or Firm* — Taylor Dykema PLLC;
Eric Kleinertz

(57) ABSTRACT
The present disclosure provides a fluid monitoring device
comprising a transmitter housing attached to an underside of
a cap, configured to accept a cable and comprising alignment
features that index the housing to the cap. The device
includes a printed circuit board (PCB) within the transmitter
housing, comprising a battery, microprocessor, and trans-
mitter for wireless communication with peripheral devices.
The device also comprises a linkage and sensor assembly
with a capacitive sensor, wherein the linkage tethers the
sensor assembly to the transmitter housing via the cable. The
microprocessor interprets capacitance readings from the
capacitive sensor and, upon detecting readings above a
threshold, instructs the transmitter to transmit a flood signal.

20 Claims, 27 Drawing Sheets

(51) Int. Cl.
　　*G01F 23/263*　　　(2022.01)
　　*G08B 3/10*　　　　(2006.01)
　　*G08B 21/08*　　　(2006.01)
　　*G08B 25/00*　　　(2006.01)
(52) U.S. Cl.
　　CPC ........ *G08B 25/009* (2013.01); *E03F 2201/40*
　　　　　　　　　　　　　　　　　　　　　(2013.01)
(58) Field of Classification Search
　　USPC ................................................... 340/539.16
　　See application file for complete search history.

(56)　　　　　　　References Cited

U.S. PATENT DOCUMENTS

| | | | |
|---|---|---|---|
| 4,385,986 A * | 5/1983 | Jaisinghani | B01D 17/0214 |
| | | | 210/123 |
| 4,392,128 A * | 7/1983 | Young | E03F 7/00 |
| | | | 137/557 |
| 4,961,068 A | 10/1990 | Hendricksen | |
| 6,217,752 B1 | 4/2001 | Coots | |
| 7,292,143 B2 | 11/2007 | Drake | |
| 7,342,504 B2 | 3/2008 | Crane | |
| 7,907,059 B1 | 3/2011 | Guy | |
| 8,220,484 B2 | 7/2012 | Howitt | |
| 9,123,230 B2 | 9/2015 | Rogers | |
| 9,631,356 B2 | 4/2017 | Nesbitt | |
| 9,786,152 B1 | 10/2017 | Walker | |
| 9,828,757 B2 | 11/2017 | Boren | |
| 9,920,511 B2 | 3/2018 | Goldberg | |
| 9,969,636 B2 | 5/2018 | Park | |
| 10,535,246 B2 | 1/2020 | Dunn | |
| 10,607,475 B1 | 3/2020 | Smith | |
| 10,683,968 B2 | 6/2020 | Moon | |
| 10,948,929 B1 | 3/2021 | Pierce | |
| 11,505,937 B2 | 11/2022 | Mulvaney | |
| 11,885,653 B2 | 1/2024 | Edwards | |
| 11,994,422 B2 | 5/2024 | Roy | |
| 12,031,305 B2 | 7/2024 | Pourzynal | |
| 12,092,506 B2 | 9/2024 | Lance | |
| 2007/0205906 A1 | 9/2007 | Giordano | |
| 2009/0278699 A1 | 11/2009 | Horst | |
| 2010/0294036 A1 | 11/2010 | Dunbar | |
| 2013/0314235 A1 * | 11/2013 | Rogers | E03F 7/00 |
| | | | 340/616 |
| 2017/0306608 A1 * | 10/2017 | Goldberg | G08B 21/182 |
| 2018/0051453 A1 * | 2/2018 | Merlo | E03F 5/107 |
| 2018/0275693 A1 | 9/2018 | Azulay | |
| 2019/0101427 A1 * | 4/2019 | Beger | G01F 23/0023 |
| 2021/0125486 A1 * | 4/2021 | Shabbir | G08B 21/20 |
| 2025/0188729 A1 * | 6/2025 | Gregge | G05D 7/0652 |

FOREIGN PATENT DOCUMENTS

| | | | |
|---|---|---|---|
| CN | 109246613 A | 1/2019 | |
| CN | 208834137 U | 5/2019 | |
| CN | 109839169 A | 6/2019 | |
| CN | 112196074 A | 1/2021 | |
| CN | 113689675 A | 11/2021 | |
| CN | 215670046 U | 1/2022 | |
| CN | 216246673 U | 4/2022 | |
| CN | 115182427 A | 10/2022 | |
| CN | 218861726 U | 4/2023 | |
| CN | 220167111 U | 12/2023 | |
| CN | 118166892 A | 6/2024 | |
| CN | 118686285 A | 9/2024 | |
| CN | 222295247 U | 1/2025 | |
| CN | 222575558 U | 3/2025 | |
| EP | 2470870 A1 | 7/2012 | |
| GB | 2589849 A | 6/2021 | |
| IN | 202431021452 | 4/2024 | |
| JP | 2012-240580 A | 12/2012 | |
| JP | 2011042943 A | 5/2014 | |
| JP | 2021-082919 A | 5/2021 | |
| KR | 20180008828 A | 11/2018 | |
| KR | 20220103283 A | 7/2022 | |
| KR | 20240102487 A | 7/2024 | |

OTHER PUBLICATIONS

International Search Report and Written Opinion of the International Searching Authority in relation to International Application No. PCT/US26/11599, dated May 19, 2026, 9 pages.

\* cited by examiner

100

114

126

126

116

120

120

2400

SEWER CAP MONITORING SYSTEM

CROSS-REFERENCE TO RELATED APPLICATIONS

This application is a continuation-in-part of U.S. patent application Ser. No. 19/034,143, titled SEWER CAP MONITORING SYSTEM, filed Jan. 22, 2025, which is hereby incorporated by reference in its entirety.

FIELD OF THE DISCLOSURE

The present disclosure relates to devices and systems for monitoring water levels respective to sewer cleanouts. More specifically, the present disclosure related to devices and systems for generating a flood alarm based on capacitive detection of liquid.

BACKGROUND

The present disclosure relates to a sewer cap monitoring system that is used to detect backups in sewage lines, and to then alert various parties that a sewer system is in danger of failing or causing damages within residential and commercial establishments. Oftentimes, when a sewer line experiences a blockage, structural failure, or the like, homeowners and business owners only become aware of the problem when their toilets begin to overflow, and other drainage systems back up into homes, business offices, and the like. These backups, and subsequent overflows can cause massive damage and problems.

Thus, it would be desirable to provide a sewer monitoring system that could alert appropriate parties (such as homeowners, municipalities, utility operators, service providers, etc.) that the problem exists, and, in some embodiments, could take remedial action, such as shutting off the water supply to affected areas or buildings and shutting down the sewer flow with an automatic back flow valve.

Conventional flood alert systems are often positioned external to the plumbing infrastructure, typically relying on floor-mounted sensors or other detection mechanisms that only activate after wastewater has already escaped from the drainage system and entered the living or working space. Such external systems may provide notification of a problem only after significant damage has already occurred, limiting the opportunity for preventive intervention. By contrast, a monitoring system that incorporates sensors positioned within the sewer lines themselves may detect rising water levels or blockages before overflow conditions develop. This internal monitoring approach may enable early warning notifications that provide property owners and service providers with an opportunity to address the underlying issue before flooding occurs within the home or building.

Various conventional systems have been developed to monitor septic tanks and sewage systems, and the documents set forth herein are examples of some of those efforts. The following documents are incorporated herein by reference, in their entireties:

U.S. Pat. No. 4,392,128 Sewage Back-up Alarm

A sewer back-up alarm apparatus for placement in an existing sewer line connecting a residence to a sewage collection system, the alarm apparatus including a connection element connected into a sewer line, an adaptor attached to the connection element, a cap attached in air-tight and water-proof relationship to the adaptor, the adaptor also having an O-ring for sealing the cap to the ada$_p$tor, whereby backed up sewage in the sewer pipe forcibly ejects the cap from the adaptor and permits the backed up sewage to flow onto the ground, rather than into the residence; the back-up alarm system also includes first and second electrical conductors extending into the interior of the connection element for electrically contacting backed up sewage to produce reduced electrical resistance between the first and second conductors. An alarm circuit generates an alarm signal in response to a reduced resistance to actuate an audible buzzer.

U.S. Pat. No. 4,961,068 Domestic Sewer Alarm

A pair of float operated sensors simultaneously detect inflow into the housing of an alarm assembly to actuate a buzzer and a lamp providing an early warning back-up alarm. One of the sensors remains actuated by the holding action of a magnet to continue operation signifying back-up recession. Under selective control, the buzzer is operated in by-pass relation to the sensors to indicate a low voltage condition of the battery powering the alarm assembly.

U.S. Pat. No. 6,217,752 Septic Tank Alarm System

A two stage alarm system for detecting rising levels of sludge in septic tanks, and similar sedimentary tanks. The system, to detect a first or "caution" level, and a second or "critical" level of sludge, relies upon a pair of vertically positioned weight sensitive switching mechanisms which, when triggered by the rising levels of sludge, will send appropriate signals to a remote alarm mechanism, such as at the residence, to activate a "yellow" and/or "red" light, for example, thus alerting the owner of the tank to the need for remedial action.

U.S. Pat. No. 7,292,143 Remote Sensing and Communication System

A remote sensing system and method for instrumenting the entries to manhole enclosures, in order to provide a platform and means for sensing environmental parameters within and around the enclosures and wirelessly transmitting those parameters to a distant site. The system comprises a housing with sensor for monitoring environmental parameter in the vicinity of the manhole. A microcontroller in the housing sends the parameters to a radio module, which transmits the parameters to a communication device for alerting a user that a manhole has been tampered with.

U.S. Pat. No. 7,342,504 Monitoring System and Method

A monitoring system includes one or more monitoring devices, positioned in sewer manholes, storm drains, etc., and a remote monitoring station that communicates wirelessly therewith. The monitoring device may be an integrated unit, including sensors, a two-way telemetry unit, a power supply, a processor, and supporting hardware, all located in an enclosed, waterproof housing. The monitoring device is placed within a manhole cavity to obtain depth (e.g., water level) measurements and report the measurements back to the remote monitoring station, which analyzes the data and responds to alert messages when a dangerous water level is detected. The sample and reporting rates of the device, as well as the water level threshold values, may be remotely programmable via commands transmitted from the remote monitoring station. An additional sensor may monitor the manhole cover for security purposes. Additional external monitoring instruments may be connected to the device, which relays data therefrom to the remote monitoring station.

U.S. Pat. No. 7,907,059 Sewage Pipe Alarm System and Associated Method

A sewage pipe alarm system includes a portable case seated exterior of the existing pipe. The system further includes a mechanism for detecting a blockage of fluid flow within the existing pipe by determining whether an internal water level within the existing pipe exceeds a threshold water level within the existing pipe. The system further includes a mechanism for notifying a user about the blockage of the existing pipe and a power supply source housed within the case. Such a power supply source is electrically coupled to the detecting mechanism and the notifying mechanism respectively.

U.S. Pat. No. 8,220,484 Monitoring Systems and Method for Sewer and Other Conduit Systems The system provides a monitoring system for a conduit network including one or more conduit sections joined at one or more conduit nodes, including: one or more sensor devices disposed at selected ones of the one or more conduit nodes, wherein each of the one or more sensor devices is operable for sensing a blockage or breakage in an associated conduit section, and wherein each of the one or more sensor devices is operable for communicating blockage or breakage information to a central location. Optionally, each of the sensor devices includes one of an audio sensor device and a radio frequency sensor device. Each of the sensor devices is operable for sensing the blockage or breakage in the associated conduit section by measuring an attribute of a transmitted/received signal, alone or in combination with another sensor device. Each of the sensor devices is operable for communicating the blockage or breakage information to the central location via a wireless link.

U.S. Pat. No. 9,123,230 Sewer Backup Alarm

This system will alert an occupant of a backup in the sewer or septic system and could be used in a residential or commercial structure. The system is affixed to a sewer waste line and includes a float device and a wireless alert device. When a backup occurs, the float will lift and break the magnetic connection between a magnet connected to the float and a sensor on the wireless alert device. This, in turn, will cause a chime or other alarm device to activate inside the structure, alerting the occupant of a backup. The alarm will enable the occupant to turn off or not use any items which use running water until the problem is resolved.

U.S. Pat. No. 9,631,356 Combined Sewer Overflow Warning and Prevention System

A monitoring and alert methodology ascertains conditions that may result in a combined sewer overflow (CSO) event. The method employs a semantic model of a combined sewer system that includes specification information describing the components of the combined sewer system. Sensors distributed throughout the components of the combined sewer system sense operating parameter information for those components. A monitoring and alerting (MA) information handling system (IHS) receives operating parameter information from the sensors. The MA IHS analyzes the operating parameter information received from the sensors together with the specification information in the semantic model of the combined sewer system to determine if a combined sewer overflow (CSO) event is possible. The MA IHS generates an alert to provide notification of a possible CSO event if the MA IHS determines that a CSO event is possible. In this manner, an operator may take early corrective action before a CSO event occurs.

U.S. Pat. No. 9,786,152 Septic Overflow Warning System

The septic overflow warning system includes a sensor unit that is adapted to secure itself to a tank lip of a septic tank. The sensor unit includes a float that is adapted to be moved up or down depending upon the waste level inside of the septic tank. Moreover, the float is slideably positioned on a sensor rod that is in wired connection with an alarm module. The alarm module includes a plurality of lights thereon. The plurality of lights collectively indicates the status of the volume of the septic tank via the float. The alarm module is powered via at least one solar cell.

U.S. Pat. No. 9,920,511 Methods, Systems, and Software for Providing a Blocked Sewer Alert A blocked sewer unit includes a substantially impermeable barrier having a first side exposed to the interior of a sewage network and a second side, the barrier movable in the direction of the second side in response to fluid pressure on the first side. The blocked sewer alert unit includes a transducer separated by the barrier from the sewage network, the transducer configured to generate an electrical signal when the barrier moves into the dry section. The blocked sewer alert unit includes an alarm circuit configured to convert the electrical signal into a user alert.

U.S. Pat. No. 10,607,475 Remote Monitoring System

A remote monitoring system for monitoring parameters of an underground asset, such as an electric cable system, a pipeline serving as a conduit for water, gas, oil, sewage, or the like. Parameter detectors, such as sensors that measure temperature, voltage, current, moisture, etc., are distributed along the asset to provide electrical signals that represent respective monitored parameters of the asset. An underground hub disposed in an underground vault, or manhole, through which the asset passes is coupled to the parameter detectors to acquire the signals provided by the parameter detectors. The hub includes a controller to provide data derived from the acquired signals, the data being transmitted to a remote central location by a transceiver, or modem, via LP-WAN communication. Signals from the transceiver are transmitted directly from underground.

U.S. Pat. No. 11,994,422 Method and System for Remotely Monitoring Wastewater in Manhole of Underground Drainage Network and Alerting The present disclosure relates to wastewater management that provides a method and a system for monitoring a sewer manhole from a remote location. The sewer monitoring system configured in a sewer manhole receives measured values from a level sensor and determines an accuracy error in the measured values for different conditions. The sewer monitoring system resolves the accuracy error in the measured values to obtain accurate measured values by either measuring a level of wastewater in the sewer manhole by setting a first range limit for the measured values dynamically based on an actual depth of the sewer manhole, or iteratively measuring the level of wastewater in the sewer manhole by setting unique a second range limit for the measured values dynamically. A risk associated with the sewer manhole based on the accurate measured values of the level sensor is determined, for monitoring the sewer manhole from a remote location.

U.S Patent Application No. 2007/0205906 Early Detection and Advanced Warning "Waste is backing up" Apparatus and Method A device for the early detection and advanced warning that waste is backing up in a waste pipe line comprising: a tubular body member having an open lower portion, a central hollow core extending axially there through, and a closed upper portion. The open lower portion is dimensionally sized and configured to be removably yet sealably fitted and fixed into the waste pipe line. The closed upper portion is provided with a vent. The device further comprises switching means fixedly secured on the upper closed portion and extending from the upper closed portion into the hollow core so that it is surrounded by and housed within the tubular body member; alarm issuing means installed in a remote location distanced away from the installation location of the tubular body but positioned for easy access and viewing; and communications means connecting the switching means to the alarm issuing means so that when the switching means responds to the rise of liquid waste inside the tubular body member as a result of waste backup in the waste pipe line, it closes a circuit and sends a signal along the communication means to the alarm issuing means, to generate an alarm and provide a window of opportunity to clear up the waste back up.

U.S Patent Application No. 2009/0278699 Recreational Vehicle Holding Tank Sensor Probe A wastewater holding tank sensor probe for use in determining the presence of a conductive liquid held within a wastewater holding tank in a recreational vehicle is disclosed. The probe is less sensitive to the presence of conductive residue as a result of an improved geometry and/or choice of materials that reduce the leakage currents between the probe tip and the sensor probe attachment surface, typically the wall of the tank. This reduction in sensitivity to conductive residue buildup can be measured by a geometrically determined resistivity factor between the probe tip and the mounting surface of the probe. The reduction in sensitivity can also be measured by the length of the path through the conductive residue between the probe tip and the mounting surface of the probe. A variety of geometries and material choices to reduce the sensitivity of electrical conductance based sensor probes to conductive residue are disclosed.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

According to an aspect of the present disclosure, a fluid monitoring device is provided. The fluid monitoring device comprises a transmitter housing attached to an underside of a cap, the transmitter housing configured to at least partially accept a cable. The fluid monitoring device further comprises a printed circuit board (PCB) disposed within the transmitter housing, the PCB comprising a microprocessor and a transmitter configured to wirelessly communicate with one or more peripheral devices. The fluid monitoring device may also comprise a linkage. The fluid monitoring device may additionally comprise a sensor assembly comprising a capacitive sensor, wherein the linkage mechanically tethers the sensor assembly to the transmitter housing, wherein the cable extends from the transmitter housing to the sensor assembly, wherein, upon determination that a capacitance reading is above a threshold capacitance reading, the microprocessor instructs the transmitter to transmit a flood signal.

According to other aspects of the present disclosure, the fluid monitoring device may include one or more of the following features. The cap may be a sewer cleanout cap. The transmitter housing may comprise one or more alignment features disposed on a top surface of the transmitter housing, the one or more alignment features configured to index the transmitter housing to the cap. The transmitter housing may further comprise a snap hook release and a stem extending through a vertical axis of the transmitter housing, the stem at least partially retaining the snap hook release. The transmitter housing may further comprise one or more finger nubs protruding from the transmitter housing, wherein rotation of the one or more finger nubs about a vertical axis of the transmitter housing causes the cable to retract or extend from the transmitter housing. The transmitter housing may be formed from a top body, a medial body, and a bottom body, wherein one or more retaining hooks are disposed on the medial body, wherein one or more retaining collars are disposed on the top body, the one or more retaining collars sized to reversibly engage with the one or more retaining hooks, and wherein one or more cable guides may be disposed on the medial body, the one or more cable guides configured to guide the cable from the medial body to the bottom body. The transmitter housing may further comprise an internal seal disposed around a PCB aperture and an external seal disposed around a perimeter of the PCB, wherein the PCB aperture disposed on the PCB is sized to allow passage of the linkage. The sensor assembly may further comprise a plate receptacle housing the capacitive sensor, wherein the plate receptacle forms a channel, the channel comprising an indentation disposed on a bottom of the sensor assembly, wherein the capacitive sensor comprises two capacitive plates positioned on interior walls of the channel, the channel configured to receive fluid during a flood event such that the fluid is positioned between the two capacitive plates. The sensor assembly may be formed from a top member and a bottom member, wherein an o-ring is disposed between the top member and the bottom member, the bottom member comprising a sensor slot sized to accept the capacitive sensor, a cable aperture disposed on the top member, the cable aperture forming passage for the cable from an environment to an internal cavity of the sensor assembly, an anchor index configured to index the linkage within the sensor assembly, and an anchor hook configured to engage with the linkage. The linkage may comprise a plurality of breakable units, each breakable unit comprising one or more latching features, and the snap hook release may be configured to capture the linkage, wherein the snap hook release interfaces with one of the one or more latching features via a latch on the snap hook. The linkage may be an elongated member having a t-shaped cross-section with four distinct protruding sides extending along a vertical axis of the linkage, wherein the linkage is composed of a plurality of breakable units, each breakable unit bounded by at least one latching feature, wherein the latching feature comprises a series of indents disposed at a same vertical position in each of the four protruding sides such that a cross-sectional area of the linkage decreases at the latching feature. The sensor assembly may include a sensor assembly microprocessor in informatic communication with the capacitive sensor, wherein the sensor assembly microprocessor is configured to interpret the capacitance reading from the capacitive sensor, and wherein the sensor assembly microprocessor is configured to transmit the capacitance reading to the microprocessor on the PCB of the transmitter housing.

According to another aspect of the present disclosure, a fluid detection monitoring and alarming system is provided. The fluid detection monitoring and alarming system comprises a fluid detection monitoring device comprising a transmitter housing attached to an underside of a cap, a printed circuit board disposed within the transmitter housing, the printed circuit board comprising a microprocessor and a transmitter configured to wirelessly communicate with one or more peripheral devices, a linkage, and a sensor assembly comprising a capacitive sensor, wherein the linkage tethers the sensor assembly to the transmitter housing, wherein, upon determination that a capacitance reading is above a threshold capacitance reading, the microprocessor instructs the transmitter to transmit a flood signal. The fluid detection monitoring and alarming system further comprises a hub configured to receive the flood signal from the fluid detection monitoring device. The fluid detection monitoring and alarming system also comprises a client device communicatively coupled to the hub via a network, the client device configured to receive notifications associated with the flood signal from the fluid detection monitoring device.

According to other aspects of the present disclosure, the fluid detection monitoring and alarming system may include one or more of the following features. The cap may be a sewer cleanout cap. The hub may comprise an alarm configured to provide local alerting functionality in accordance with the flood signal, wherein the alarm comprises sound outputs that initiate when the flood signal is detected by the fluid detection monitoring device. The hub may comprise a processor configured to execute instructions to interpret signals received from the fluid detection monitoring device and determine appropriate responses, a receiver configured to receive wireless signals from the fluid detection monitoring device, and a transmitter configured to relay information to the network. The hub may further comprise a cellular component enabling the hub to communicate over cellular network protocols, wherein a Wi-Fi communication protocol serves as a default communication method. The cellular network protocol capability may automatically initiate during periods of downed electricity or Wi-Fi outages, and the hub may further comprise a backup battery operatively connected to the processor, receiver, and transmitter, enabling the system to maintain functionality during periods of power outage. The fluid detection monitoring and alarming system may further comprise a server communicatively coupled to the network, wherein the server is configured to receive data from the hub, wherein the server is a server hosted by one of a municipality, a plumbing provider, or a utility company. The system may further comprise a valve communicatively coupled to the hub, wherein, in response to the flood signal, a control signal is transmitted to the valve, thereby actuating the valve to close.

BRIEF DESCRIPTION OF THE DRAWINGS

These and other features, aspects, and advantages of the present disclosure will become better understood with regard to the following description, appended claims, and accompanying drawings where:

DETAILED DESCRIPTION

Figure 1:
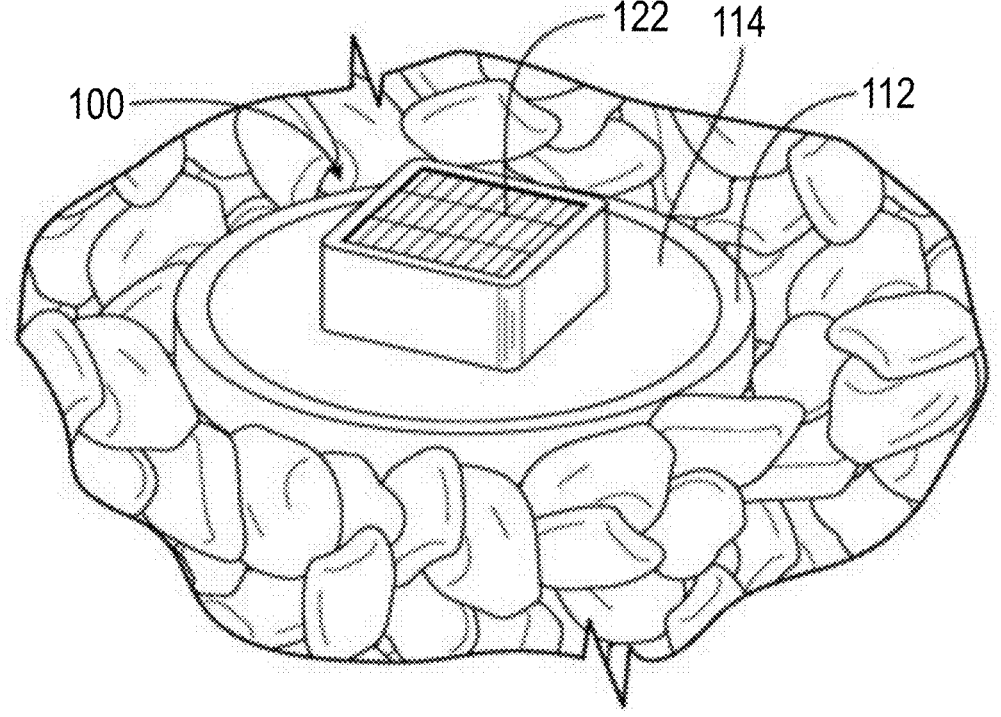
FIG. 1 is a perspective view of one embodiment of a sewer cap monitoring system illustrating a sewer cap removably affixed to a sewer line clean-out access port, wherein the sewer cap includes a solar panel disposed on an upper portion thereof.

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

It is noted that the description herein is not intended as an extensive overview, and as such, concepts may be simplified in the interests of clarity and brevity.

Aspects of the present disclosure may relate to a sewer cap monitoring system (also referred to as the "system") 100. In a first embodiment, the sewer cap monitoring system 100, as shown in FIGS. 1-7 may automatically determine when a sewer line 128 is experiencing a backup or structural failure. Said structural failures may lead to toilet overflow or wastewater backing up into sink drains, bathtub drains, shower drains, and the like.

Most modern buildings include a sewer system having a sewer line clean-out 112 that is an essential component of a house's sewer line 128. For instance, the sewer line clean-out 112 provides access for removing obstructions in a main drain pipe. It may serve as a point of entry into the septic system to address any blockages or clogs that may occur over time.

There are different types of clean-outs 112 commonly used in residential plumbing systems, including capped clean-outs and rodding ports. Capped clean-outs have a removable cap 114 providing direct access to the main drain sewer line 128 when removed. Rodding ports, on the other hand, are smaller openings with threaded caps specifically designed for inserting a plumbing snake or rod to clear blockages. It is understood that, while the instant figures provide illustrations of a sewer cap monitoring system utilized in a threaded cleanout cap, the internals and components thereof may be resized or reconfigured to fit within any suitable cap or fixture (e.g., a rodding port or other opening in fluid communication with a sewer or water line).

In one embodiment, the present disclosure includes a sewer cap monitoring system 100 comprising a sewer cap 114 positioned along the main drain line of the sewer line 128. The sewer cap 114 may include a water level sensor 116 attached on an underside thereof for determining when the level of liquid 118 in a sewer line reaches a predetermined level. In some embodiments, the sensor 116 may be integrated into a newly manufactured sewer cap. Alternatively, the sensor 116 may be attached to pre-existing sewer caps.

The water level sensor 116 may take many different forms. In one embodiment, the water level sensor 116 may include at least one probe or a pair of probes 120 extending downwardly from the sensor 116. For example, the pair of probes 120 may function as conductivity sensors. In such an example, when liquid rises to contact each probe in the pair of probes 120, a conductive path between them is created that completes an electrical circuit, which in turn activates the sensor 116.

In another example, the pair of probes 120 may comprise tuning forks. To illustrate, the pair of probes 120 may vibrate at a specific frequency, when water comes into contact with the probes 120, the frequency may change, and thus the sensor 116 may be activated. As a nonlimiting example, the water level sensor 116 may be integrated into the underside of a sewer line cap 114. Additionally, the water level sensor 116 may be a Smart AC water level sensor having a model number of SMWSG01A2.

Figure 5:
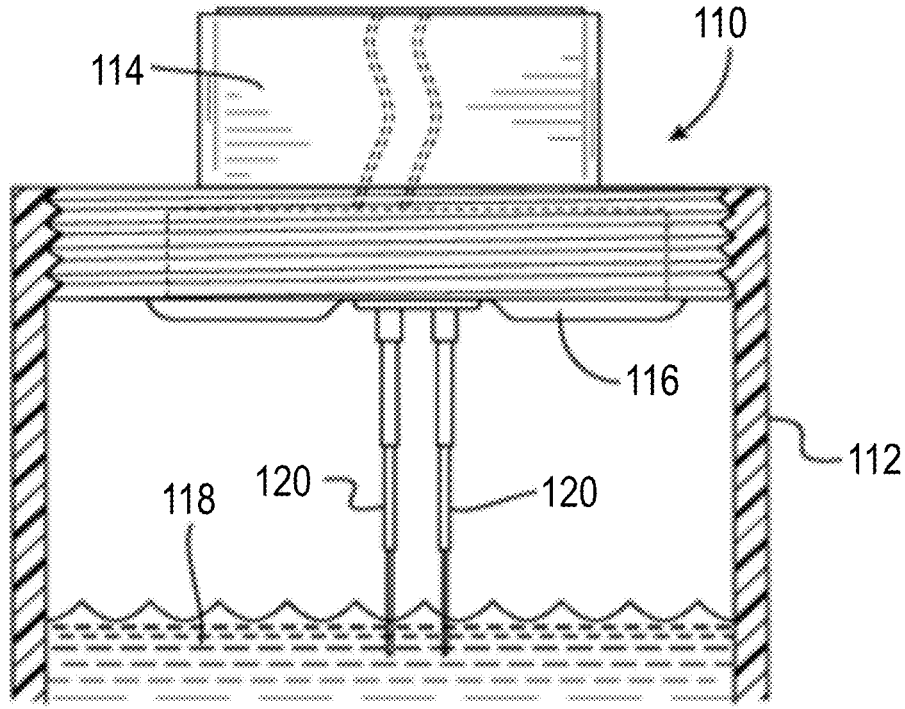
FIG. 5 is a cross-sectional view of one embodiment of a sewer line clean-out access port including a threaded sewer cap that is removably attached thereto, wherein the sewer cap includes a water level sensor attached to a bottom portion thereof, and further including a pair of telescoping probes extending downwardly from the water level sensor to determine the liquid level within a sewer line, wherein the telescoping probes may be extended and retracted as desired.
Figure 6:
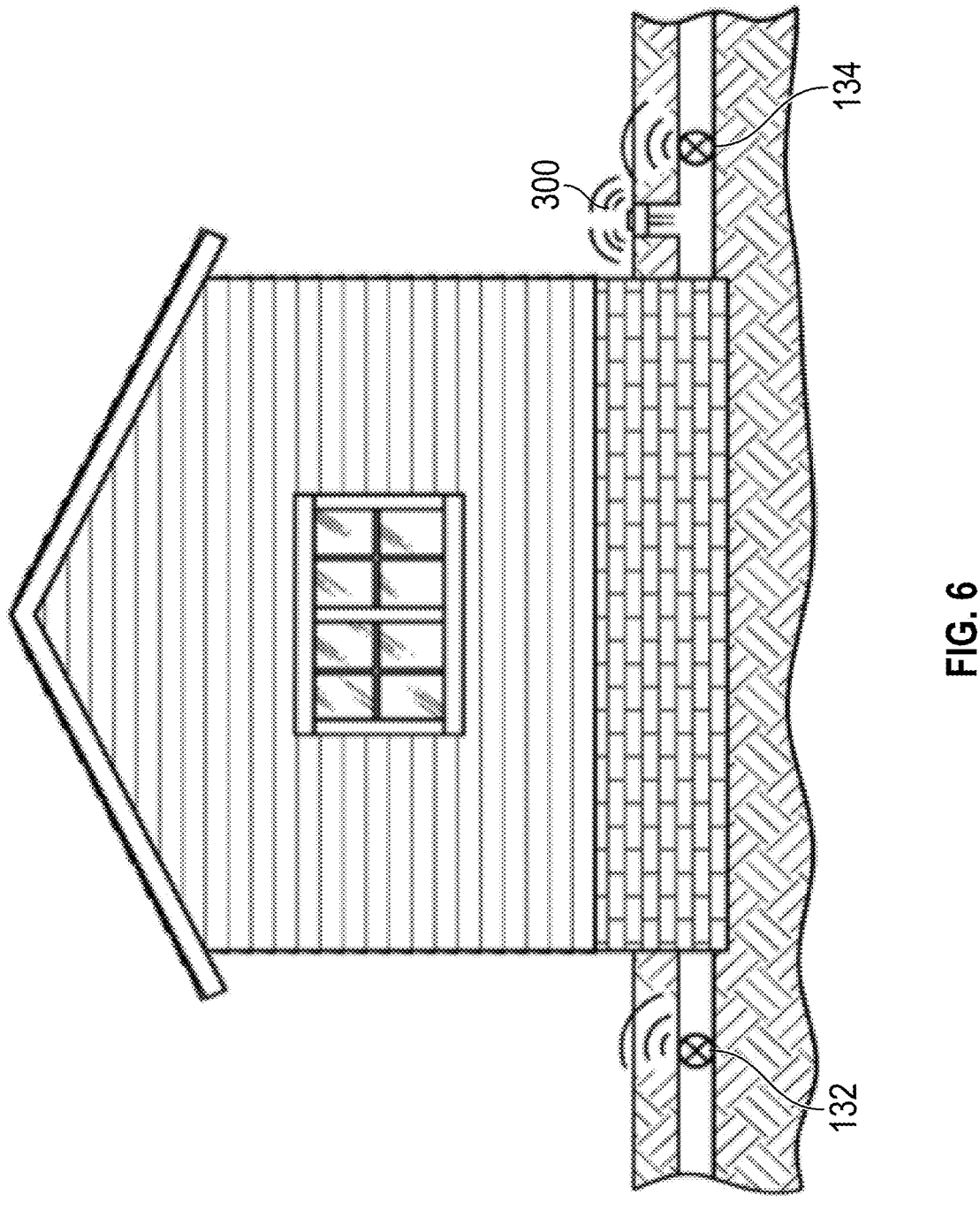
FIG. 6 is a side view of a building having a water main with a valve shown on one side thereof for bringing clean water into the building, and further showing a sewage line on an opposite side of the building, wherein the sewage line includes an access port and a sewer cap with a water level sensor, and a backflow valve downstream from the access port, so that the water level sensor in the sewer cap is operatively connected to the water main valve and the backflow valve to operate either or both valves in the event of a sewer line backup.

Furthermore, it is contemplated that the downwardly extending probes 120 may be formed into a telescoping arrangement, as shown in FIG. 5. For instance, the probes 120 may be extended or retracted to adjust the predetermined water level within the sewer line serving to activate an alarm or notification. Alternatively, the pair of probes 120 may be of a fixed length, such that said probes 120 may freely hang from the sewer cap 114.

As a nonlimiting example, the pair of probes 120 may comprise multiple nested sections able to slide into and out of one another. Such telescoping probes allows for adjustable length, enabling the probes 120 to be customized for different sewer line depths or to set varying trigger points for the water level sensor 116. In some embodiments, the telescoping probes 120 may feature a locking mechanism for securing the probes 120 at a desired length. Such a locking mechanism may take the form of friction locks, pin-and-hole arrangements, or threaded components that can be tightened to hold the probes 120 in place.

The ability for the pair of probes 120 to be telescopically adjusted may allow for easy installation and removal of the sewer cap monitoring system 100, as the probes 120 can be retracted for insertion through a sewer line clean-out access port and then extended to the appropriate length once in place.

In certain embodiments, the probes 120 may include markings or graduations to indicate their length, allowing for precise and repeatable adjustments. The probes 120 may also incorporate a spring-loaded or hydraulic mechanism to facilitate smooth extension and retraction.

The materials used for the pair of probes 120 (e.g., stainless steel, platinum, polyphenylene sulfide (PPS), polyetheretherketone (PEEK), etc.) may be selected for corrosion resistance and durability in the sewer environment. In some cases, the probes may be coated with a protective material to enhance their longevity and to maintain reliability for sensing purposes in sewer environments. It is understood that the various functionality embodiments of the probes 120 (e.g., telescoping movement, markings, and graduations, etc.) may be utilized in the linkage 304 described below.

Figure 2:
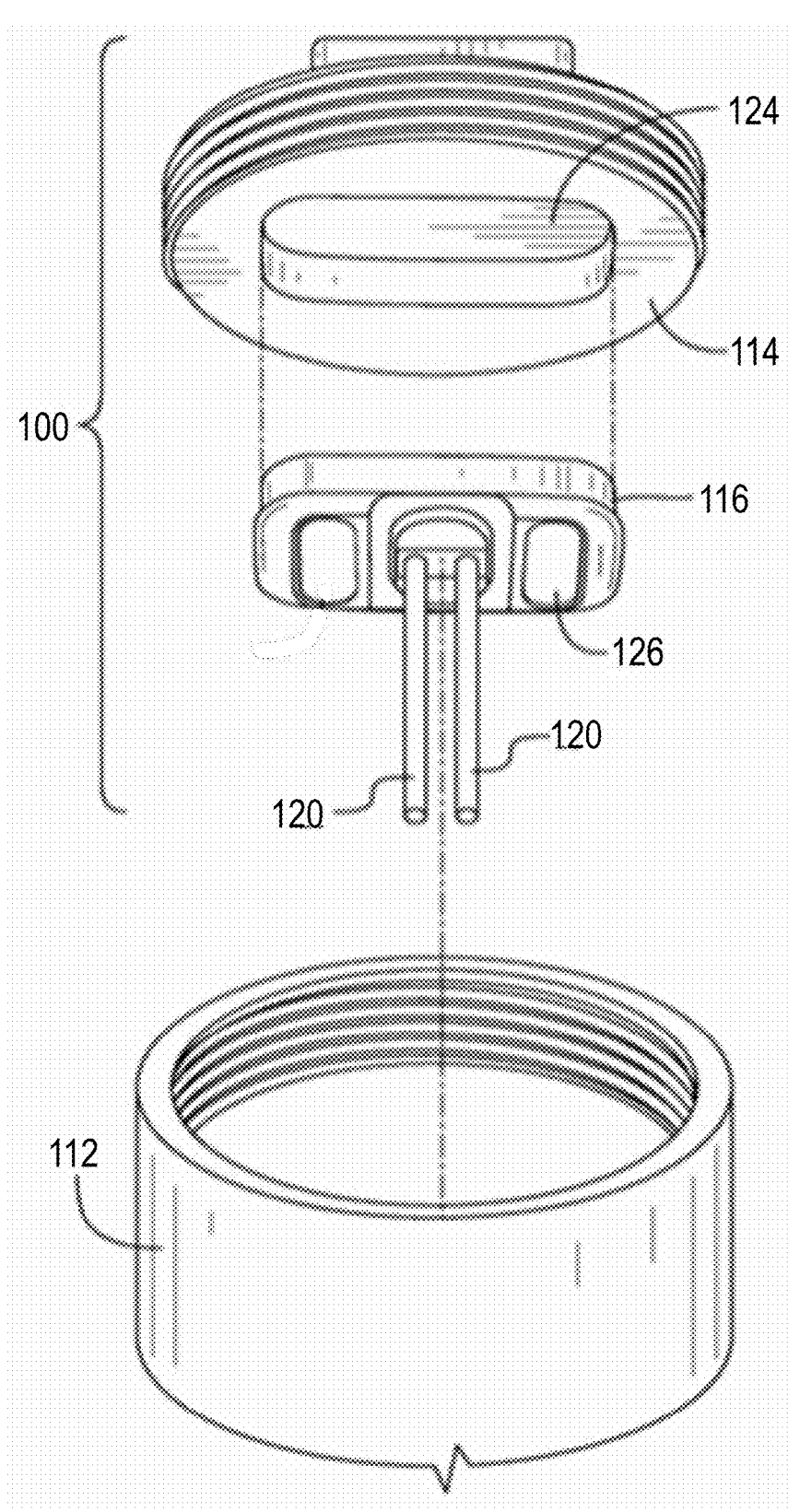
FIG. 2 is an exploded view of one embodiment of a sewer cap monitoring system illustrating a threaded sewer cap having an indentation on an underside thereof for receiving a complementary shaped water level sensor that includes a pair of probes extending downwardly therefrom, and further showing a sewer line clean-out access port having a threaded portion for receiving the complementary threaded portion of the sewer cap for removable attachment thereto.
Figure 3:
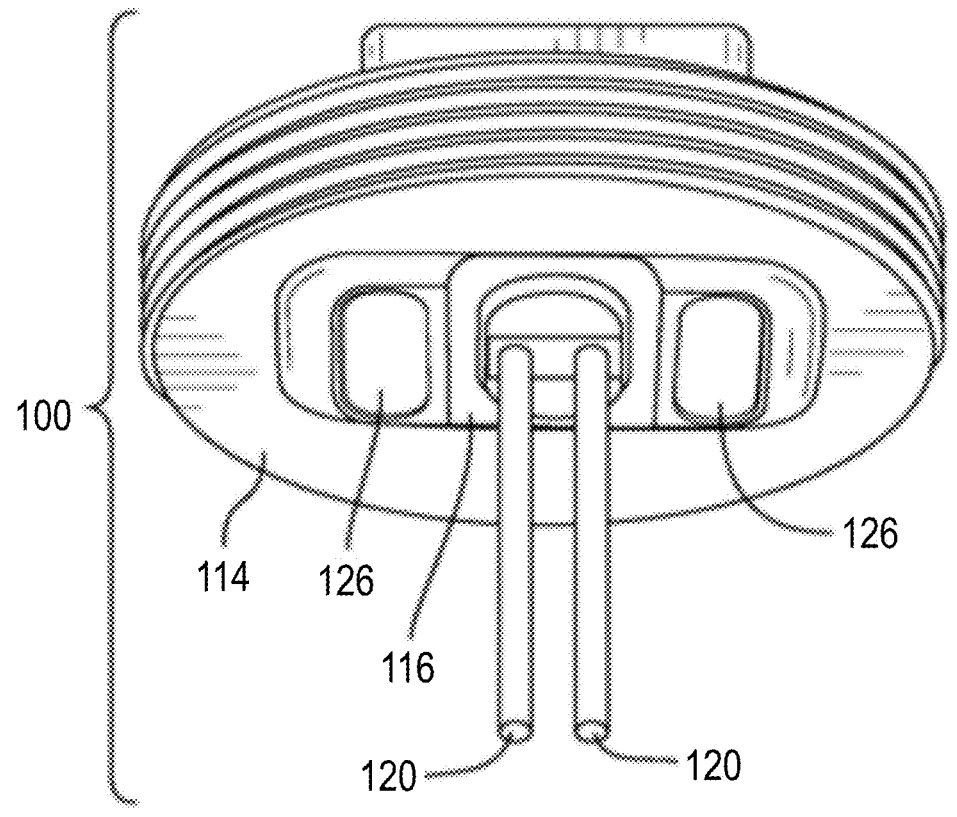
FIG. 3 is a perspective view of one embodiment of a sewer cap monitoring system, showing a threaded sewer cap with a water level sensor attached to a bottom portion thereof, and further illustrating a pair of probes extending downwardly from the water level sensor for detecting levels of liquid.
Figure 4:
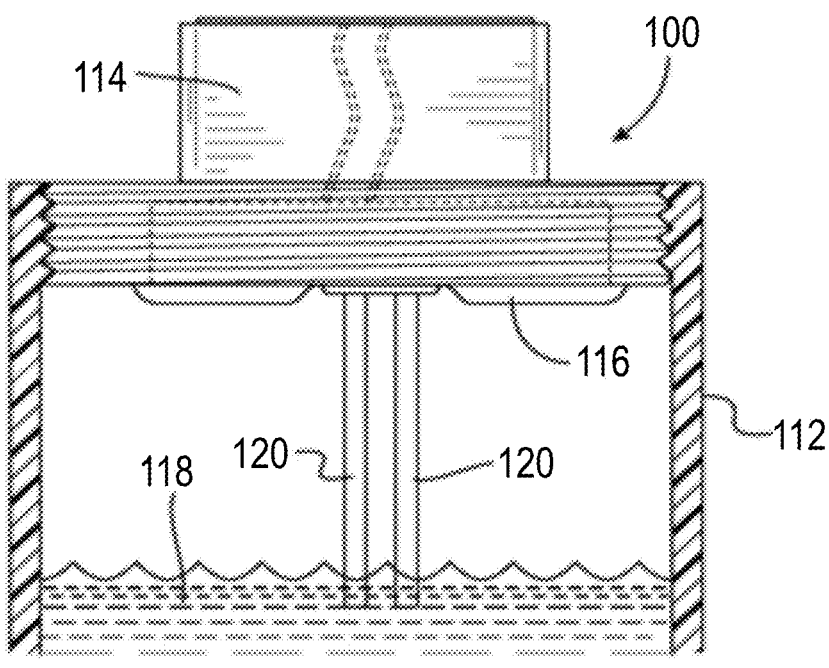
FIG. 4 is a cross-sectional view of one embodiment of a sewer line clean-out access port including a threaded sewer cap that is removably attached thereto, wherein the sewer cap includes a water level sensor attached to a bottom portion thereof, and further including a pair of probes extending downwardly from the water level sensor to determine the liquid level within a sewer line.

In a preferred embodiment, the sewer cap monitoring system 100 may further include a transmitter 126, as illustrated in FIG. 2, capable of sending a wireless signal through a wireless internet connection (or any other suitable hardwired or wireless communication platform, such as Bluetooth®, radio signal, cell signal, satellite signal, or the like) to alert any designated person or party that the sewer line may be blocked or obstructed. For instance, designated parties may include property owners, municipal water providers, etc. Notifications may also take other forms, such as an audible alarm, a flashing light, or any other appropriate mechanism for alerting a user that a potential sewer line backup may be in progress.

To illustrate, the transmitter 126 may include: Wi-Fi modules that connect to local wireless networks to transmit alerts through the internet, cellular modems capable of sending data over 3G, 4G, or 5G networks, allowing for long-range communication, Bluetooth Low Energy (BLE) transmitters for short-range communication with nearby mobile devices, Long Range (LoRa) transmitters, able to send data over long distances with low power consumption, Zigbee or Z-Wave modules for integration with smart home systems and mesh networks, satellite communication modules adapted for areas with unreliable cellular or internet coverage, and/or radio frequency (RF) transmitters operating on various bands, such as 900 MHz (e.g., 915 MHz) or 2.4 GHz.

The transmitter 126 may send alerts to mobile devices via push notifications delivered through a dedicated mobile app installed on mobile devices (e.g., smartphones, tablets, etc.), SMS text messages sent directly to designated phone numbers and/or mobile devices, email alerts sent to specified email addresses, automated voice calls to pre-programmed phone numbers and/or mobile devices, and/or via integration with smart home platforms (e.g., Amazon Alexa, Apple Home, Google Home, etc.) to trigger alerts on connected devices.

Moreover, the transmitter 126 may also communicate with cloud-based servers, which can then relay alerts through multiple channels simultaneously. Such an approach may allow for redundancy in notification methods and enable features such as alert escalation to different parties based on severity or response time. In some embodiments, the transmitter 126 may support two-way communication, allowing users to acknowledge alerts or request additional information from the monitoring system through their mobile devices. Additionally, the system 100 may also be configured to send periodic status updates or diagnostic information to ensure proper functioning and allow for preventive maintenance.

In some embodiments, the system 100 may take remedial action in response to signals received from the pair of probes 120 and/or transmitted via the transmitter 126. In one example, the system 100 may shut down an inlet valve 132 of a water line that allows water to flow into the building affected by the sewer line blockage.

For instance, the main water inlet valve 132 that allows water into the building from a water supply utility or municipality (or even a well) may include a wireless receiver to receive a signal from the water level sensor 116. Specifically, the pair of probes 120 may transmit a signal to the transmitter 126 that the water level has risen, wherein the transmitter 126 subsequently transmits a signal to close the inlet valve 132. In such an example, the inlet valve 132 may be a solenoid valve that automatically closes upon receiving a signal of a potential sewer line backup. As discussed below, the transmitter 126 and the various valves 132/134 may be in communication via an intermediary device, for example, hub 700.

In one embodiment, the water level sensor 116 and the transmitter 126 may be communicatively coupled. To illustrate, as previously mentioned, the water level sensor 116, via the pair of probes 120, may transmit a signal to the transmitter 126 when the level of liquid 118 has reached a predetermined point. Once the transmitter 126 has received the signal from the water level sensor 116, the transmitter 126 may subsequently transmit a second signal to both the inlet valve 132 and one or more user mobile devices.

Upon closing the inlet valve 132, the system 100 may transmit a signal via the transmitter 126 to the designated parties as previously mentioned. Such a signal may include information concerning which sensor 116 triggered the valve 132 closure, the time of activation, and the current status of the water supply system.

The system 100 may also provide real-time status updates to building management systems, allowing for integration with broader facility monitoring networks. Additionally, the inlet valve 132 may be configured to automatically reopen after a predetermined time period, upon a cessation in the flood signal from the sensor 116, upon a certain time after cessation in the flood signal from the sensor 116, or upon manual reset, depending on the system's 100 configuration and local safety requirements.

In an alternative embodiment, the water level sensor 116 may send out a notification to a user through an app on a smartphone as previously described. For instance, rather than automatically closing the inlet valve 132, the inlet valve 132 may be electronically and/or wirelessly closed via user initiation through the app on their mobile device.

Downstream from the system 100, the water level sensor 116 may also communicate with an electronically controlled stop valve 134 (also referred to herein as a "backflow valve") positioned along the sewer line 128. Thus, a signal or notification of a sewer line backup from the water level sensor 116 may be received by the electronically controlled stop valve 134, which then electronically closes, thereby preventing the backed-up or clogged sewer line 128 from back-flowing into the building being monitored.

In such an embodiment, the electronically controlled stop valve 134 may include a receiver for receiving wireless and/or wired communications from the transmitter 126. Upon receipt of the signal from the transmitter 126, the receiver may communicate with the stop valve 134 to close, thereby preventing sewage from the main sewer line 128 from back-flowing into the local sewer lines of the building. Thus, the system 100, upon detection of a sewer line back-up, may electronically shut down the water flowing into the building, in addition to activating an electronically controlled stop valve 134 in the sewage line downstream from the water level sensor 116. Such an embodiment may prevent sewage from the main sewer line 128 from back-flowing into the building sewer lines.

In some embodiments, the inlet valve 132 and/or the electronically controlled stop valve 134 may be integrated with the system 2300, for example as embodied in valve 1100. When the fluid detection monitoring device 300 detects a flood condition and transmits a corresponding signal, the hub 700 or server 1000 may relay a control signal to the valve 1100, thereby actuating either or both of the inlet valve 132 and the stop valve 134 to close. Such integration may enable coordinated response to sewer line backups, wherein the inlet valve 132 may shut off incoming water supply while the stop valve 134 may prevent backflow from the main sewer line 128, thereby providing comprehensive protection against flooding and sewage intrusion into the building.

The sensor 116 and transmitter 126 within the sewer line cap 114 may be powered in any suitable fashion, including being hardwired to electrical lines in a building and/or one or more batteries 130. In some embodiments, the sewer cap 114 may include a solar panel 122, as shown in FIG. 1, that may be electrically coupled to the one or more batteries 130 for providing an energy source.

In an embodiment, the solar panel 122 may be integrated into an upper surface of the sewer cap 114 to provide power to the sensor 116 and/or transmitter 126. Such a solar panel 122 may be connected to the one or more batteries 130 housed within the sewer cap 114, allowing for continuous operation during periods of low light or darkness. As a nonlimiting example, the one or more batteries 130 may be rechargeable.

In some embodiments, the solar panel 122 may utilize high-efficiency photovoltaic cells to maximize energy capture. The solar panel 122 may be coated with a transparent, protective layer to shield it from environmental factors (e.g., rain, snow, etc.) while allowing light transmission.

Furthermore, the one or more batteries 130 may comprise lithium-ion, nickel-metal hydride, or other suitable battery types designed for long-term use and multiple charge cycles.

Additionally, the one or more batteries 130 may be replaceable to extend the lifespan of the system 100. In alternative embodiments, the one or more batteries 130 may be conventional disposable batteries or rechargeable battery packs that can be periodically swapped out. A battery compartment within the system 100 may be designed for easy access and replacement without compromising the water-tight seal of the sewer cap 114. In a similar fashion to transmission of a flood signal from the transmitter 126 to a user's device or service company's device, a low battery signal may be sent to such devices, so that the responsible party can service the device.

In alternative embodiment, the system 100 may incorporate a hybrid power system, combining solar charging of the one or more batteries 130 via the solar panel 122, with the option to use external batteries as a backup or supplementary power source. Such a hybrid power system may ensure uninterrupted operation of the system 100 in various environmental conditions or locations with limited sunlight exposure.

The system 100 may also include power management features to optimize energy consumption. Said power management features may include sleep modes for the transmitter 126 during periods of inactivity, variable sampling rates for the sensor 116 based on detected water levels, and low-power alert modes to extend operational time when power levels of the one or more batteries are low.

In a further embodiment, an underside of the sewer line cap 114 may include an indentation 124. For instance, such an indentation 124 may be formed into a shape complementary to the shape of the sensor 116, as illustrated in FIG. 2. To illustrate, the shapes of the indentation 124 and sensor 116 may be complementary to ensure a tight fit between the sensor 116 and the cap 114.

As a nonlimiting example, the sensor 116 may be designed to friction fit within the indentation 124. Such a friction fit configuration may provide a secure and stable attachment without the need for additional fasteners or adhesives. To illustrate, the indentation 124 may be precisely molded or machined to match the outer dimensions and contours of the sensor 116, creating a snug fit when the sensor 116 is pressed within the indentation 124. The complementary shapes of the sensor 116 and indentation 124 may include tapered edges, ridges, or grooves to enhance the friction between the surfaces.

In some embodiments, the sensor 116 may incorporate compressible or elastic elements on its outer surface that deform slightly when inserted into the indentation 124, increasing the friction and creating a tight seal. Said compressible or elastic elements may be made of materials such as silicone, rubber, or elastomeric polymers.

The friction fit design may allow for easy installation and removal of the sensor 116 from the sewer cap 114 for maintenance or replacement purposes. In certain embodiments, the friction fit may be further enhanced by incorporating a twist-lock mechanism, where the sensor 116 is inserted into the indentation 124 and then rotated slightly to engage additional friction surfaces or locking features.

The materials chosen for both the sensor housing and the indentation surface may be selected to optimize the friction coefficient between them, ensuring a reliable hold even in the presence of moisture or temperature variations typical in sewer environments.

Alternatively, the water level sensor 116 may be attached to the cap 114 via adhesives, snap-fit mechanisms, brackets, support mechanisms, or any suitable attachment means. Similarly, the sewer line cap 114 may include additional space to provide and house the transmitter 126 and/or one or more batteries 130 that are operatively connected to the water level sensor 116. For instance, the transmitter 126 and/or one or more batteries 130 may be housed within a top portion of the indentation 124, wherein the sensor 116 occupies a lower portion of the indentation 124 and interfaces with at least one of the transmitter 126 and the one or more batteries 130.

Figure 7:
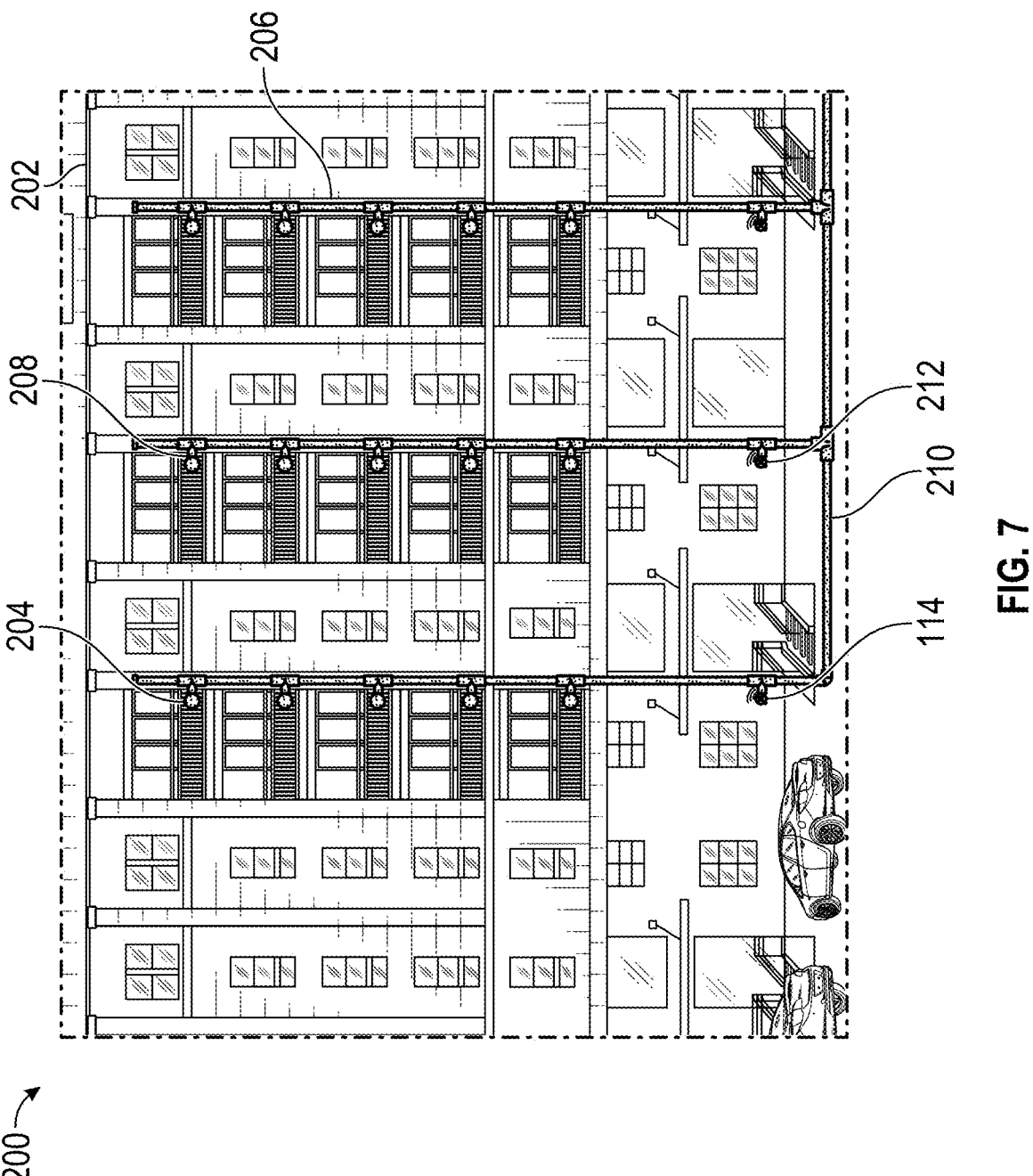
FIG. 7 illustrates a sewer cap monitoring system according to embodiments of the present disclosure.

Turning to FIG. 7, a distributed fluid monitoring system (the "system") 200 may be illustrated. The distributed fluid monitoring system 200 may include, in whole or in part, the functionality and components described herein with reference to system 100, device 300, and system 700. In some embodiments, the system 200 may utilize the vertical tee fluid monitoring devices 2400 described below and in FIGS. 24A-C.

In an embodiment, the system 200 may be adapted for utilization in a multi-story building 202. For instance, said multi-story building 202 may include apartment complexes, commercial office buildings, and the like.

The multi-story building 202 may feature a plumbing system comprised of one or more water sources 204, one or more drain lines 206, and one or more branch drain lines 208 connecting the one or more water sources 204 to the one or more drain lines 206. For instance, the one or more water sources 204 may include sinks, showers, toilets, etc. For the purposes of this description, water sources 204 may refer to those components with drains that, during use, contribute to water in the waste water system.

Furthermore, the one or more drain lines 206 may be comprised of vertical pipes that extend from the multi-story building's 202 foundation to the roof. To illustrate, the one or more drain lines may collect wastewater from the one or more branch drain lines 208 that connect to the one or more water sources 204 on each floor.

In one embodiment, the one or more drain lines 206 may incorporate multiple vertical stacks strategically positioned throughout the building 202 to optimize flow capacity and minimize pipe runs. In such an embodiment, each vertical stack comprising the one or more drain lines 206 serves a specific zone or section of the building 202, with the one or more branch drain lines 208 connecting the one or more water sources 204 from individual units to the one or more drain lines 206. Thus, the one or more drain lines 206 may serve as a conduit for wastewater to travel from the one or more water sources 204 to a municipal sewer line 210.

Moreover, the plumbing system of the building 202 may include one or more cleanout access points 212 at various locations. Specifically, the one or more cleanout access points 212 may be positioned at a base of the one or more drain lines 206 to facilitate ease of maintenance and inspection. In addition to the base of the one or more drain lines 206, the one or more cleanout access points 212 may be positioned throughout a vertical length of said drain lines 206.

The cleanout access points 212 may be strategically distributed at multiple elevations along each of the one or more drain lines 206 to provide comprehensive access for maintenance operations. These access points 212 may be positioned at regular intervals, such as every two to three floors, every floor, or at specific locations where the one or more drain lines 206 change direction or connects to the municipal sewer line 210.

The system 200 may additionally feature one or more water level sensors 116. In an embodiment, the one or more water level sensors 116 may incorporate all of the features disclosed herein as the system 100, device 300, system 700, and device 2400.

In an embodiment, the one or more water level sensors 116 may be positioned at or near each of the one or more cleanout access points 212. For example, positioning each of the one or more water level sensors at a corresponding cleanout access point may enable users of the system 200 to identify the location at which a blockage originated.

Such strategic placement of the one or more water level sensors 116 may create a comprehensive monitoring network throughout the building's 202 drainage system. When a blockage occurs, the sensors 116 may detect rising water levels in a specific drain line comprising the one or more drain lines 206, thus indicating the exact location of the obstruction. For example, if sensors 116 positioned at a first cleanout access point of a first drain line detect elevated water levels while sensors 116 at a second cleanout access point of a second drain line remain unaffected, the system 200 may detect that the blockage is located at the affected sensor's position. As another example, if sensors 116 positioned at a first cleanout access point of a first drain line at a first floor of the building 202 detect elevated water levels while sensors 116 at a second cleanout access point of the first drain line at a third floor of the building 202 remain unaffected, the system 200 may determine that the blockage is located at the first floor or second floor of the building 202.

The system 200 may employ differential monitoring, where the one or more sensors 116 communicate with each other to establish baseline flow patterns of the one or more drain lines and detect anomalies. When water levels begin to rise at one sensor location, the system 200 may compare readings from adjacent sensors to determine the direction and extent of the backup.

In some embodiments, the one or more sensors 116 may detect both the presence of water and the rate of water level change. To illustrate, a rapidly rising water level at a particular sensor location may indicate an acute blockage nearby, while gradually rising levels across multiple sensors may suggest a more distant obstruction affecting the entire plumbing system. As a nonlimiting example, the system 200 may transmit the presence of water and/or the rate of water level change from the one or more sensors 116 to a user's mobile device via the transmitter 126 as previously described.

The system 200 may also incorporate time-stamped data logging, which enables users to analyze the sequence of activations of the one or more sensors 116 to trace the progression of a backup. Such a temporal analysis may help identify whether a blockage is moving through the plumbing system of the building or is stationary at a particular location. The time-stamped data may be accessed via a user's mobile device via a dedicated mobile app.

Additionally, the one or more sensors 116 may be programmed with location-specific identifiers, enabling the system 200 to generate precise alerts specifying which floor, zone, or section of the building 202 is experiencing drainage issues. This targeted information may allow maintenance personnel to respond directly to the affected area rather than conducting building-wide inspections.

Aspects of the present disclosure may relate to a sewer cap monitoring system for a multi-story building. In an embodiment, the sewer cap monitoring system may be comprised of a plurality of drain lines. The system may be further comprised of a plurality of cleanout access points positioned at regular intervals along the plurality of drain lines. As a nonlimiting example, the regular intervals may be every floor, every other floor, every two floors, of every drain line in a multi-floor building. Alternatively, the regular intervals may be every drain line at said line's base. Furthermore, the system may also include, a plurality of water level sensors positioned at each of the plurality of cleanout access points, wherein the plurality of water level sensors may be configured to detect a water level within each of the plurality of cleanout access points. Yet further, the system may feature a plurality of transmitters communicatively coupled to each of the plurality of water level sensors, wherein the plurality of transmitters may be configured to transmit a wireless signal when the plurality of water level sensors detect that the water level has reached a predetermined level.

In an embodiment, each of the plurality of water level sensors may be comprised of at least one probe extending into a corresponding drain line of the plurality of drain lines. In a further embodiment, the at least one probe may be configured in a telescoping arrangement allowing the at least one probe to be extended and/or retracted to adjust the predetermined level. In one embodiment, the at least one probe may be comprised of a pair of probes functioning as a conductivity sensor that creates a conductive path when the water level rises to contact each probe in the pair of probes. As described below, the probes may utilize capacitive sensing technology.

Moreover, the system may be further comprised of a power source operatively connected to the plurality of water level sensors. To illustrate, the power source may be comprised of one or more rechargeable batteries and/or a solar panel operatively connected to the one or more rechargeable batteries.

Yet further, the plurality of water level sensors may be configured to detect at least one of the presence of water and the rate of water level change to determine whether a blockage is acute or gradual.

Moving on, aspects of the present disclosure may also relate to a method of monitoring a sewer system in a multi-story building. Such a method may include a first step wherein a plurality of water level sensors are positioned at a plurality of corresponding cleanout access points along a plurality of drain lines. In a second step of the method, the plurality of water level sensors may detect a water level within the plurality of drain lines. Furthermore, the method may include a third step, wherein a plurality of transmitters communicatively coupled with each of the plurality of water level sensors transmit a wireless signal when the water level reaches a predetermined level. In a fourth step of the method, a location of a blockage in one or more of the plurality of drain lines may be identified based on which of the plurality of water level sensors detected the water level reaching the predetermined level.

In one embodiment, the plurality of water level sensors may include at least one probe extending into the plurality of drain lines. Such a probe may be configured in a telescoping arrangement allowing the at least one probe to be extended and retracted to adjust the predetermined length.

As a nonlimiting example, the at least one probe is comprised of a pair of probes functioning as a conductivity sensor that creates a conductive path when the water level rises to contact each probe in the pair of probes. However, as described herein, the probe may be represented by a pair of capacitive plates, wherein the capacitance measure between such plates may be used to determine the presence of water. In such a nonlimiting example, the pair of probes may be configured in a telescoping arrangement allowing each of the probes to be extended and retracted to adjust the predetermined level.

The method may be further comprised of a fifth step, wherein differential monitoring may be employed to establish baseline flow patterns of water traveling through the plurality of drain lines. In a sixth step of the method, at least one of the presence of water and the rate of water level change may be detected to determine whether a blockage is acute or gradual. To illustrate, a rapidly rising water level may indicate an acute blockage nearby and gradually rising water levels across multiple sensors may indicate a more distant obstruction.

In another embodiment, the method may be further comprised of a seventh step, wherein time-stamped data logging is generated to analyze a sequence of activations of the plurality of water level sensors to trace progression of a backup.

Figure 8A:
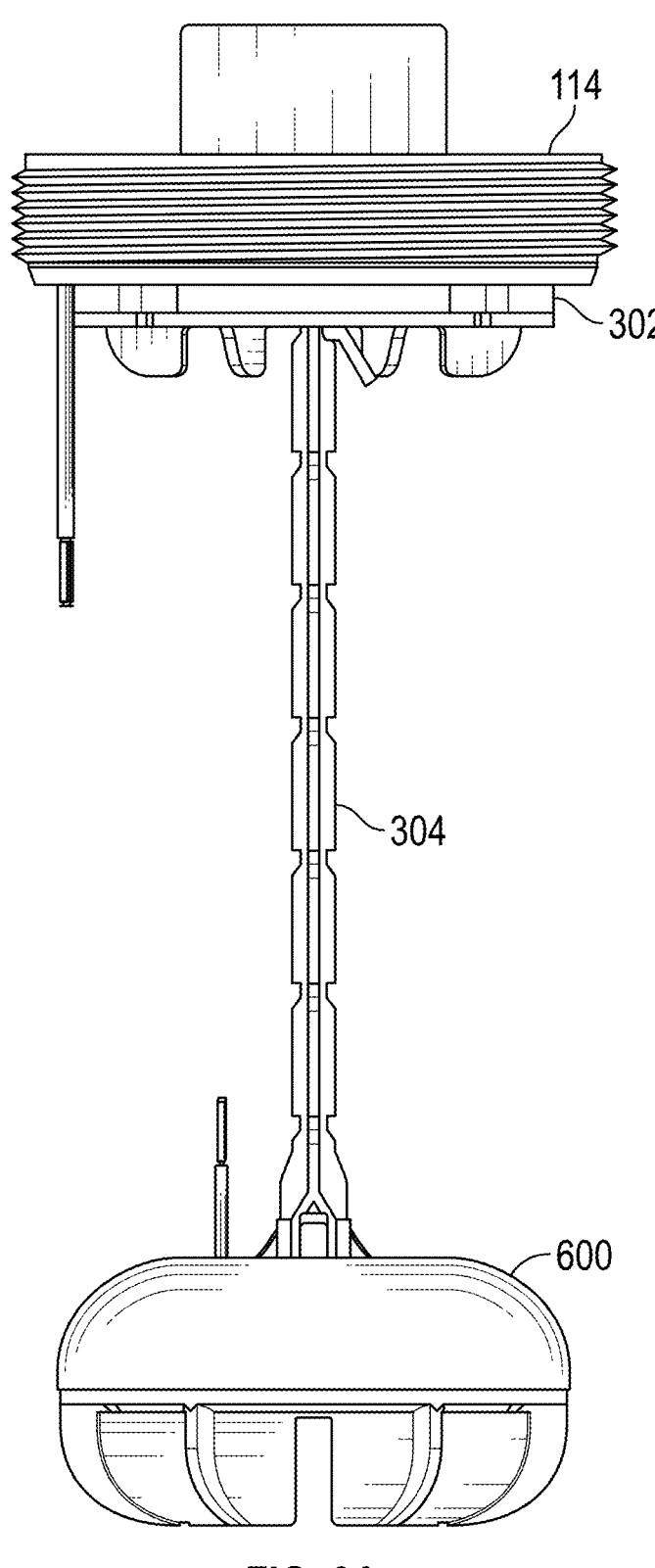
FIGS. 8A-8B illustrate an embodiment of a fluid monitoring device.
Figure 8B:
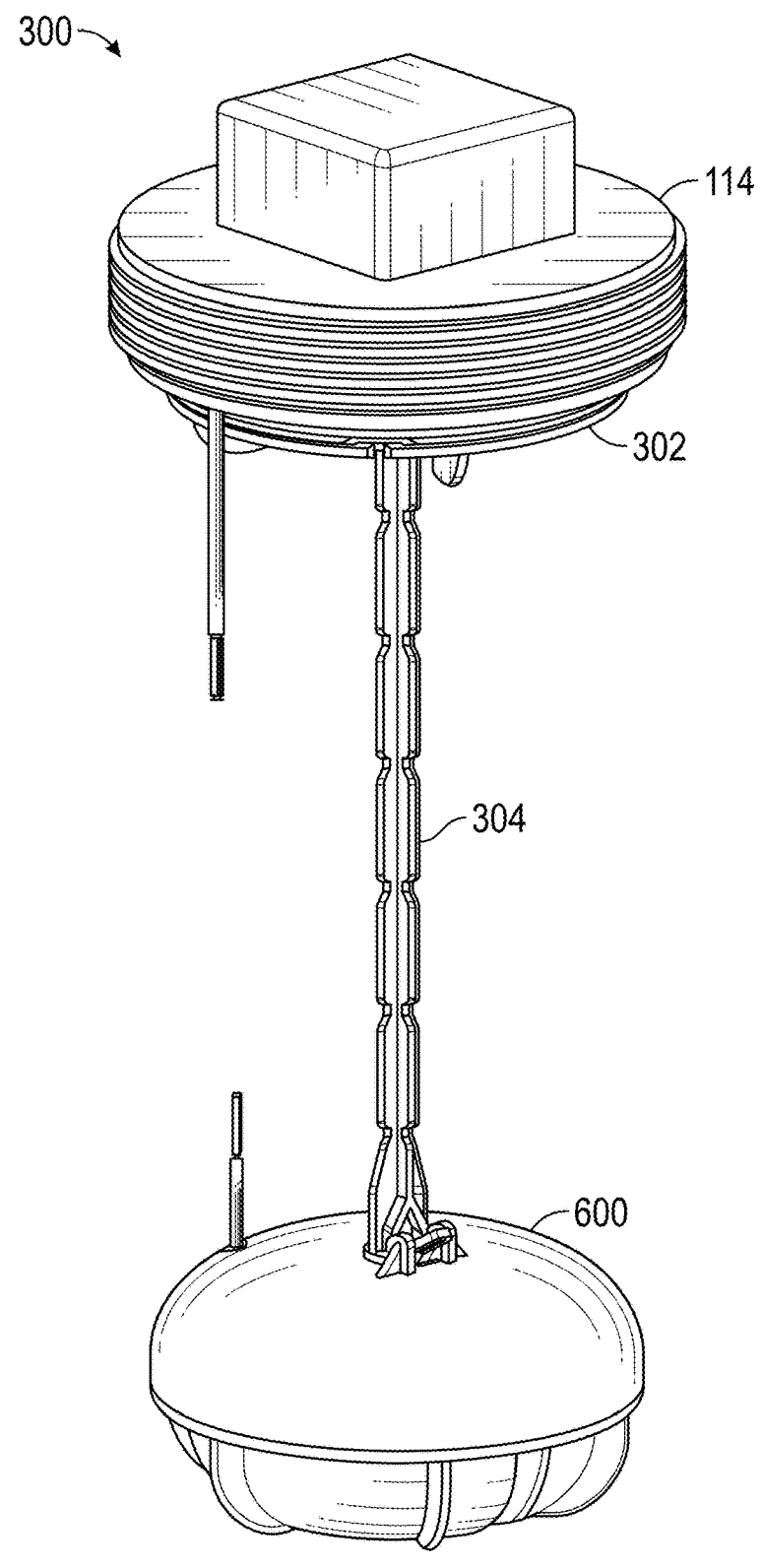
Figure 8C:
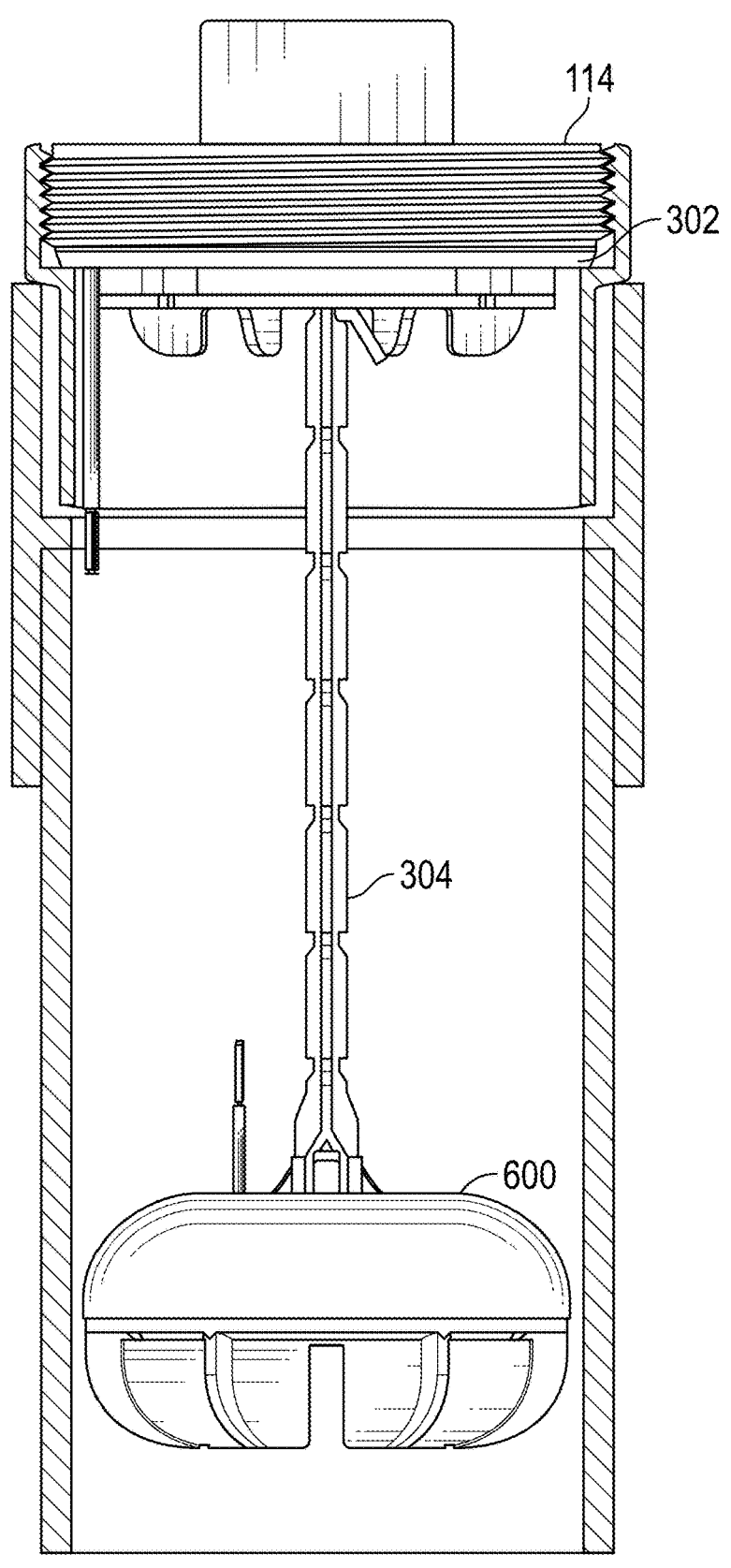
FIGS. 8C-8E illustrate an embodiment of a fluid monitoring device disposed within a sewer line clean-out.
Figure 8D:
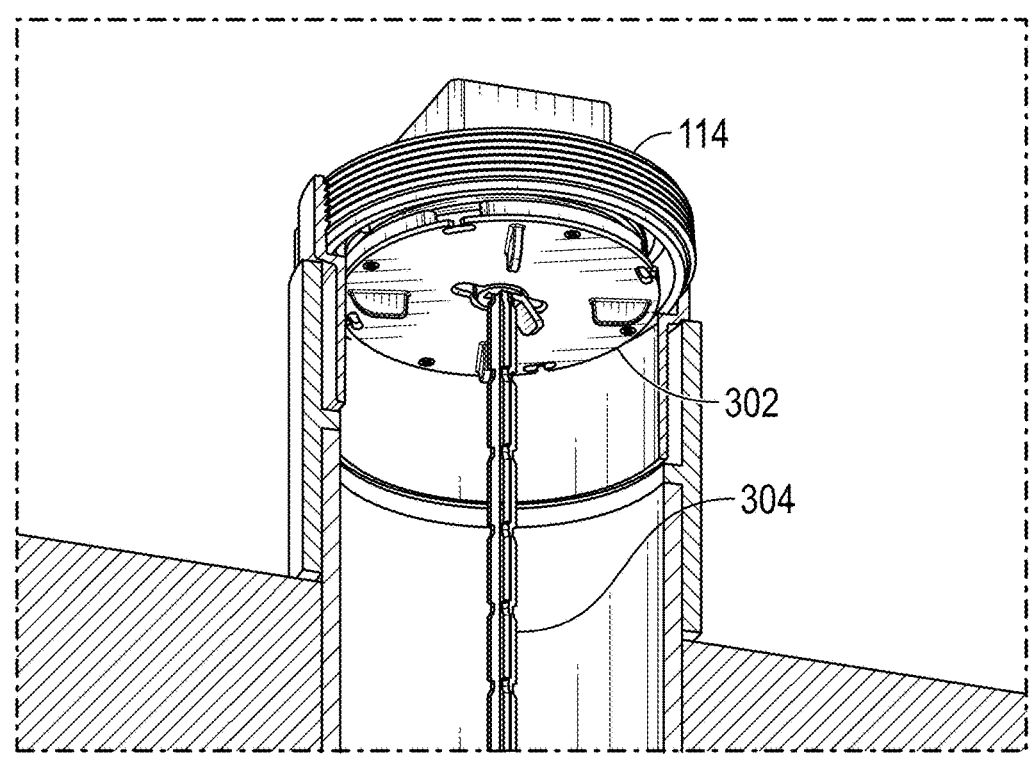
Figure 8E:
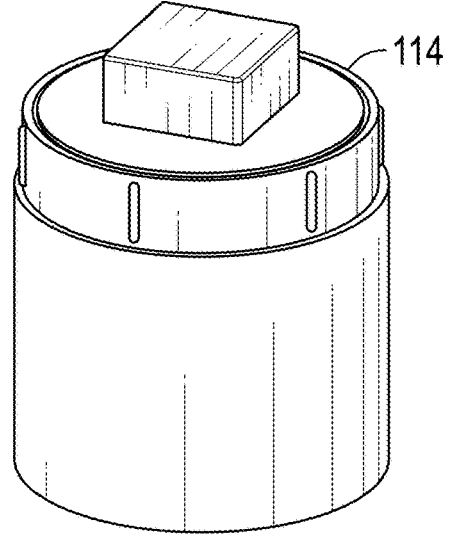

The present disclosure may provide for a fluid monitoring device 300 comprising a transmitter housing 302 reversibly attached to an underside of a cap 114. The cap 114 may be a standard sewer cleanout cap or may be a cap with a compatible thread pitch and diameter such that the cap 114 may be accepted by the complementary sewer cleanout. In one embodiment of the fluid monitoring device 300, for example as shown in FIGS. 8A-8C, the device 300 includes four principal components: the cap 114, the transmitter housing 302, the linkage 304, and the sensor assembly 600. At a functional level, the cap 114 may affix the device 300 to the sewer cleanout pipe; the transmitter housing 302 may house the sensitive computerized components, may adhere to the underside of the cap 114, and may provide for retraction or extension of the cable 308; the linkage 304 may provide a flexible yet strong connection between the transmitter housing 302 and the sensor assembly 600; and the sensor assembly 600 may house the sensor, permitting the sensor to be in position proximate to a given flood line. Thus, the fluid monitoring device 300 may provide a means of affixing a transmitter and sensor within a cleanout pipe, where the transmitter (and related components) are safeguarded from the elements within the sewer pipe, and where the sensor is within close physical proximity to a line of fluid that would be indicative of a flood or blockage. Although the term 'water' is used throughout this disclosure, it should be understood that 'water' includes fluids, liquids, slurry solutions, and any mixtures of liquids and/or solids that may be present in a standard sewer or water line.

Figure 9:
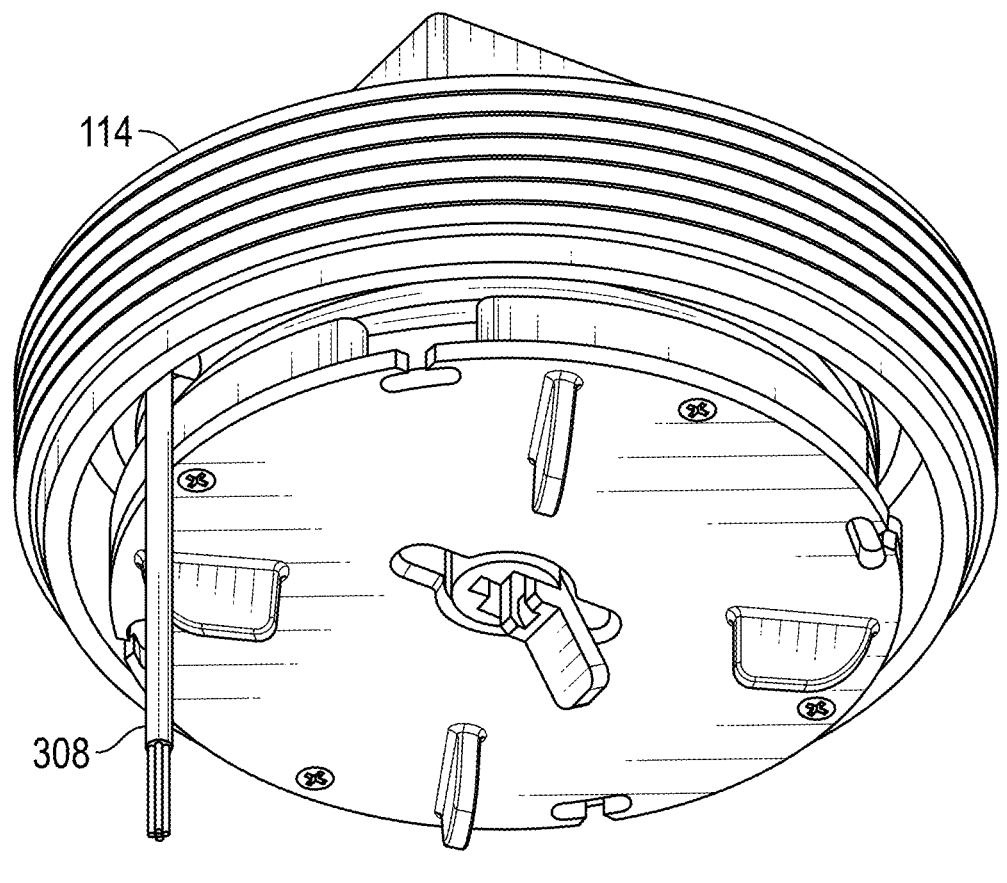
FIG. 9 illustrates an embodiment a fluid monitoring device, showing a transmitter housing assembly affixed to a sewer cleanout cap.

The transmitter housing 302 may be configured to at least partially accept a cable 308, for example, providing a means of wrapping the cable 308 around the transmitter housing 302 such that the cable 308 may be unwrapped or unwound, allowing the cable 308 to be withdrawn from or deposited into the transmitter housing 302 (e.g., as shown in FIG. 9). The cable 308 may provide informatic and/or electrical communication between the sensor and the electronic components of the PCB 338.

Various configurations of cable 308 management are considered below. The cable 308 may include jacketing, for example jacketing designed for harsh environmental conditions such as those encountered in sewer systems. The cable 308 may be a variable rating cable, including various ratings such as direct burial rated, moisture resistant, chemical resistant, or temperature resistant cables to cover any of the cables that are likely used in this type of scenario. The cable 308 may be of any suitable length but for example may be approximately 8 feet to accommodate the depth of the average clean-out pipe, while also taking into account variations in installation depths which may range from approximately 2 feet to 15 feet or more depending on local building codes and site conditions. In an alternate embodiment, the cable 308 may be connectable to the transmitter housing 302 and/or the sensor assembly 600, for example where there is a quick connect feature allowing the cable 308 to be removed from either of the aforementioned assemblies for maintenance, replacement, or storage purposes. However, the cable 308 can also be hardwired to one or both the transmitter housing 302 and/or the sensor assembly 600 for permanent cable installation configurations.

In some embodiments, the transmitter housing 302 is sized to accept the entire length of the cable 308, such that the entire length of cable 308 may be stored within the transmitter housing 302 during periods of nonuse (e.g., during shipment or storage).

The transmitter housing 302 may incorporate various spool configurations for cable management. In some embodiments, the transmitter housing 302 may feature an open spool design that allows direct access to the wound cable 308. Alternatively, the transmitter housing 302 may include an enclosed spool, wherein the cable 308 is housed within a substantially closed chamber. The enclosed spool configuration may offer benefits such as decreasing tangles when operating the spool or when withdrawing or depositing the cable 308 from the transmitter housing 302. The enclosed design may prevent the cable 308 from catching on external objects or becoming inadvertently dislodged during handling or installation.

In another embodiment, rather than utilizing a fully enclosed spool, the transmitter housing 302 may incorporate cage elements positioned around the perimeter of the spool. Such cage elements may provide partial containment of the cable 308 while still allowing visual inspection of the cable winding. The cage elements may be formed as ribs, bars, or mesh structures that prevent the cable 308 from unwinding unintentionally while permitting air circulation and reducing weight compared to a fully enclosed design.

The transmitter housing 302 may also include additional cable guides positioned along the spool or within the housing interior. These cable guides may direct the cable 308 along a predetermined path as it is wound onto or unwound from the spool, thereby maintaining organized coiling and reducing the likelihood of tangling or overlapping wraps.

In a further embodiment, the transmitter housing 302 may feature a removable shroud covering the spool. The removable shroud may provide the benefits of an enclosed spool during normal operation while allowing access in the event of an internal tangle or when maintenance is required. The removable shroud may be attached to the transmitter housing 302 via snap-fit connections, threaded engagement, magnetic attachment, or other reversible fastening mechanisms that enable tool-free or low-effort removal and reinstallation.

In an alternative configuration, the spool itself may be stationary rather than freely rotating. In such an embodiment, the cable 308 may be wrapped around the exterior of the transmitter housing 302 or around a fixed cylindrical element within the housing. The user may manually unwrap the cable 308 from the stationary spool by pulling the cable 308 while rotating the transmitter housing 302, or by maintaining the housing position while drawing the cable 308 away from the spool. This stationary spool design may eliminate the need for bearing mechanisms or rotating components, thereby simplifying the construction and potentially improving reliability in harsh sewer environments.

The transmitter housing 302 may comprise one or more alignment features 330 disposed on a top surface of the transmitter housing 302. The one or more alignment features 330 may be configured to index and affix the transmitter housing 302 to the cap 114. As nonlimiting examples, the alignment features 330 may be sized to interface with the cutout portion typically present on the underside of standardized sewer cleanout caps.

In some embodiments, the transmitter housing 302 may be adhered to the cap 114 via an adhesive. Such adhesive bonding may occur during manufacturing, wherein the transmitter housing 302 and cap 114 are joined together prior to distribution. Accordingly, the assembled unit may arrive with the cap 114 already adhered to the transmitter housing 302, providing a ready-to-install configuration that eliminates the need for field assembly of these components.

The adhesive used for bonding may be selected based on its compatibility with the materials comprising both the transmitter housing 302 and the cap 114, as well as its ability to withstand the environmental conditions present in sewer applications. Such adhesives may include epoxy-based formulations, polyurethane adhesives, or other bonding agents that provide durable adhesion while resisting moisture, temperature fluctuations, and chemical exposure.

In some cases, the manufacturing process may accommodate a variety of cleanout cap variants, enabling the transmitter housing 302 to be paired with different cap configurations during assembly. To illustrate, the transmitter housing 302 may be designed with standardized dimensions and alignment features 330 that are compatible with multiple cap styles, thread pitches, or diameters. This approach may allow for the creation of multiple assembly variations, each tailored to specific cleanout specifications commonly encountered in residential, commercial, or municipal installations. By offering such variations, the assembled unit may be adaptable to any end user's specifications without requiring custom manufacturing for each application.

The alignment features 330 may be specifically designed to index the transmitter housing 302 with the cap 114, ensuring proper orientation and positioning during the adhesive bonding process. These alignment features 330 may include protrusions, recesses, or geometric contours on the transmitter housing 302 that correspond to complementary features on the underside of the cap 114. When the transmitter housing 302 is positioned against the cap 114, the alignment features 330 may engage with the corresponding features on the cap 114, thereby establishing a predetermined rotational and translational alignment. This indexing function may ensure that the transmitter housing 302 is consistently positioned relative to the cap 114, which may be particularly beneficial when the cap 114 includes specific features such as vent holes, grip surfaces, or markings that should maintain a particular orientation relative to the transmitter housing 302.

In another embodiment, the top body 322 of the transmitter housing 302 may be formed as a unibody construction with the cap 114. In such a configuration, the top body 322 and the cap 114 may be molded together as a single integrated component, eliminating the interface between these elements. This unibody approach may be achieved through various manufacturing processes, such as injection molding, where the top body 322 and cap 114 are formed simultaneously from the same material or from compatible materials that bond during the molding process. Alternatively, the unibody construction may be achieved through co-molding techniques, wherein the cap 114 is first molded and then the top body 322 is molded directly onto the cap 114, creating a seamless integration between the two components. The unibody configuration may offer advantages such as eliminating potential failure points at the adhesive interface, reducing manufacturing steps, and providing enhanced structural integrity for the assembled unit.

Accordingly, the alignment features 330 may enable the fluid monitoring device 300 to be retrofitted to an existing cap 114. In such an instance, the alignment features 330 may include protrusions that tension-fit the transmitter housing 302 to an underside of the cap 114.

In an embodiment, a printed circuit board (PCB) 338 is disposed within the transmitter housing 302, the PCB 338 may comprise a battery 350, a microprocessor 352, a transmitter 354, and a power cable connector. The transmitter 354 may be configured to wirelessly communicate with one or more peripheral devices. For example, such wireless communication may allow the fluid monitoring device 300 to inform peripheral devices (e.g., a smart phone, a plumbing professional's server, a hub device within a user's home, or an electronically-controlled valve) of a flood or blockage.

The microprocessor 352 may perform several functions beyond interpreting signals from the sensor assembly 600 and instructing the transmitter 354 to send flood alerts. In some embodiments, the microprocessor 352 may serve as an intermediary between the sensor assembly 600 and the transmitter 354, receiving data from the sensor assembly 600 via serial communication and processing that data before determining what information to communicate to peripheral devices.

The sensor assembly 600 may include local processing capabilities to measure capacitance between the two capacitive plates 612. Such local measurement may be performed at the sensor assembly 600 level due to the electrical characteristics of the cable 308, wherein capacitance readings may be affected by cable length if measured remotely. Accordingly, the sensor assembly 600 may include circuitry configured to read the capacitance locally and then transmit the capacitance data to the microprocessor 352 via serial communication through the cable 308. In such embodiments, the microprocessor 352 may receive serial communication data indicating the measured capacitance value rather than directly measuring the capacitance itself.

The microprocessor 352 may implement one or more algorithms to determine when to trigger an alarm condition. Such algorithms may include threshold-based detection, wherein the microprocessor 352 compares the received capacitance reading to a predetermined threshold value. Alternatively, the algorithms may include range-based detection, wherein the microprocessor 352 determines whether the capacitance reading falls within a specified range indicative of a flood condition. In some cases, the algorithms may incorporate differential analysis, comparing current readings to baseline values or previous readings to detect significant changes that may indicate rising fluid levels.

In some embodiments, the microprocessor 352 may incorporate temporal factors into the alarm determination process. For example, the microprocessor 352 may monitor the rate of change in capacitance readings over time, wherein a rapid increase in capacitance may trigger an immediate alarm while a gradual increase may be evaluated over a longer period before triggering an alarm. Such temporal analysis may help distinguish between actual flood conditions and transient environmental disturbances.

The microprocessor 352 may also perform longitudinal analysis of sensor data to mitigate false alarms caused by environmental factors, for example, where sensors may be susceptible to environmental disturbances such as temperature variations, humidity changes, or electromagnetic interference. The microprocessor 352 may collect and analyze sensor data over extended periods to establish baseline patterns and identify anomalous readings that deviate from expected behavior. Such longitudinal analysis may enable the microprocessor 352 to filter out environmental noise and improve the accuracy of flood detection. In another embodiment, the microprocessor 352 and/or a device in communication with the device 300 may be preloaded with logic including exemplary longitudinal data profiles for true alarms, false alarms, and the like. In this way, the microprocessor 352 or other device in the system configured to determine alarm statuses may reference said exemplary data profile to mitigate false alarms, while alarming during actual flood events.

In some aspects, the microprocessor 352 may conduct trend analysis to identify patterns in the sensor data that may be indicative of developing flood conditions. For instance, the microprocessor 352 may track gradual increases in capacitance readings over hours or days, which may suggest a slow-developing blockage or rising water levels. By identifying such trends, the microprocessor 352 may provide early warning of potential flood conditions before they reach critical levels.

The fluid monitoring device 300 may be configured such that the microprocessor 352 does not continuously stream sensor data to peripheral devices. Instead, the microprocessor 352 may operate in a periodic sampling mode, wherein capacitance readings are taken at predetermined intervals and evaluated locally before any communication occurs. Such an approach may conserve power and reduce unnecessary data transmission while still providing timely flood detection.

In certain embodiments, the microprocessor 352 may include basic intelligence to perform preliminary analysis of sensor data while still allowing a hub 700 or other peripheral device to make final determinations regarding alarm conditions. For example, when the microprocessor 352 detects unusual sensor readings that do not definitively indicate a flood condition, the microprocessor 352 may transmit the sensor data to the hub 700 along with a flag indicating that anomalous conditions have been detected. The hub 700 may then apply more sophisticated analysis algorithms or consider additional data sources before determining whether to issue an alarm. Such distributed processing may balance the need for local intelligence with the benefits of centralized decision-making. Such conditions may include instances of detecting flood signals while battery power is low, detecting intermittent or short-term flood signals, detecting borderline capacitance threshold readings, and the like.

The microprocessor 352 may also manage communication protocols between the sensor assembly 600 and the transmitter 354. In some cases, the microprocessor 352 may format sensor data received via serial communication from the sensor assembly 600 into a format suitable for wireless transmission by the transmitter 354. Such formatting may include data compression, encryption, or packaging of multiple sensor readings into a single transmission packet to optimize communication efficiency.

In alternative embodiments, the microprocessor 352 may implement adaptive algorithms that adjust detection parameters based on observed conditions. For instance, if the microprocessor 352 detects frequent false alarms due to environmental factors, it may automatically adjust threshold values or implement additional filtering to reduce false positives. Conversely, if the microprocessor 352 detects patterns consistent with recurring blockages, it may lower detection thresholds to provide earlier warnings of potential flood conditions. Such changes to threshold conditions may be implemented remotely by an administrator, for example, via communication from a server, to the hub, and to the Referring to FIG. 10, the fluid monitoring device 300 may include a linkage 304, for example, tethering the transmitter housing 302 to the sensor assembly 600. The linkage 304 may be configured to extend along a generally vertical axis and operably connect the transmitter housing 302 to a sensor assembly 600, wherein the linkage 304 may provide a robust mechanical coupling to maintain structural integrity during operational use, an adaptable length such that the linkage 304 may be selectively cut, snapped, telescoped, or otherwise adjusted by an installer to accommodate installation-specific dimensional requirements, and/or a reversible attachment mechanism permitting tool-less or low-effort removal to facilitate disconnection of the sensor assembly 600 or the transmitter housing 302 from the linkage 304. The linkage 304 may be composed of a material and geometry providing sufficient rigidity to resist fracture or deformation under expected loading conditions (e.g., while supporting the sensor assembly 600 during normal use), while exhibiting limited plasticity or controlled flexibility to accommodate deviations from vertical alignment within the host environment (e.g., the cleanout section) without compromising connection reliability. While FIG. 9-10 consider a hanging rod linkage 304, in alternate embodiments, the linkage 304 may be a rope, chain, wire, or other means of hanging the sensor assembly 600 from the transmitter housing 302.

In one embodiment, the linkage 304 may be an elongated, slender member configured to facilitate connection between the sensor assembly 600 and the transmitter housing 302. The linkage 304 may have a slender flat profile, which may restrict rotational movement in the sensor assembly 600, which may otherwise be apparent in a weak string prone to twisting. However, as demonstrated in FIG. 10, the linkage 304 may be an elongated member having four primary protruding sides running along the vertical axis of the linkage 304. The four primary protruding sides may provide a degree of rigidity, such that the linkage 304 does not overbias in one particular direction. The linkage 304 may include a simpler design, for example a long slender member having two primary flat sides (i.e., a long generally rectangular prism). Such a simpler geometry may be warranted in instances where preserving material is desired or where a particular bend bias is preferred.

The sensor assembly 600 may comprise two capacitive plates 612. The two capacitive plates 612 may be in communication with the PCB 338 and components thereof via the cable 308. Accordingly, the two capacitive plates 612 may inform the PCB 338 and components thereof when fluid is detected between the two capacitive plates 612. The capacitive plates 612 may be arranged such that the presence of a fluid between or near the plates 612 alters the dielectric constant of the surrounding medium. Such a change in the dielectric properties results in a measurable variation in capacitance, which can be correlated (e.g., with the microprocessor 352) to the presence or level of the fluid.

An a nonlimiting example, the microprocessor 352 is configured to interpret a capacitance reading from the two capacitive plates 612, wherein, upon detecting that the capacitance reading is above a threshold capacitance reading, the microprocessor 352 instructs the transmitter 354 to transmit a flood signal. In such an embodiment, the microprocessor 352 includes computer-executable instructions stored in memory, which, when executed, enable the microprocessor 352 to monitor one or more actuation conditions (e.g., a capacitance reading being within a predefined range). Upon determination that a predefined condition or set of conditions has been satisfied, the microprocessor 352 may be configured to generate a corresponding signal and may further instruct the transmitter 354 to transmit the signal to a peripheral (e.g., a smart phone, a plumbing professional's server, or an electronically-controlled valve).

The transmitter housing 302 may include a means of attaching the linkage 304. For example, the transmitter housing 302 may include a snap hook release 314, wherein the snap hook release 314 includes a sufficient pliability to allow a user to retract the snap hook release 314 to push the linkage 304 into a locked position with the transmitter housing 302. Similarly, the snap hook release 314 may be bent back as to allow the linkage 304 to disconnect from the transmitter housing 302. In practice, upon installation of the device 300, the linkage 304 may be pushed into the transmitter housing 302, engaging with the latch 332, and reversibly locking the linkage 304 to the transmitter housing 302. This may allow the sensor assembly 600 to be reversibly tethered to the transmitter housing 302.

The transmitter housing 302 may further comprise a stem 334 extending through a vertical axis of the transmitter housing 302, where the stem 334 at least partially retains the snap hook release 314. The stem 334 may include a hollow portion sized to accept the linkage 304 when the linkage 304 is reversibly locked to the transmitter housing 302.

The stem 334 may have a depth slightly exceeding the length of one breakable unit 310, such that the linkage 304 may be sufficiently retained within the stem 334 when engaged with the transmitter housing 302.

Figure 10:
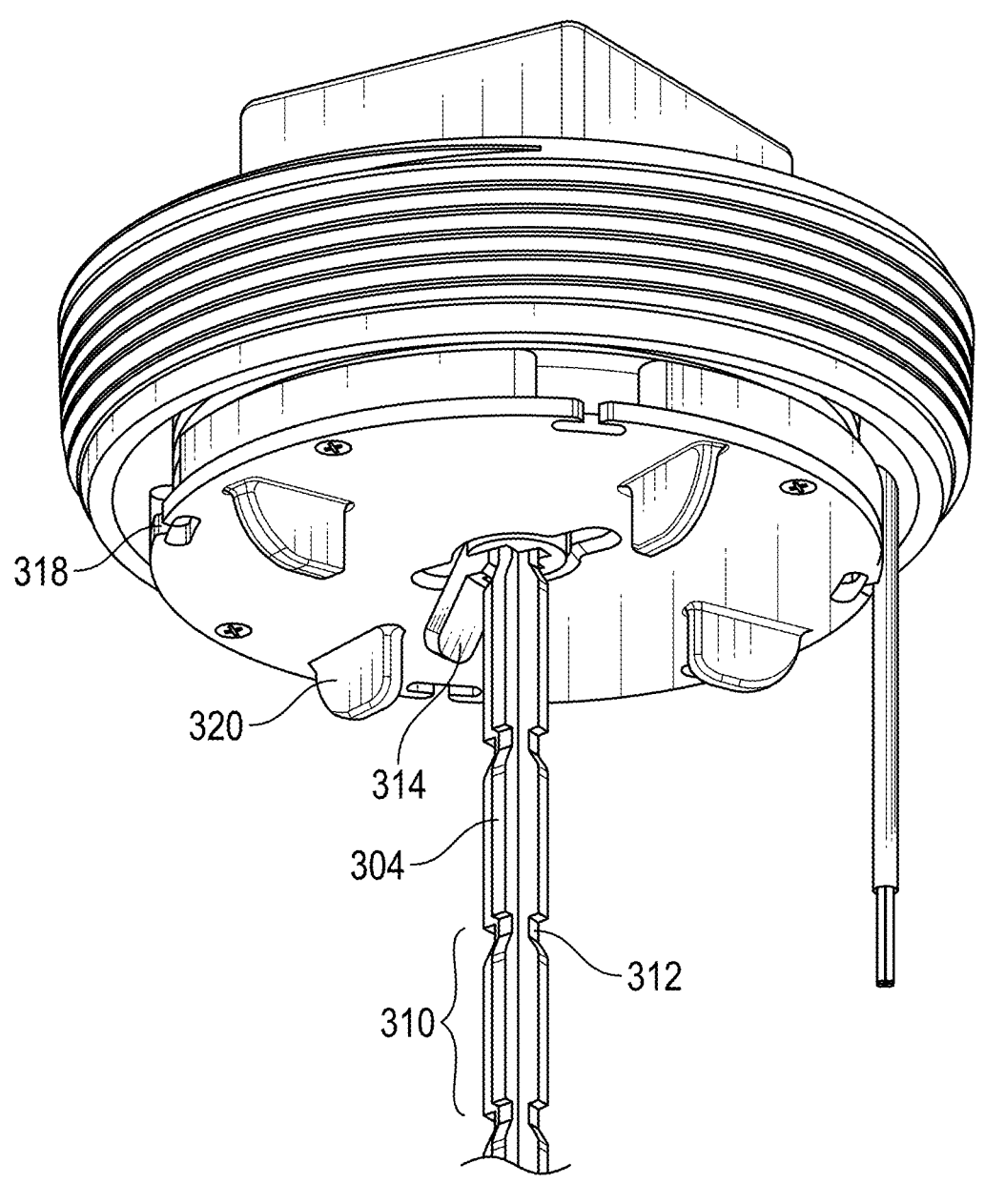
FIG. 10 illustrates an embodiment a fluid monitoring device, showing a transmitter housing assembly affixed to a sewer cleanout cap.

Referring to FIG. 10, in an embodiment, the transmitter housing 302 includes a cable hook and/or a cable clip 318, wherein a cable hook is configured to retain the cable 308 in a coaxial orientation with the transmitter housing 302, and wherein the cable clip 318 is configured to direct the cable 308 beneath the transmitter housing 302.

Referring to FIG. 10, one or more finger nubs 320 may be positioned on a bottom surface of the transmitter housing 302, wherein rotation of the one or more finger nubs 320 about a vertical axis of the transmitter housing 302 causes the cable 308 to retract or extend from the transmitter housing 302. The finger nubs 320 may be protrusions extending from the bottom surface of the transmitter housing 302, for example, orthogonal to said bottom surface. Accordingly, by spinning the transmitter housing 302, or lower part thereof, the cable 308 may be wound or unwound from the transmitter housing 302. Such an action may be desirable when installing the fluid monitoring device 300 or when retrieving a length of cable 308 to properly position the sensor assembly 600 within a vertical pipe. In alternate embodiments, the bottom surface of the transmitter housing 302 may include indentations or other features (either protruding or indented into the transmitter housing 302) that promote a positive grip.

Figure 11:
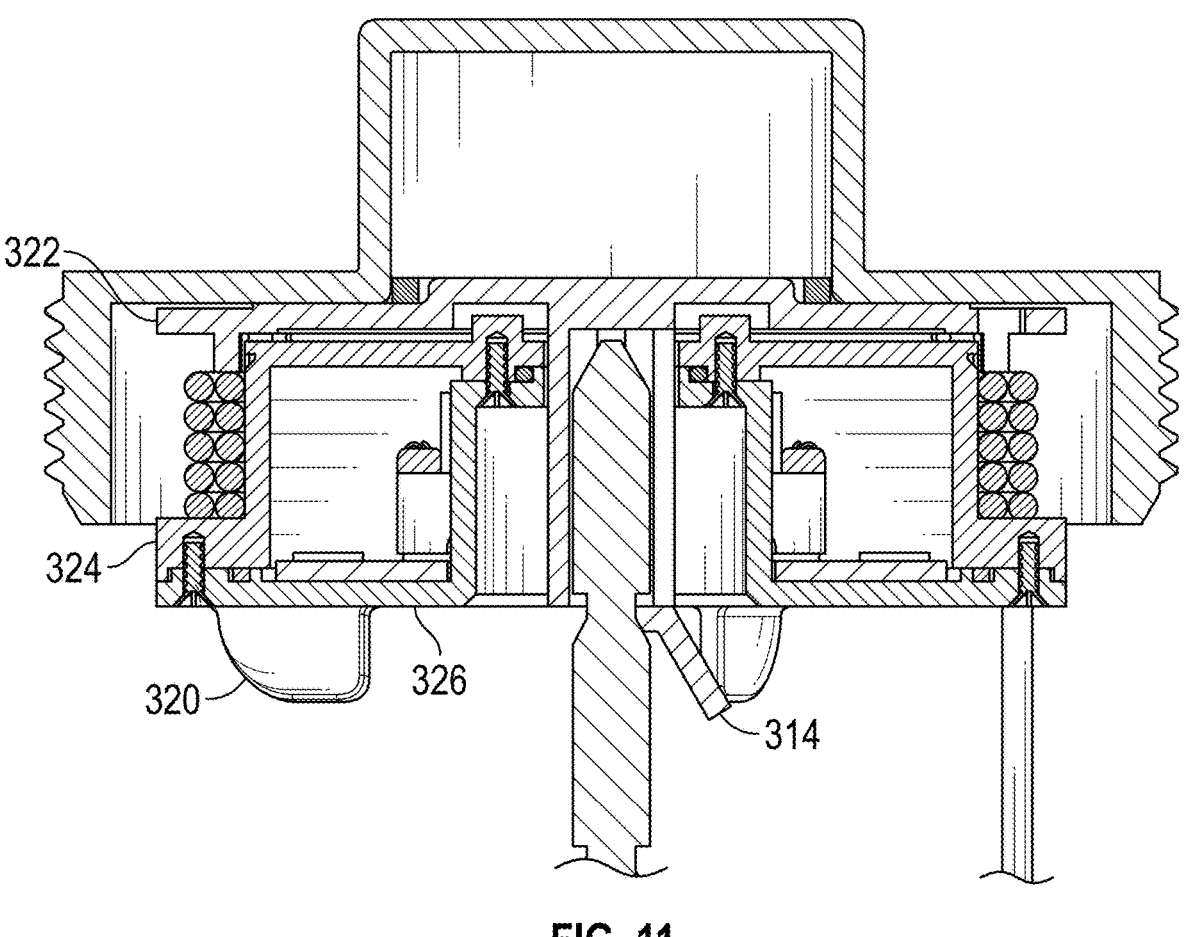
FIG. 11 illustrates an embodiment of a transmitter housing assembly.
Figure 12A:
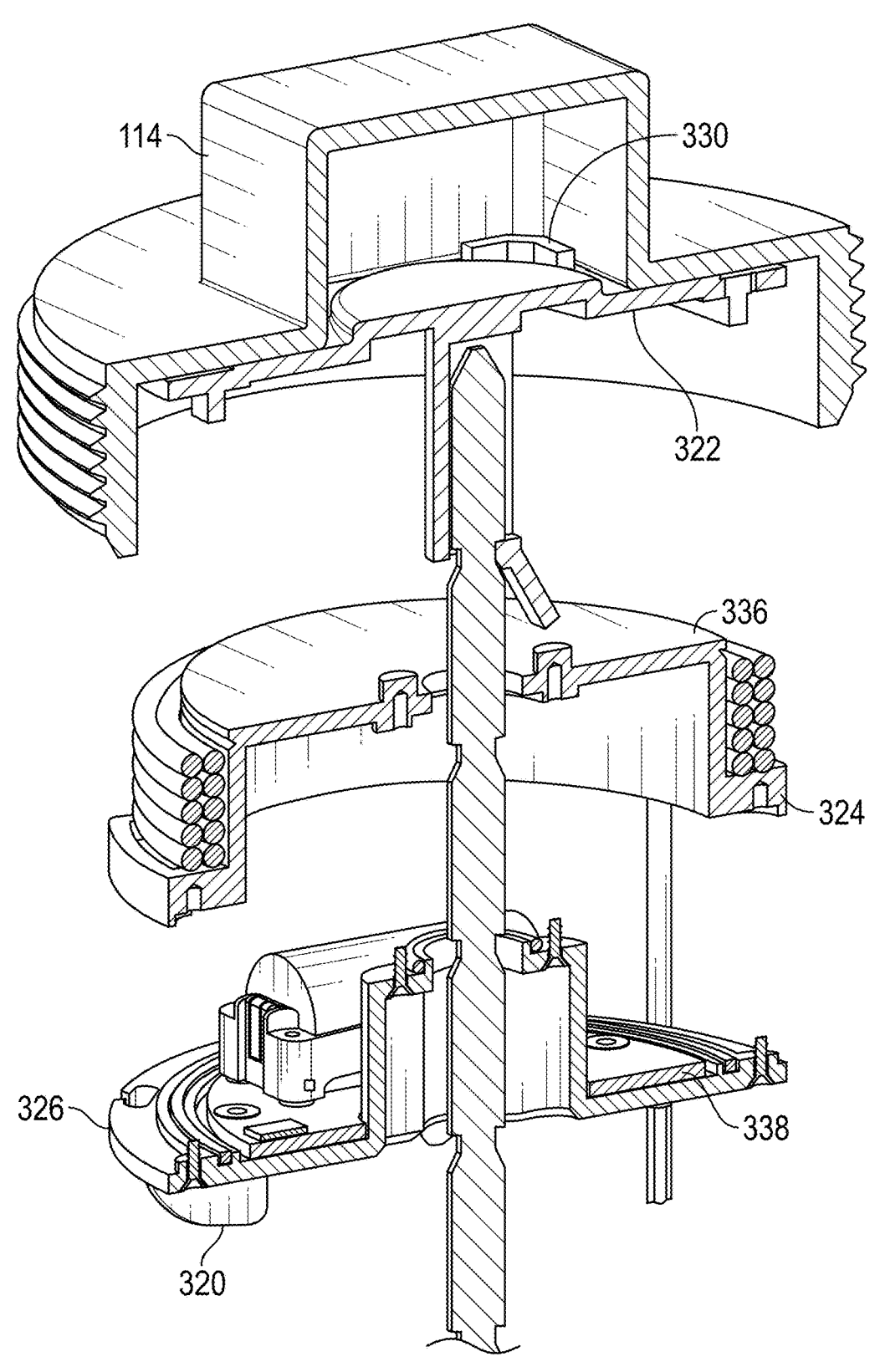
FIGS. 12A-12B illustrate exploded views of an embodiment of a transmitter housing assembly.
Figure 12B:
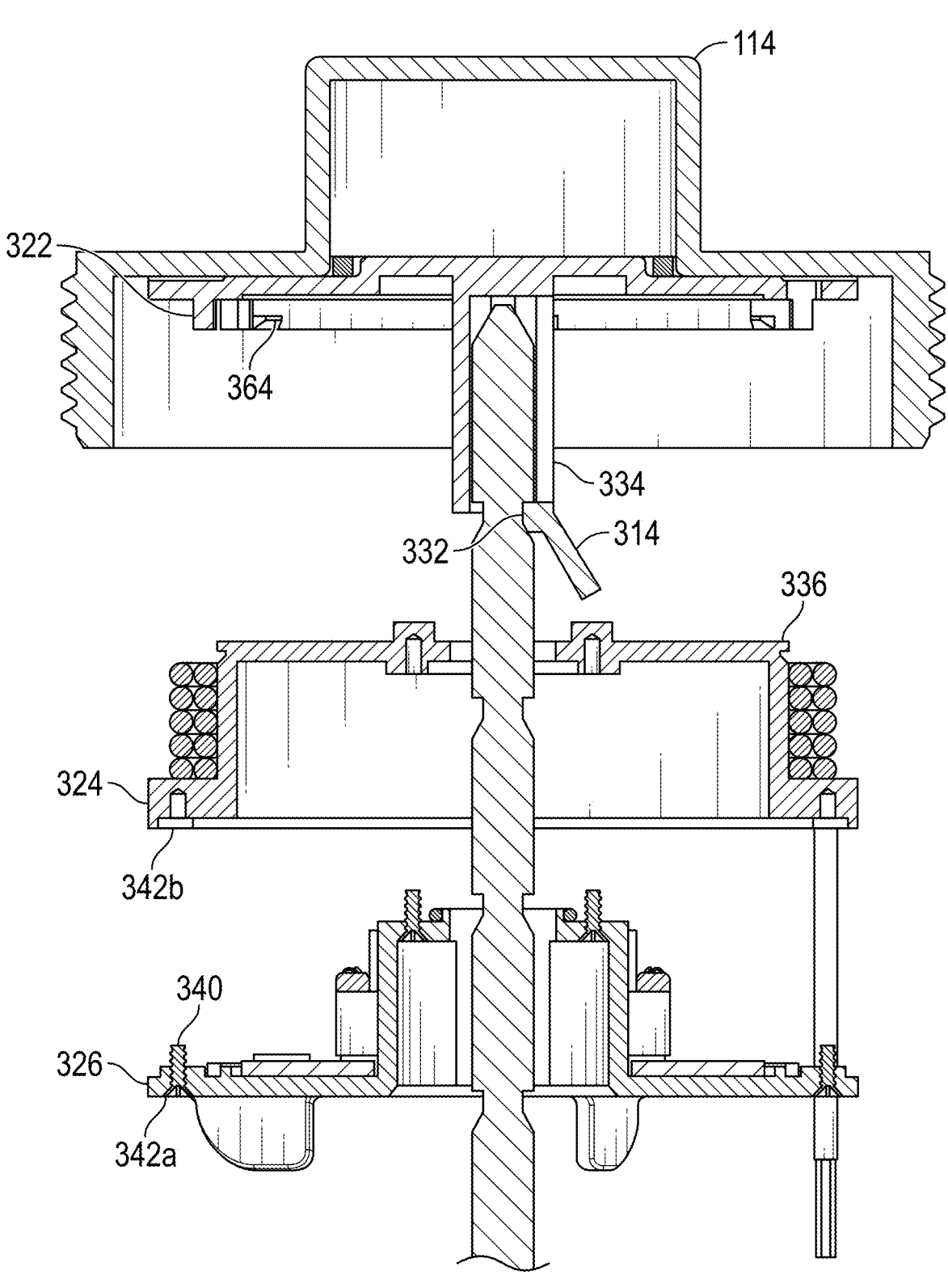
Figure 13:
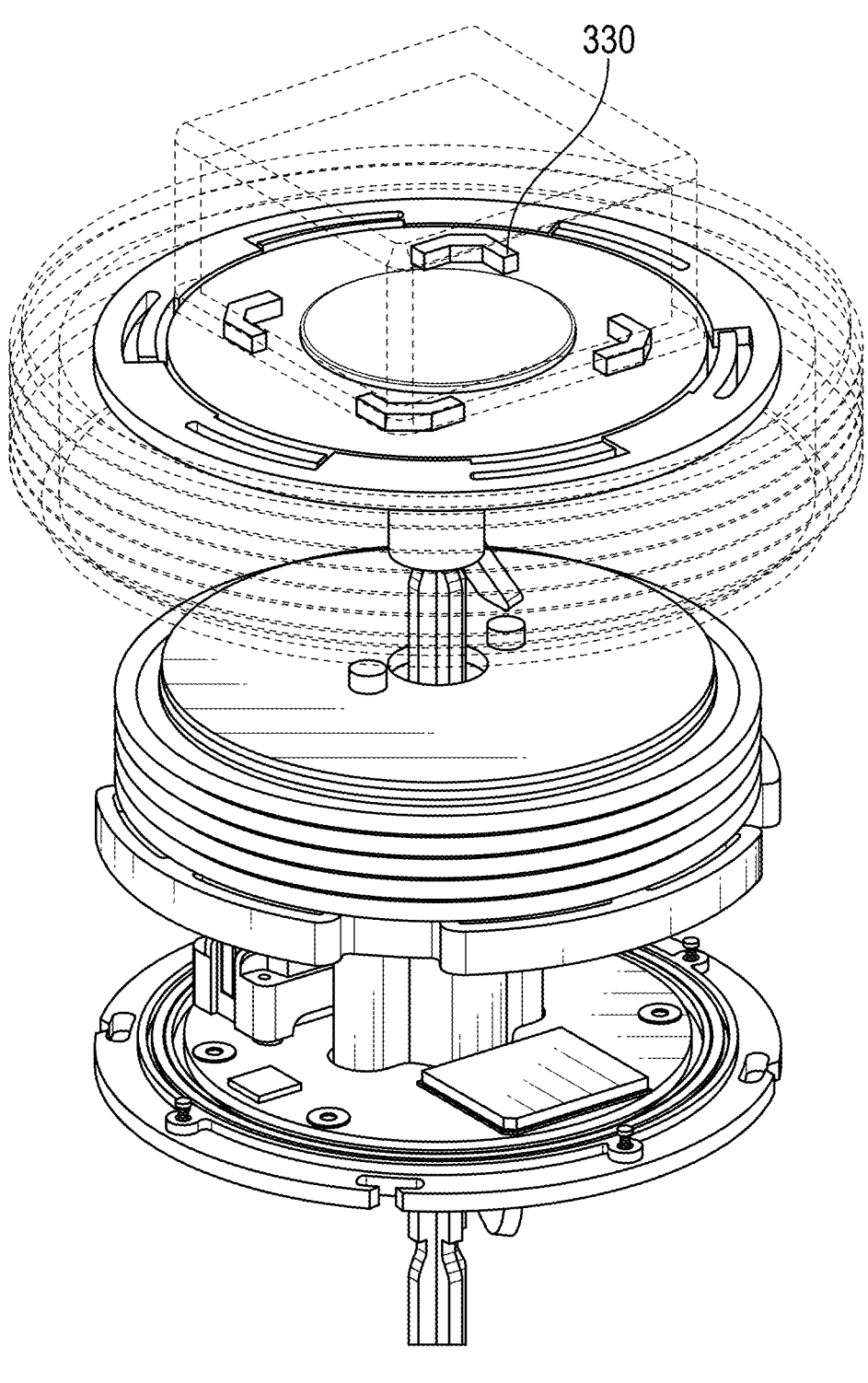
FIG. 13 illustrates a top perspective exploded view of an embodiment of a transmitter housing assembly, showing alignment features atop the transmitter housing assembly, sized to index the transmitter housing assembly with a cap.

Referring to FIGS. 11-13, the transmitter housing 302 may be formed from a top body 322, a medial body 324, and a bottom body 326. Thus, the combination of said three bodies may substantiate the transmitter housing 302. However, in an alternate embodiment, the transmitter housing 302 may be a unibody construction. In another embodiment, the transmitter housing 302 may be formed from two bodies, where a first body is connectable to the underside of a cap 114 and where a second body (e.g., a unibody combination of the medial body 324 and bottom body 326) dispenses the cable 308. In an embodiment, the bottom body 326 may be affixed to the medial body 324 via one or more fasteners 340, where the bottom body 326 and the medial body 324 may include one or more fastener apertures 342*a*, 342*b*.

In some embodiments, the top body 322 may be formed as a unibody construction with the cap 114, wherein the top body 322 and cap 114 are molded together as a single integrated component through processes such as injection molding or co-molding techniques. Such unibody integration may eliminate the interface between the top body 322 and cap 114, thereby enhancing structural integrity and reducing potential points of failure.

In alternative configurations, both the top body 322 and the medial body 324 may be integrated or formed as a unibody construction with the cap 114, creating a single monolithic assembly that encompasses the cap 114, top body 322, and medial body 324. This extended unibody approach may further simplify the overall construction while maintaining the functionality of cable management and sensor attachment.

In such configurations, at least the bottom body 326 or another access point may remain accessible or removable to permit maintenance access to the battery 350 and any other serviceable components of the PCB 338.

Referring to FIG. 12B, in one embodiment, one or more retaining hooks 336 are disposed on the medial body 324. To complement the one or retaining hooks 336, one or more retaining collars 364 may be disposed on the top body 322. In such an embodiment, the one or more retaining collars 364 are sized to reversibly engage with the one or more retaining hooks 336. Thus, the medial body 324, which may also be fixed to the bottom body 326, may be rotated about a vertical axis of the transmitter housing 302 while maintaining the position of the top member 322. In such an aspect, the engagement between the medial body 324 and the top body 322 may permit rotation of one relative to the other, while maintaining the interface between said bodies 324, 322. In alternate embodiments, another style of mechanism may permit rotation of the top member 322 relative to the medial member 324, including, but not limited to, a bearing style mechanism, a track and rolling element, or a slider. In one embodiment, one or more gaps are positioned between the one or more retaining collars 364, wherein the gaps are sized to permit passage of the one or more retaining hooks 336, allowing the medial body 324 to separate from the top body 322, for example when downward pressure is exerted on the medial body 324 and when the hooks 336 are aligned with the gaps. Removal of the medial body 324 from the top body 322 may provide for easier access for maintenance on the device 300 (e.g., a battery change or inspection of the PCB).

A cable grommet may be disposed on the transmitter housing 302 forming a passage to an internal cavity of the transmitter housing 302. The cable grommet may be sized such that the cable 308 may enter the internal cavity of the transmitter housing 302, while minimizing any pull the cable 308 may induce on the PCB 338. In one aspect, the cable grommet may include a gasket, seal, rubberized component, or other element that minimizes the ability for moisture to wick through the cable grommet and into the internal cavity of the transmitter housing 302.

Referring to FIG. 13, the one or more alignment features 330 may be composed of one or more alignment protrusions and one or more alignment bars. The one or more alignment protrusions may extend orthogonal from the top surface of the transmitter housing 302 (in some instances, the top body 322) and may interface with the cutout typically present in standardized sewer cleanout caps. The one or more alignment protrusions may extend into and friction-fit with said cutout. In a related fashion, the one or more alignment bars may extend horizontally and may be parallel, such that the alignment bars index the alignment features 330 with the cutout within standardized sewer cleanout caps, enabling the transmitter housing 302 to maintain its position relative to the cap.

Figure 14:
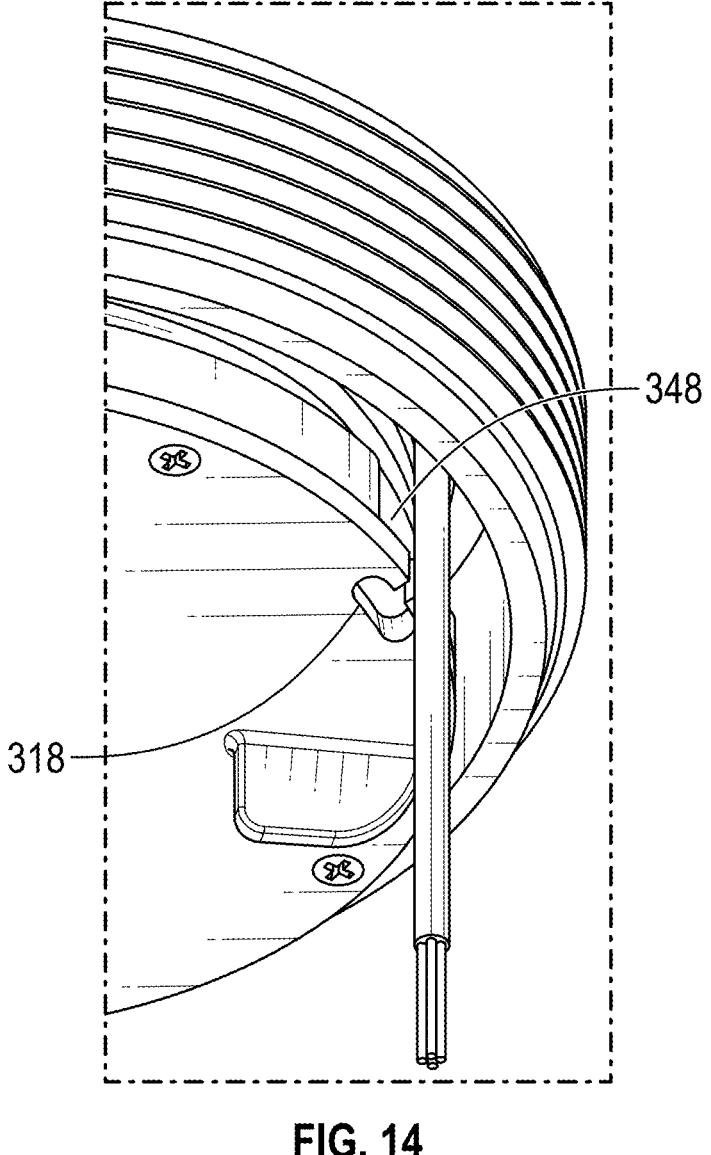
FIG. 14 illustrates a side view of an embodiment of a transmitter housing assembly, showing cable wound coaxial to the transmitter housing assembly.

Referring to FIG. 14, one or more cable guides 348 may be disposed on the transmitter housing 302, for example, the medial body 324. The one or more cable guides 348 may be configured to guide the cable 308 from the medial body 324 to the bottom body 326. In such an embodiment, the one or more cable guides 348 may be indents disposed on the perimeter of the medial body 324 sized to accept the cable 308 from a horizontal orientation to a vertical orientation.

Figure 15:
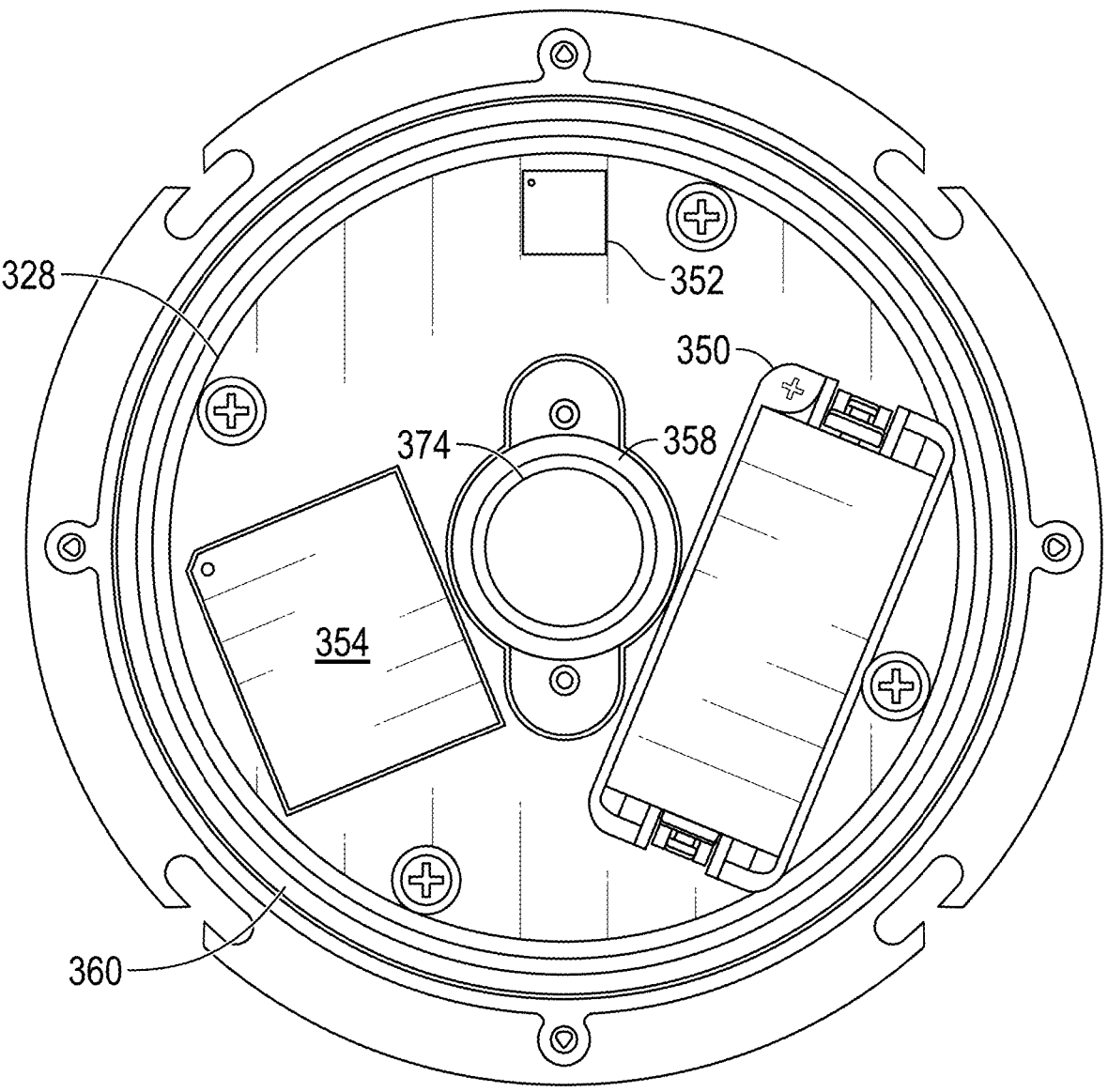
FIG. 15 illustrates a top view of an example of a printed circuit board for use in the fluid monitoring device.
Figure 16:
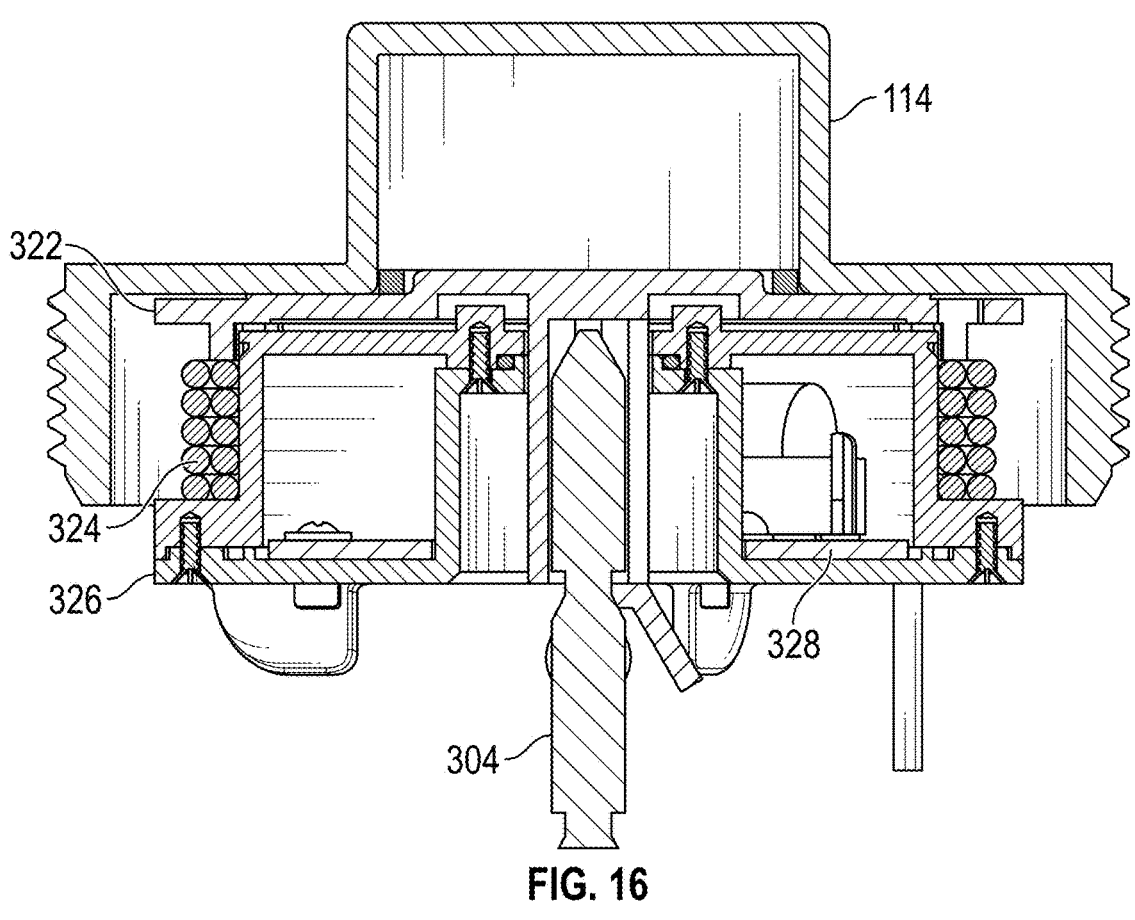
FIG. 16 illustrates a sectional view of an embodiment of the transmitter housing assembly.
Figure 17:
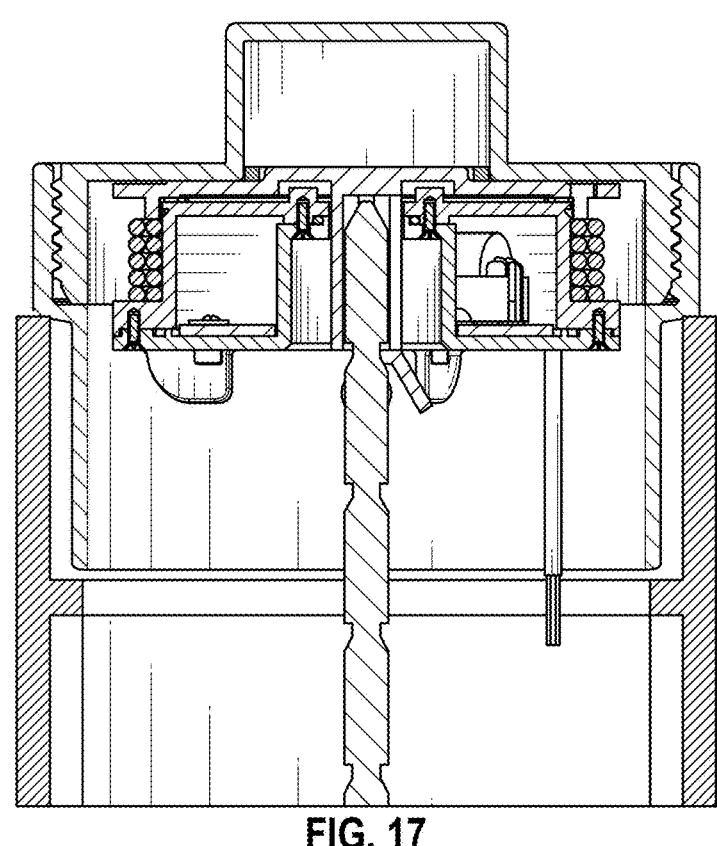
FIG. 17 illustrates a sectional view of an embodiment of the fluid monitoring device disposed within an exemplary vertical sewer cleanout pipe.
Figure 18A:
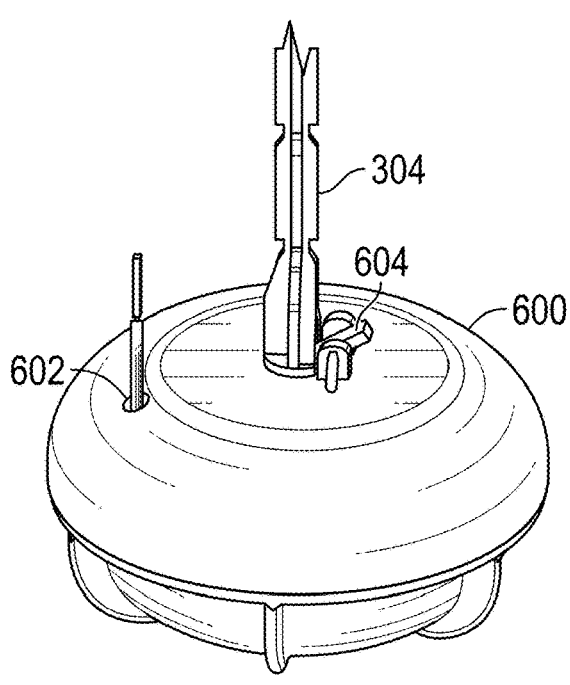
FIGS. 18A and 18B illustrate an embodiment of a sensor assembly.
Figure 18B:
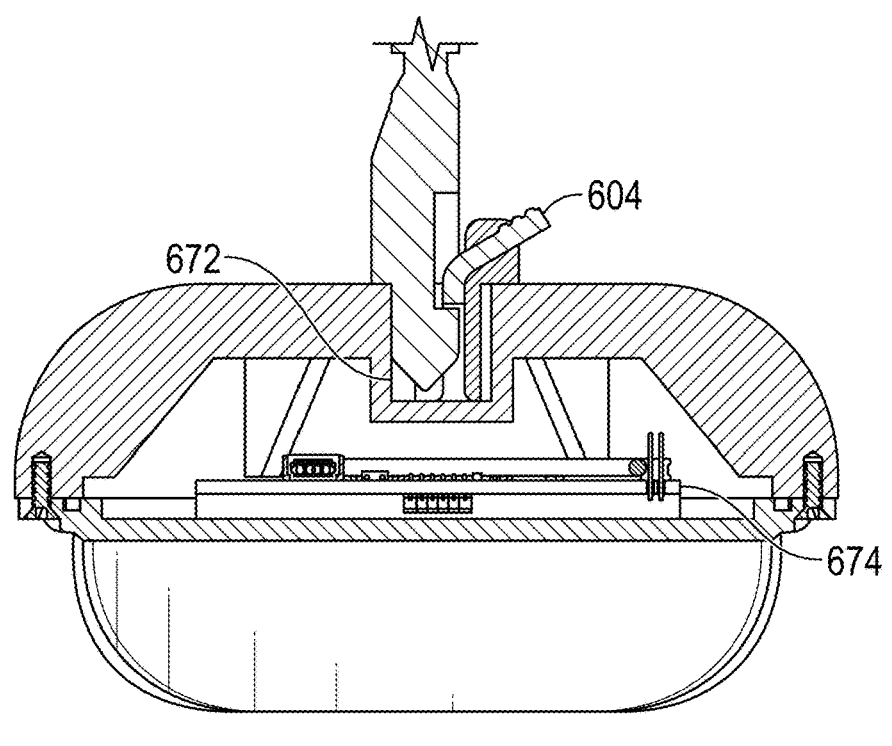

Referring to FIG. 15, an internal seal 358 may be positioned between the medial body 324 and the bottom body 326, surrounding a PCB aperture 374. The internal seal 358 may be any suitable sealing element, such as a rubber gasket, an o-ring, a silicone seal, or other elastomeric or compressible materials configured to prevent fluid or gas ingress or egress between adjoining components. The PCB aperture 374 may be a void disposed centrally on the PCB 328, for example, such that the linkage 304 may pass through the PCB 328. An external seal 360 may be positioned between the medial body 324 and the bottom body 326, for example, disposed around a perimeter of said bodies 324, 326. Like the internal seal 358, the external seal 360 may be any suitable sealing element. By providing an internal seal 358 and an external seal 360, an area between said seals 358, 360 (where computerized components are housed) may be sufficiently isolated from the environment. The placement of the internal seal 358 and the external seal 360 may enable the linkage 304 to extend through the transmitter housing 302, while protecting the sensitive electronic components from the environment. Such isolation may be of particular importance given the humid and caustic environment within a sewer line. In some embodiments, the internal seal 358 and the external seal 360 may be positioned directly between the medial body 324 and the bottom body 326, wherein the PCB 338 may be disposed in the horizontal plane between the internal seal 358 and the external seal 360, with the seals and the PCB 338 collectively held between the medial body 324 and the bottom body 326. Alternatively, the seals may be disposed on the PCB 338 itself, where the seals are further held by one of the vertically adjacent components of the sensor assembly.

Referring to FIG. 10, the linkage 304 may include a plurality of breakable units 310, where each breakable unit 310 includes one or more latching features 312. The breakable units 310 may be portions of the linkage 304 defined by intentionally weakened or compromised segments, enabling a user to snap the linkage 304 at the boundary of a breakable unit 310. The latching feature 312 may be a void, indentation, or other feature capable of engaging with a hook or other locking mechanism. As a nonlimiting example, the latching feature 312 may be a window disposed within the linkage 304 sized to engage with the latch 332 of the transmitter housing 302.

The snap hook release 314 may be configured to capture the linkage 302, wherein the snap hook release 314 interfaces with one of the one or more latching features 312 via a latch 332 on the snap hook release 314.

The sensor assembly 600 may comprise a plate receptacle, wherein the plate receptacle is sized to house two capacitive plates. In an embodiment, the plate receptacle may be slots or other features fixed in the sensor assembly 600, providing support for the two capacitive plates. Accordingly, the plate receptable (also referred to herein as the sensor slot) permits the capacitive plates to be in a position where a rise in the fluid level would introduce said fluid indirectly between the capacitive plates, causing the fluid monitoring device 300 to transmit a flood warning signal. In alternative embodiments, the sensor assembly 600 may include slots or other voids in the bottom of the sensor assembly 600 that allow the plates to extend below the sensor assembly 600. However, in a preferred embodiment, the sensor assembly 600 is sealed from the external environment and the sensor assembly 600 is configured such that the capacitance can be measured between the two plates, during a flood event, without the plates extending into the actual sewer environment.

The sensor assembly 600 may further comprise an anchor, wherein the anchor is defined by an anchor hook 604 and an anchor well 672. The anchor well 672 may be sized to accept the linkage 304 and the anchor hook 604 may be configured to engage the linkage 304 via one of the one or more latching features 312.

The sensor assembly 600 may include a sensor PCB 674 disposed within the sensor housing. The sensor PCB 674 may be configured to perform local capacitance measurement operations that determine the capacitance reading between the two capacitive plates 612. In some embodiments, measuring capacitance may involve a sequence of steps rather than a simple voltage measurement. The sensor PCB 674 may be configured to energize the capacitive plates 612 with a specific waveform in order to sufficiently and accurately detect the presence of fluid. Such a process may involve rapidly charging and discharging the capacitive plates 612 in a controlled manner. The sensor PCB 674 may monitor the charging and discharging cycles to determine the amount of charge required to reach a specific voltage level and the rate at which the plates discharge. By analyzing these charging and discharging characteristics, the sensor PCB 674 may calculate the capacitance value, which varies based on the dielectric properties of the medium between the plates (e.g., air versus water or sewage).

The sensor PCB 674 may include circuitry configured to generate the necessary waveforms for plate excitation, measure the resulting electrical responses, and process these measurements to derive an accurate capacitance value. In some cases, the sensor PCB 674 may perform multiple measurement cycles to improve accuracy and reduce the impact of electrical noise or environmental interference. The sensor PCB 674 may then transmit the determined capacitance value to the microprocessor 352 via serial communication through the cable 308. The sensor PCB 674 may include a sensor assembly microprocessor configured to interpret the capacitance reading from the capacitive plates 612 and transmit the capacitance reading to the microprocessor 352 on the PCB 338 of the transmitter housing 302.

Accordingly, the fluid monitoring device 300 may include two distinct PCBs: the PCB 338 disposed within the transmitter housing 302 and the sensor PCB 674 disposed within the sensor assembly 600. This distributed architecture may allow for specialized functionality at each location, with the sensor PCB 674 handling the precise electrical measurements required for capacitance detection and the PCB 338 managing data processing, wireless communication, and power management functions. The separation of these functions across two PCBs may also accommodate the physical constraints of the device 300, wherein the sensor assembly 600 may be positioned at a significant distance from the transmitter housing 302 within the sewer line.

Figure 19B:
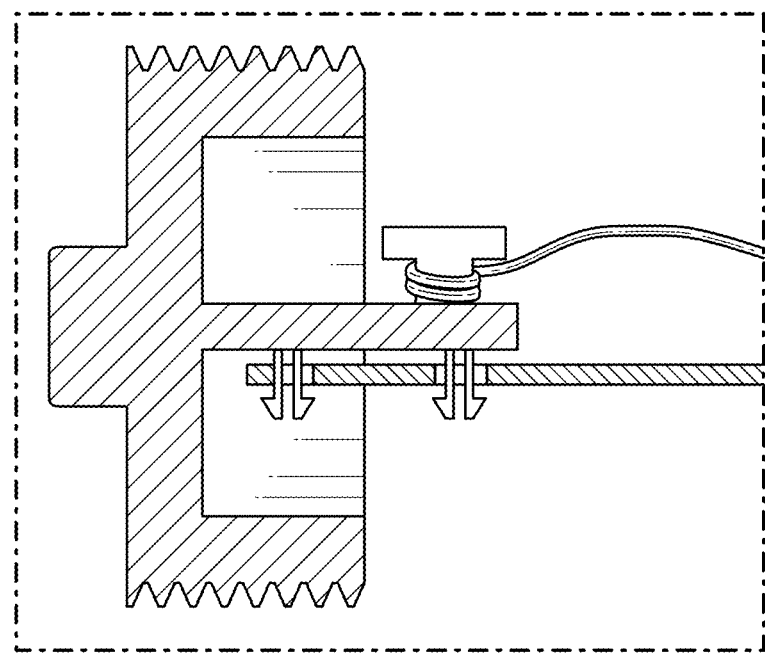
FIG. 19B illustrates an example of offset cable management relative to a vertical axis of the transmitter housing.
Figure 19A:
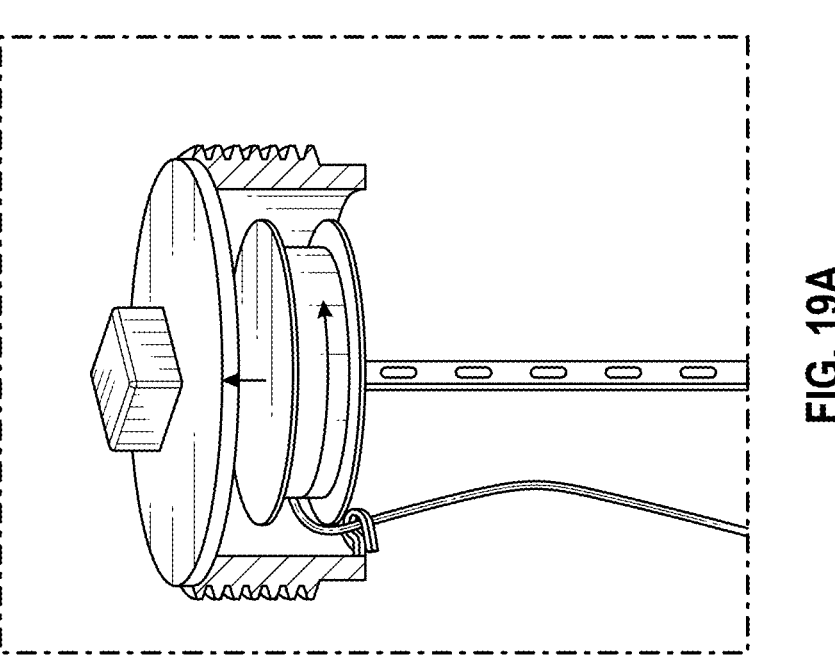
FIG. 19A illustrates an example of coaxial cable management about a vertical axis of the transmitter housing.

Referring to FIG. 19A, the transmitter housing 302 may be configured to enable coaxial cable management about a vertical axis of the transmitter housing 302. This style of cable management may be reflected in FIGS. 8-17.

Referring to FIG. 19B the transmitter housing 302 may be configured to enable offset cable management relative to a vertical axis of the transmitter housing 302. In such an embodiment, the cable is configured to be wrapped around a wheel or between two opposing hooks such that, when in the wrapped state, the cable lies substantially within a vertical plane. During installation, a user may unravel as much cable as needed and, as shown in FIG. 19B, tie a portion of the cable to an anchor point on the transmitter housing 302 to maintain the desired length of cable.

Figure 20:
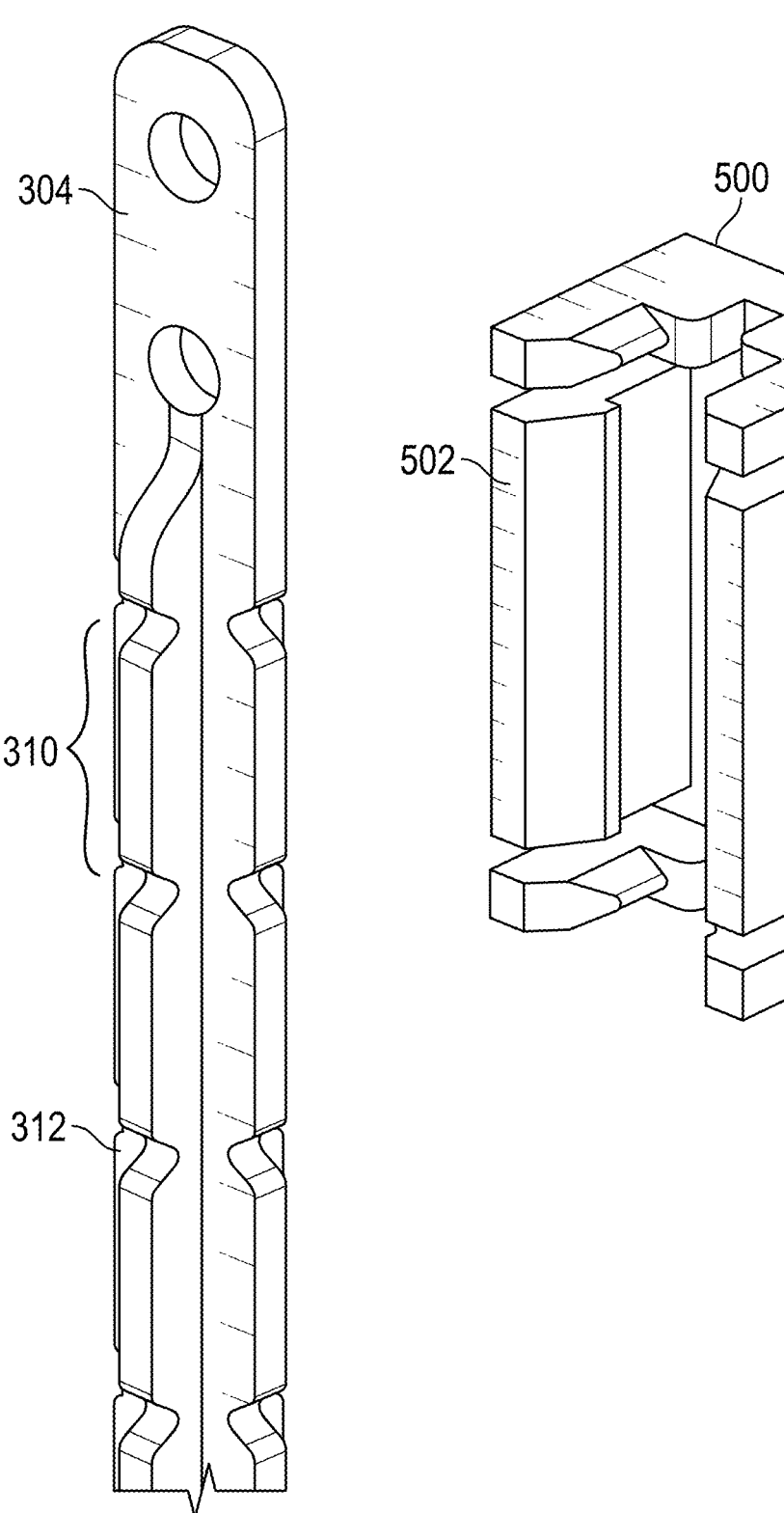
FIG. 20 illustrates an example of a hanging rod, showing an example of fitment with a rod clamp.

FIG. 20 illustrates an example of a linkage 304, also showing an example of fitment with a rod clamp 500. The linkage 304 may be defined by a long body comprising a "t-shaped" cross-section. Accordingly, the linkage 304 may have four distinct protruding sides. The linkage 304 may be composed of a plurality of breakable units 310. Each breakable unit 310 may be bound by at least one latching feature 312. The latching feature 312 may be a series of indents disposed at the same vertical position in each of the aforementioned protruding sides. Accordingly, at the point of the latching feature 312, the cross-sectional area of the linkage 304 may decrease, such that the integrity at that point is weakened, and prone to breaking or snapping when an intentional force is imparted at such points. Thus, in practice, a user may select the preferred length of the linkage 304 and snap or break the linkage 304 at the latching feature 312 that would provide the preferred length. The "t-shaped" cross-section of the linkage 304 may provide a more uniform degree of flexibility, for example, allowing the linkage 304 to bend around unknown or inconsistent curves.

In some embodiments, the linkage 304 may be comprised of a plurality of shorter linkage components, wherein each component may be connectable to adjacent components via one or more adapters or connectors. Such a modular configuration may allow the linkage 304 to be assembled to a desired length by joining multiple shorter sections together. A cable clip may also be disposed on the linkage 304, wherein the cable clip may be configured to retain the cable 308 in a position substantially tangential to the linkage 304, thereby making the cable 308 more manageable and providing a cleaner installation appearance. For example, in cases where a cleanout pipe may be approximately six feet tall, the linkage 304 may be composed of three two-foot sections, each connectable with a connector utilizing the geometry disclosed in FIG. 20. It is understood that a connector configured for affixing two sections of linkage 304 may borrow from the geometry portrayed in FIG. 220 but also may be any geometry complementary to the profile of the linkage 304, such that the connector holds the two sections firmly. This modular approach may enable the linkage 304 to be more easily stored and shipped, as an installer may not need to transport a full six-foot long section, but instead may carry several shorter sections that can be assembled on-site. The shorter sections may also provide greater flexibility in accommodating cleanout pipes of varying depths by allowing installers to use only the number of sections needed for a particular installation.

The linkage 304 may complement a rod clamp 500. The rod clamp 500 may be a standalone component, for example, disposed within the transmitter housing 302 and/or sensor assembly 600, or the rod clamp 500 (and its features) may be embedded within the transmitter housing 302 and/or sensor assembly 600. The rod clamp 500 may include a pair of clamp tabs 502 that are sized to accept the linkage 304. As a nonlimiting example, the clamp tabs 502 may be disposed vertically and in parallel. The clamp tabs 502 may be imbued with a degree of flexibility that enables the linkage 304 to be pressed within the rod clamp 500 and subsequently be captured. The rod clamp 500 may include a clamp index 504, which may further include a clamp catch 506. The clamp index 504 may be a cutout within the rod clamp 500 geometrically complementary to the cross-section of the linkage 304, such that the clamp index 504 prevents the linkage 304 from rotating once captured by the rod clamp 500. The clamp catch 506 may be a protrusion sized to interface with the latching feature 312. For example, the clamp catch 506 may be a male triangular protrusion that indexes with the female triangular indentation of the latching feature 312.

Figure 21:
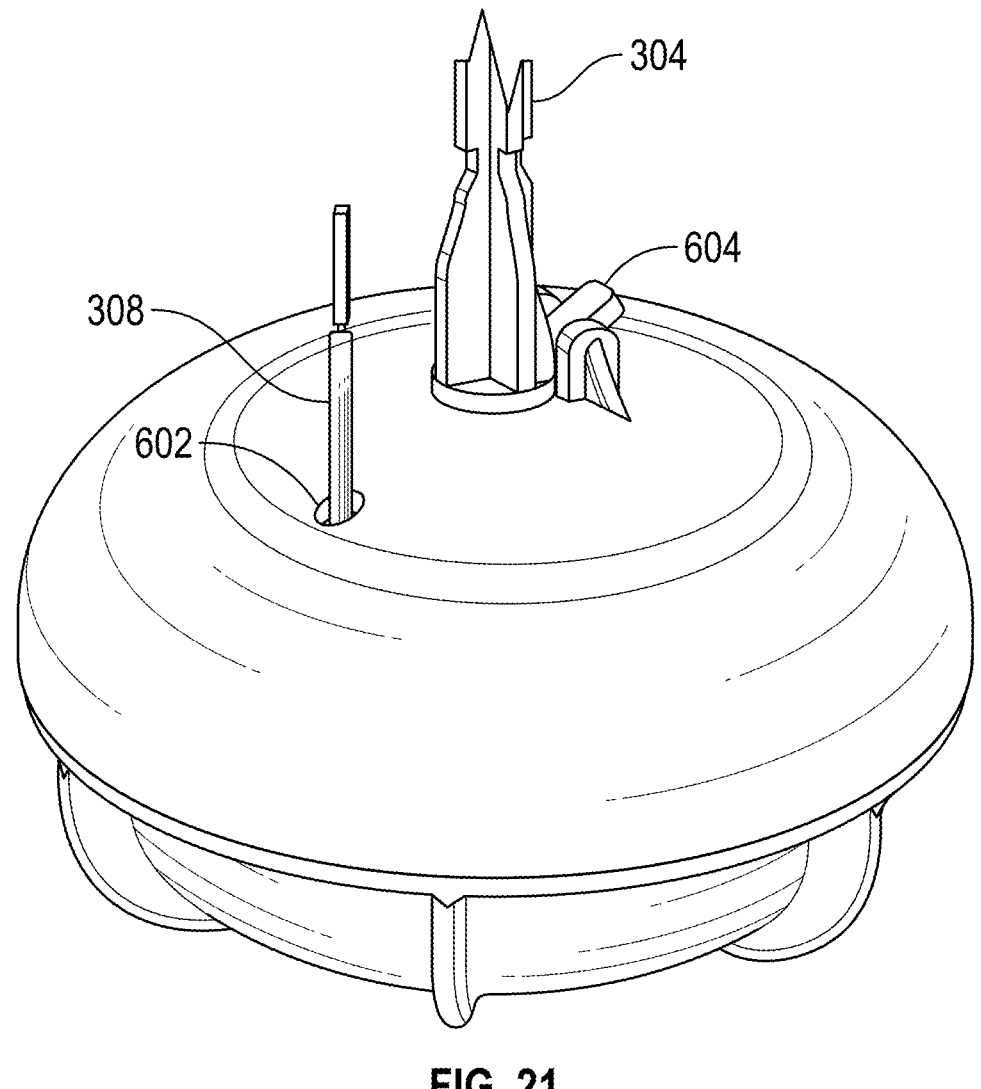
FIG. 21 illustrates an embodiment of a sensor assembly having a domed top surface.
Figure 22:
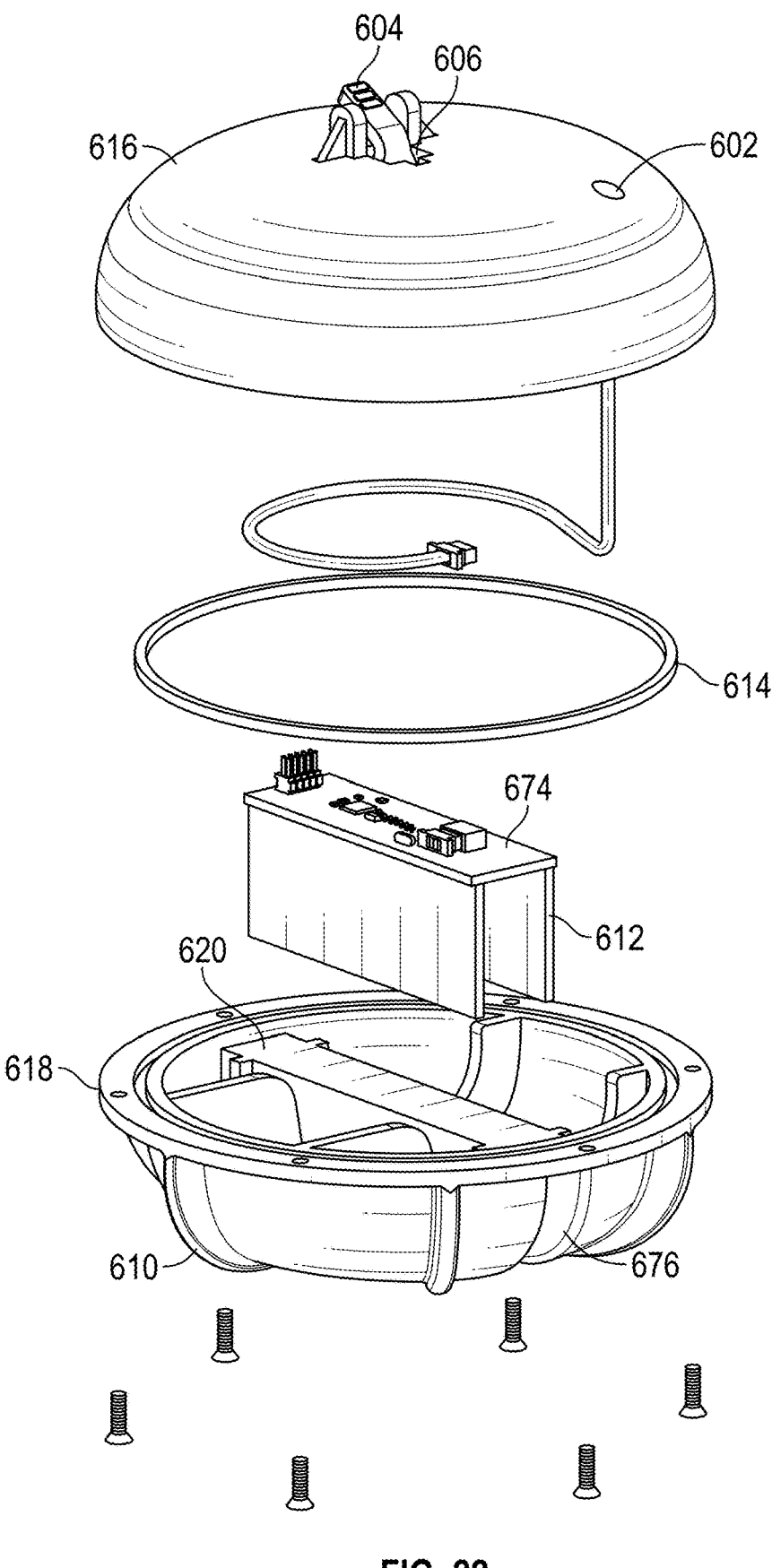
FIG. 22 illustrates an exploded view of an embodiment of a sensor assembly having a domed top surface.

Referring to FIGS. 21-22, the sensor assembly 600 may be formed from a top member 616 and a bottom member 618. An o-ring 614 (or another gasket, seal, or diaphragm configured to prevent ingress of moisture) may be disposed between the top member 616 and the bottom member 618. The sensor assembly 600 may include a sensor slot 620, for example, integral to the bottom member 618. The sensor slot 620 may be sized to accept the two capacitive plates 612. In one aspect, the sensor slot 620 is a receiving member disposed in the sensor assembly 600 that allows the sensor 612 (i.e., two capacitive plates) to remain in position around the channel 676, where the sensor 612 is shielded from direct contact with the fluid. In another aspect, the sensor slot 620 provides a passage through the bottom member 618 to an environment beneath the sensor assembly 600. Accordingly, the sensor slot 620 may enable the capacitive plates 612 to extend in a position where fluid directly beneath the sensor assembly 600 may trigger a flood signal in the fluid monitoring device 300. A cable aperture 602 may be disposed on the top member 616, where the cable aperture 602 forms a passage for the cable 308 from an environment (e.g., space between the sensor assembly 600 and the transmitter housing 302) to an internal cavity of the sensor assembly 600. In an embodiment, an anchor index 606 configured to index the linkage 304 within the sensor assembly 600 may be disposed atop the sensor assembly 600. Further, an anchor hook 604 may be positioned adjacent to or within the anchor index 606, where the anchor hook 604 may be configured to engage with the linkage 304.

The sensor slot 620 may form a channel 676, wherein the channel 676 may be an indentation or spacing disposed on the bottom of the sensor assembly 600. The capacitive plates 612 may be positioned to sit on interior walls of the channel 676, creating a defined space between the plates. During a flood event, water may enter the channel 676, positioning itself between the capacitive plates 612. The presence of water within the channel 676 may alter the dielectric properties of the medium between the plates, resulting in measurable changes in capacitance that may be detected by the sensor PCB 674.

In some embodiments, the walls of the channel 676 may be thinner than the walls of the sensor assembly 600. Such reduced wall thickness may promote improved accuracy and precision in capacitance readings by minimizing the distance between the water in the channel 676 and the capacitive plates 612, thereby enhancing the sensitivity of the capacitive measurement. The thinner walls may also reduce the dielectric interference that might otherwise be introduced by thicker structural elements.

The channel 676 configuration may allow capacitance measurements to be performed while maintaining separation between the internal components of the sensor assembly 600 and the external water environment. The capacitive plates 612 may be positioned such that they interface with the channel 676 without requiring direct exposure of the sensor PCB 674 or other internal electronics to the water. This arrangement may enable the fluid monitoring device 300 to detect flood events and trigger alarm conditions while preserving the integrity of the sealed internal cavity of the sensor assembly 600, thereby protecting sensitive electronic components from moisture damage or corrosion.

In some embodiments, each of the capacitive plates 612 may be composed of a plurality of individual plates or contacts, for example, four plates on each side, though any suitable number may be used depending on the desired resolution and accuracy requirements. By increasing the number of distinct plates or contacts on each side, measurement errors may be decreased because the processing components of the system may be able to determine that only one of the four plates on a given side was providing a certain capacitance reading, thereby enabling isolation and potential disregard of anomalous readings from individual plates. The utilization of a plurality of plates on each side may enable the system to ascertain additional information beyond simple flood detection, such as the rate at which the cleanout pipe is filling with water. Such a rate determination may be calculated based on the time intervals at which each vertically stacked plate registers a flood-level capacitance measurement, thereby providing temporal data that may indicate whether a blockage is developing rapidly or gradually.

In some embodiments, positioning the microprocessor 352 remotely from the capacitive plates 612 may introduce measurement challenges, as the cable 308 itself may contribute parasitic capacitance that interferes with accurate readings, particularly when the cable 308 extends six feet or more through the harsh sewer environment. The presence of the sensor PCB 674 within the sensor assembly 600 may address this issue by performing local capacitance measurements at the point of detection, thereby minimizing the impact of cable-induced electrical interference on measurement accuracy. In some aspects, either the microprocessor 352 disposed within the transmitter housing 302 or a microprocessor or other computerized element disposed within the sensor assembly 600 may interpret the capacitance reading from the capacitive plates 612. In some cases, the microprocessor 352 in the transmitter housing 302 may directly determine the capacitance reading from the sensor, or alternatively, the microprocessor 352 may receive an already-processed capacitance reading from the sensor assembly 600, wherein the sensor assembly 600 includes its own microprocessor or computerized element configured to determine the capacitance reading from the capacitive plates 612 and transmit the processed reading to the transmitter housing 302 via the cable 308.

Referring to FIGS. 21-22, the sensor assembly 600 may embody a domed or smooth top surface. In such an embodiment, the sensor assembly 600 may embody a ribbed bottom surface.

In an alternate embodiment, a series of ribs 610 may protrude from at least one of the top member 616 and the bottom member 618. The ribs 610 may protrude radially relative to the respective member and may be positioned equidistant from one another. The ribs 610 may provide improved rigidity to the sensor assembly 600.

Figure 23:
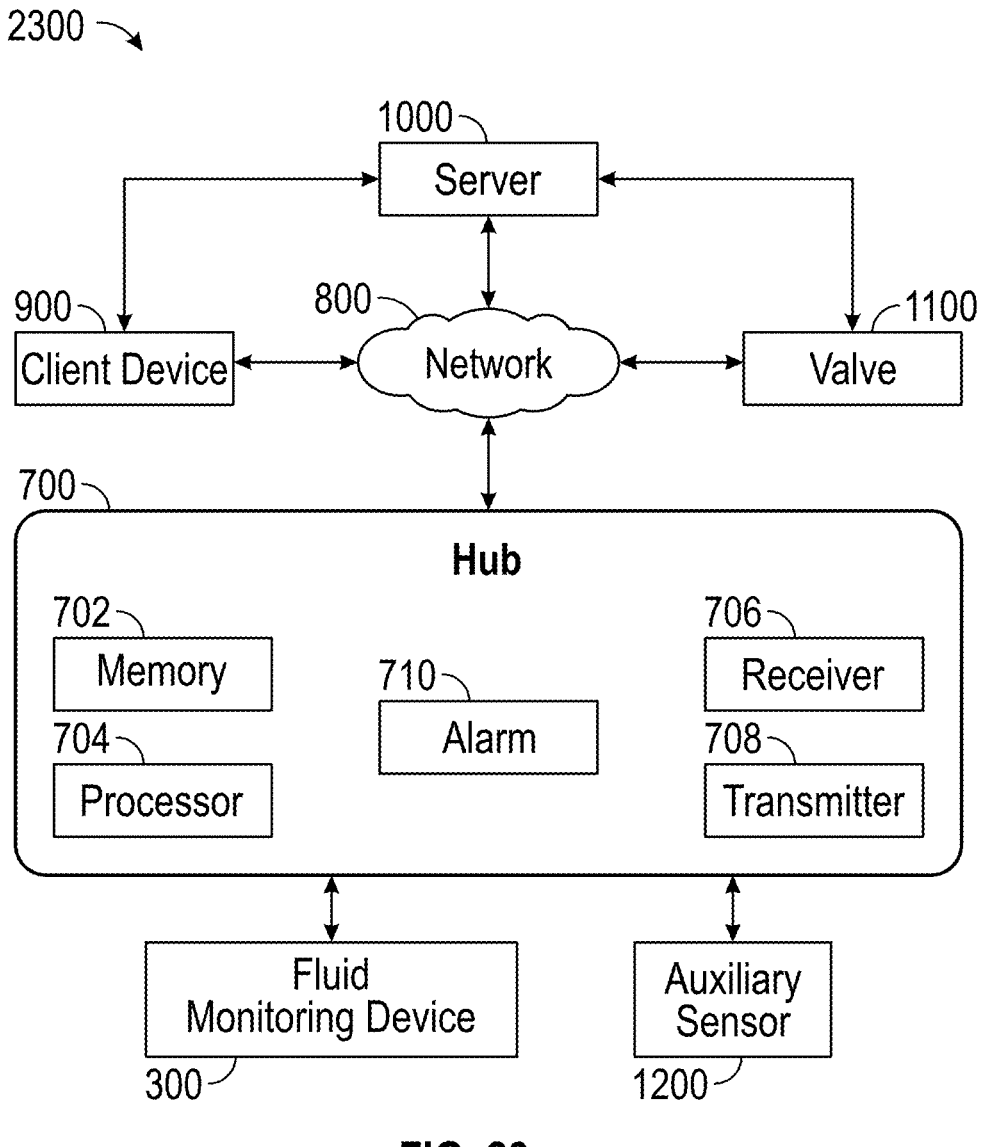
FIG. 23 illustrates an embodiment a fluid monitoring system.

FIG. 23 illustrates an embodiment of a fluid detection monitoring and alarming system 2300. The system 2300 may include a fluid detection monitoring device, such as device 300, a hub 700, a network 800, a client device 900, a sever 1000, and/or a valve 1100.

In one embodiment, the system 2300 includes a fluid detection monitoring device 300 configured to detect a predetermined condition (i.e., a presence of fluid) and generate a corresponding electronic signal upon actuation (e.g., a signal transmitted by the transmitter 354). The fluid detection monitoring device 300 may be in communication with a hub 700, wherein the hub 700 is at least configured to receive the signal from the fluid detection monitoring device 300 and process or relay the signal for further action. The hub 700 may be communicatively coupled to a network 800, which may include, but is not limited to, a Wi-Fi network, a cellular network, or any other suitable wireless or wired communication infrastructure capable of transmitting data between connected components.

The network 800 may be further configured to facilitate bidirectional communication between the hub 700, a client device 900, a server 1000, and/or a valve 1100. The client device 900, which may be embodied as a smart phone, personal computer, or other smart device, may be configured to receive notifications, status updates, or user prompts associated with the sensor event (e.g., detection of a flood or blockage), and may optionally allow for user input or commands. The server 1000 may be a server hosted by a municipality, a plumbing provider, a utility company, or a private entity (e.g., a smart home platform and the like) and may process data originating from the fluid detection monitoring device 300 or hub 700, store event logs, and coordinate control signals to peripheral components (e.g., the valve 1100). In response to the flood signal (either directly from the hub 700 or via server 1000 based communication), a control signal may be transmitted to valve 1100, thereby actuating the valve 1100 to close. Accordingly, in instances where a blockage or flood is detected, the valve 1100 may close off water in the home, preventing additional water from building up on top of the blockage.

In some embodiments, the system 2300 may include one or more auxiliary sensors 1200, wherein each auxiliary sensor 1200 may be in communication with the hub 700. The auxiliary sensors 1200 may be configured to detect various plumbing conditions or problems and transmit corresponding signals, such as flood signals or other status indicators, to the hub 700. Such auxiliary sensors 1200 may monitor different locations or aspects of a plumbing system, including but not limited to additional drain lines, water supply lines, or other points of potential failure. Accordingly, the system 2300 may function as a comprehensive monitoring suite comprising the fluid detection monitoring device 300 and any number of auxiliary sensors 1200, thereby providing distributed monitoring capabilities throughout a building's plumbing infrastructure.

The system 2300 may employ various network protocols to enable communication between components. In a first example protocol, the fluid monitoring device 300 may communicate with the hub 700, wherein the hub 700 may then communicate over the network 800 with each of the client device 900 and the server 1000. In such an embodiment, the hub 700 may act as an intermediary between the fluid monitoring device 300 and the server 1000 or client device 900. The fluid monitoring device 300 may communicate with the hub 700 via the network 800 or via an independent network connection established between the fluid monitoring device 300 and the hub 700. For example, the independent network connection may utilize the 915 MHz band, which may provide reliable communication in environments where traditional Wi-Fi signals may be attenuated, unavailable, or obstructed.

In a second example protocol, the fluid monitoring device 300 may communicate directly with the client device 900 or server 1000 via the network 800, thereby bypassing the hub 700. Such direct communication may reduce latency and simplify the system architecture in installations where the fluid monitoring device 300 has sufficient range and connectivity to reach the network 800 without requiring an intermediary device.

In a third protocol, the fluid monitoring device 300 may communicate with the hub 700, wherein the hub 700 may further communicate with the server 1000 via the network 800, at which point the server 1000 may be the operative entity that further communicates with the client device 900 or valve 1100. In such an embodiment, the server 1000 may serve as a central processing and distribution point, receiving data from the hub 700 and determining appropriate actions such as sending notifications to the client device 900 or transmitting control signals to the valve 1100. This protocol may enable more sophisticated data processing, logging, and decision-making capabilities that may not be available at the hub 700 level.

In the illustrated embodiment of FIG. 23, the server 1000 may be depicted as a single component for clarity of presentation. However, it may be understood that the network 800 may be in communication with a plurality of servers 1000, which in turn may be in communication with one another to facilitate various system functions. For example, the system 2300 may include a dedicated application server configured to run an application and its backend that executes on the client device 900, such as a smartphone application that provides user interface functionality and real-time monitoring capabilities. Additionally, the system 2300 may include a dedicated server hosted by a plumbing service company, wherein the plumbing service company may be notified of flood events or other relevant communications, enabling professional response and maintenance services. Furthermore, the system 2300 may incorporate one or more third-party servers, for example those related to other IoT devices integrated with the fluid monitoring device 300 ecosystem, such as smart home platforms, building management systems, or utility monitoring services. Such multi-server architecture may enable distributed processing, specialized functionality, and enhanced system capabilities through inter-server communication and data sharing protocols.

The hub 700 may include a memory 702, a processor 704, a receiver 706, a transmitter 708, and/or an alarm 710. The memory 702 may store configuration data, event logs, and operational parameters associated with the fluid monitoring device 300 and any auxiliary sensors 1200 within the system 2300. The processor 704 may execute instructions to interpret signals received from the fluid monitoring device 300, determine appropriate responses based on predefined rules or algorithms, and coordinate communication with other system components. The receiver 706 may be configured to receive wireless signals from the fluid monitoring device 300, such as flood signals or status updates, wherein the receiver 706 may support various communication protocols including the 915 MHz band, Wi-Fi, Bluetooth, or other suitable wireless standards. The transmitter 708 may be configured to relay information to the network 800, client device 900, server 1000, valve 1100, or other peripheral devices, wherein the transmitter 708 may format and transmit data packets containing alarm notifications, sensor readings, or control commands. The alarm 710 may provide local alerting functionality at the hub 700 location, enabling immediate notification of detected flood conditions without requiring network connectivity or external device availability.

The hub 700 may be positioned within a user's home or building in a location that facilitates reliable communication with both the fluid monitoring device 300 and the network 800. In some embodiments, the hub 700 may be placed in proximity to the home's Wi-Fi router or access point to ensure stable network connectivity for transmitting data to the client device 900 or server 1000. The hub 700 may be configured as an IoT device integrated within a user's smart home ecosystem, wherein the hub 700 may interface with existing home automation platforms, voice assistants, or building management systems. Such integration may enable the hub 700 to coordinate with other smart devices, for example by triggering additional alerts through connected speakers, adjusting lighting to indicate alarm conditions, or logging events within a centralized home monitoring application. The hub 700 may be mounted on a wall, placed on a shelf, or positioned in a utility area where it remains accessible for maintenance while maintaining adequate signal strength to communicate with the fluid monitoring device 300 installed in the sewer cleanout.

The hub 700 may include a cellular component enabling the hub 700 to communicate over cellular network protocols, thereby providing an alternative communication pathway when primary network connections are unavailable. In some embodiments, the Wi-Fi communication protocol may serve as the default communication method, while the cellular network protocol capability may automatically initiate during periods of downed electricity or Wi-Fi outages, ensuring continuous system operation and alert transmission even when local network infrastructure is compromised. The hub 700 may also include a backup battery operatively connected to the processor 704, receiver 706, transmitter 708, and other components, enabling the system 2300 to maintain functionality during periods of power outage and ensuring that flood detection and notification capabilities remain operational regardless of external power availability.

The components of the hub 700, including the memory 702, processor 704, receiver 706, and transmitter 708, may be implemented as distinct, separate components, wherein each component may be a dedicated hardware element performing its specified function independently of the other components. Alternatively, some or all of these components may be integrated into a single component, such as a microprocessor or system-on-chip (SoC) that incorporates memory, processing, receiving, and transmitting capabilities within a unified hardware package, thereby reducing the physical footprint and potentially simplifying the hub 700 architecture.

The alarm 710 may include light and/or sound outputs that initiate when a flood signal is detected by the fluid monitoring device 300. The light output may comprise one or more LEDs or other illumination sources that may emit visible indicators such as flashing patterns, color changes, or steady illumination to convey alarm status or severity levels. The sound output may comprise a speaker, buzzer, or other acoustic element capable of generating audible alerts such as beeps, tones, or voice messages to notify occupants of detected flood conditions. In some embodiments, the alarm 710 may be overridden or turned off via manual actuation of a button or other input device disposed on the hub 700. Such manual override functionality may allow users to silence the alarm 710 after acknowledging the flood condition, wherein the button may require a press-and-hold action, multiple presses, or other deliberate input to prevent accidental deactivation. The hub 700 may continue to maintain the alarm state in memory 702 and may continue transmitting notifications to the client device 900 or server 1000 even when the local alarm 710 has been manually silenced, thereby ensuring that the flood condition remains documented and communicated to relevant parties. The alarm 710 may also be discontinued via wireless command from a client device or other device in direct or indirect communication with the hub 700 via the system 2300.

In alternate embodiments, or in instances where signal strength may be a concern or where the hub 700 is positioned at a substantial distance from the fluid monitoring device 300, a hole or aperture may be disposed in the cap 114 to allow an antenna or other wireless communication element to extend above the cap 114. Such a communication element may be in communication with the microprocessor and/or the transmitter disposed within the transmitter housing via a wired connection extending through the cap. Such a configuration may provide for improved signal transmission capabilities in environments where blockages such as heavy snow accumulation, dense soil, or other obstructions may attenuate wireless signals emanating from beneath the cap 114. The elevated antenna positioning may also accommodate installations where the hub 700 and the fluid monitoring device 300 are necessarily separated by considerable distances, thereby maintaining reliable communication between system components.

Figure 24A:
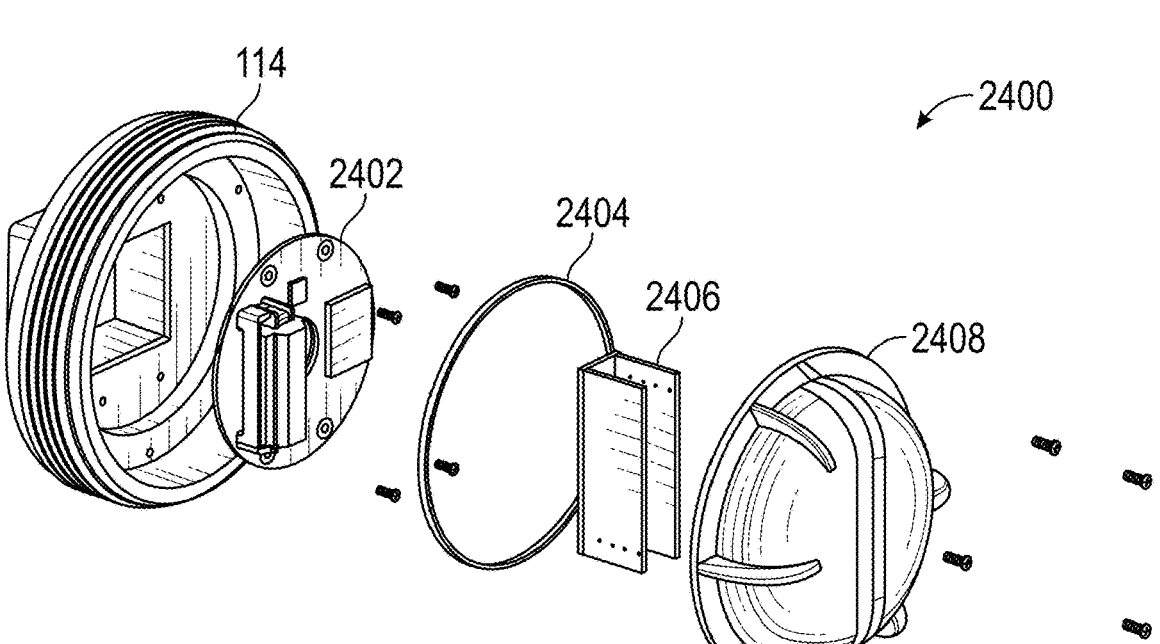
FIGS. 24A-24C illustrate an embodiment of a fluid monitoring device for use in a vertical or tee fitting embodiment.
Figure 24B:
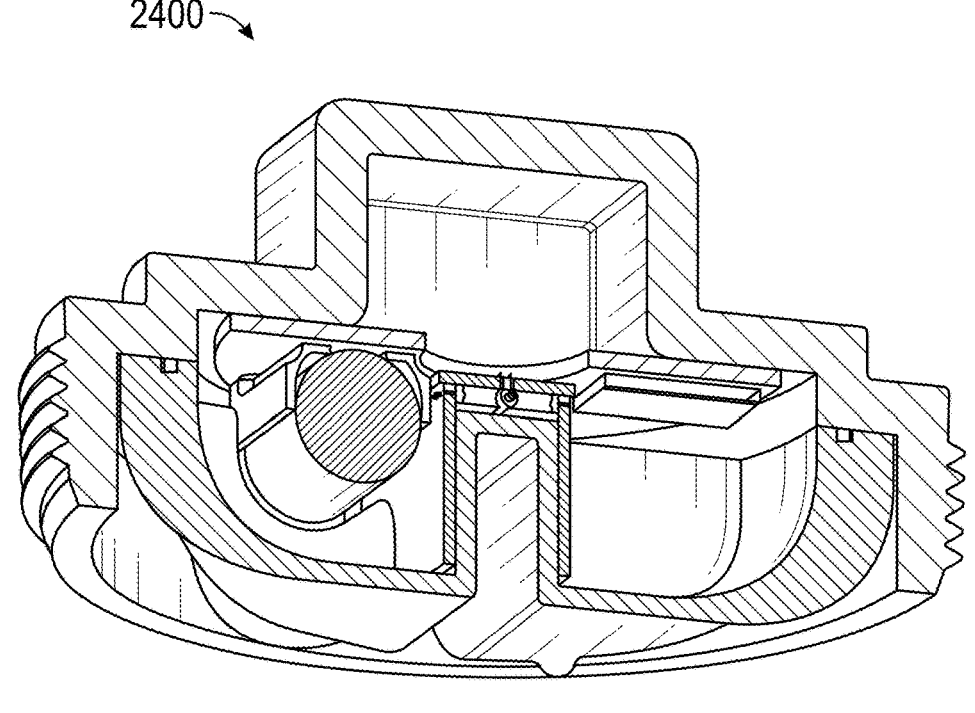
Figure 24C:
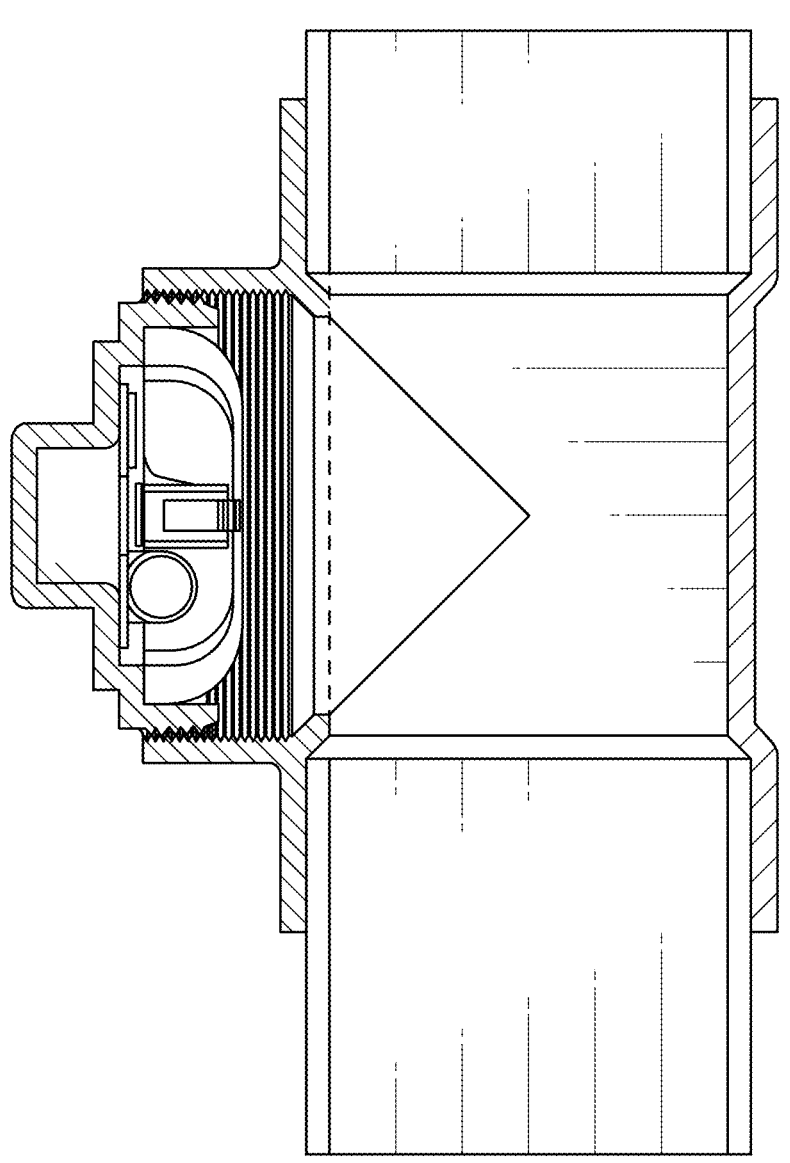

Referring to FIGS. 24A-24C, an embodiment of a vertical tee fluid monitoring device 2400 may be illustrated. FIG. 24A may show an exploded view of the vertical tee embodiment of the fluid monitoring device 2400, wherein the device 2400 may comprise the cap 114, a PCB 2402, a seal 2404, capacitive plates 2406, and an outer housing 2408. FIG. 24B may show a sectional cutaway view of the assembled device 2400, while FIG. 24C may illustrate the device 2400 disposed within a vertical tee segment of a vertical stack.

The vertical tee embodiment of the fluid monitoring device 2400 may enable the device 2400 to be utilized in vertical plumbing configurations, such as those commonly encountered in multi-story buildings where drain lines extend vertically through multiple floors. In such installations, the device 2400 may be positioned within a vertical tee fitting that provides access to the main vertical stack, thereby allowing the capacitive plates 2406 to monitor fluid levels within the vertical drainage system.

The outer housing 2408 may be configured to form a seal with an interior surface of the cap 114. Such sealing engagement may be achieved via the seal 2404, which may be positioned between the outer housing 2408 and the cap 114 to prevent fluid ingress into the cavity housing the PCB 2402. The seal 2404 may comprise an o-ring, gasket, or other elastomeric sealing element configured to maintain a water-tight barrier between the internal components and the external sewer environment.

The outer housing 2408 may include structural features similar to those of the bottom member 618 of the sensor assembly 600. For instance, the outer housing 2408 may incorporate a channel configured to receive and position the capacitive plates 2406. Such a channel may be formed as an indentation or spacing disposed on a surface of the outer housing 2408, wherein the capacitive plates 2406 may be positioned to sit on interior walls of the channel, thereby creating a defined space between the plates. During a flood event, water may enter the channel, positioning itself between the capacitive plates 2406 and altering the dielectric properties of the medium between the plates, which may result in measurable changes in capacitance.

In some embodiments, the walls of the channel in the outer housing 2408 may be thinner than other portions of the outer housing 2408. Such reduced wall thickness may promote improved accuracy and precision in capacitance readings by minimizing the distance between the water in the channel and the capacitive plates 2406, thereby enhancing the sensitivity of the capacitive measurement. The thinner walls may also reduce dielectric interference that might otherwise be introduced by thicker structural elements.

The PCB 2402 may be disposed between the cap 114 and the outer housing 2408, wherein the cavity therebetween may be isolated from any potential water exposure. Such positioning may protect the electronic components of the PCB 2402 from the harsh sewer environment while maintaining the functionality of the fluid monitoring device 2400. The seal 2404 may ensure that the cavity housing the PCB 2402 remains substantially dry and free from moisture ingress, thereby preserving the integrity and operational reliability of the electronic components.

The PCB 2402 may be largely similar to the PCB 338 described in connection with the transmitter housing 302. For instance, the PCB 2402 may comprise a battery, a microprocessor, a transmitter configured to wirelessly communicate with one or more peripheral devices, and a power cable connector. The battery may provide electrical power to the components of the PCB 2402, enabling autonomous operation of the fluid monitoring device 2400 without requiring external power connections. The microprocessor may be configured to interpret capacitance readings from the capacitive plates 2406, wherein the microprocessor may execute instructions to determine when a flood condition has been detected based on predefined threshold values or algorithms. The transmitter may be configured to wirelessly communicate with peripheral devices such as the hub 700, client device 900, or server 1000, thereby enabling the device 2400 to transmit flood signals or status updates when appropriate conditions are detected.

In the vertical tee embodiment, the capacitive plates 2406 may be positioned in close physical proximity to the PCB 2402, with only the outer housing 2408 and seal 2404 separating the plates 2406 from the PCB 2402. Such proximity may eliminate the need for a separate sensor PCB dedicated to local capacitance measurement, as may be required in embodiments where the capacitive plates and the transmitter housing are separated by several feet of cable. In the vertical tee configuration, the short distance between the capacitive plates 2406 and the PCB 2402 may allow the microprocessor on the PCB 2402 to directly measure capacitance without the electrical interference or parasitic capacitance effects that may be introduced by long cable runs. Accordingly, the vertical tee embodiment may simplify the overall system architecture by consolidating the sensing and processing functions within a single compact assembly.

The vertical tee fluid monitoring device 2400 may be installed by threading the cap 114 into a vertical tee fitting within a building's plumbing system. Once installed, the capacitive plates 2406 may be positioned to detect rising fluid levels within the vertical stack, wherein the device 2400 may transmit flood signals when water reaches a predetermined level. Such installation may be particularly beneficial in multi-story buildings where monitoring vertical drain lines at strategic locations may enable early detection of blockages or backups before they result in overflow conditions within occupied spaces.

According to an aspect of the present disclosure, a sewer cap monitoring system for a multi-story building may be provided. The sewer cap monitoring system may comprise a plurality of drain lines. The system may be further comprised of a plurality of cleanout access points positioned at regular intervals along the plurality of drain lines. The system may also include a plurality of water level sensors positioned at each of the plurality of cleanout access points, the plurality of water level sensors configured to detect a water level within each of the plurality of cleanout access points. The system may feature a plurality of transmitters communicatively coupled to each of the plurality of water level sensors, the plurality of transmitters configured to transmit a wireless signal when the plurality of water level sensors detect that the water level has reached a predetermined level.

According to other aspects of the present disclosure, each of the plurality of water level sensors may comprise at least one probe extending into a corresponding drain line of the plurality of drain lines. Moreover, the at least one probe may be configured in a telescoping arrangement allowing the at least one probe to be extended and retracted to adjust the predetermined level. Further, the at least one probe may be comprised of a pair of probes functioning as a conductivity sensor that creates a conductive path when the water level rises to contact each probe in the pair of probes. The system may further comprise a power source operatively connected to the plurality of water level sensors. The power source may comprise one or more rechargeable batteries and a solar panel operatively connected to the one or more rechargeable batteries. The plurality of water level sensors may be configured to detect both presence of water and rate of water level change to determine whether a blockage is acute or gradual.

According to another aspect of the present disclosure, a method of monitoring a sewer system in a multi-story building may be provided. The method may comprise positioning a plurality of water level sensors at a plurality of corresponding cleanout access points along a plurality of drain lines. The method may also detect, by the plurality of water level sensors, a water level within the plurality of drain lines. The method may be further comprised of transmitting, via a plurality of transmitters communicatively coupled with each of plurality of water level sensors, a wireless signal when the water level reaches a predetermined level. The method may also identify a location of a blockage in one or more of the plurality of drain lines based on which of the plurality of water level sensors detected the water level reaching the predetermined level.

According to other aspects of the present disclosure, the plurality of water level sensors may comprise at least one probe extending into the plurality of drain lines. The at least one probe may be configured in a telescoping arrangement allowing the at least one probe to be extended and retracted to adjust the predetermined level. The at least one probe may be comprised of a pair of probes functioning as a conductivity sensor that creates a conductive path when the water level rises to contact each probe in the pair of probes. The pair of probes may be configured in a telescoping arrangement allowing each of the probes to be extended and retracted to adjust the predetermined level. The method may further comprise employing differential monitoring to establish baseline flow patterns of the plurality of drain lines. The method may further comprise detecting both presence of water and rate of water level change to determine whether a blockage is acute or gradual. A rapidly rising water level may indicate an acute blockage nearby and gradually rising water levels across multiple sensors may indicate a more distant obstruction. The method may further comprise generating time-stamped data logging to analyze a sequence of activations of the plurality of water level sensors to trace progression of a backup.

According to another aspect of the present disclosure, a fluid monitoring device may be provided. The fluid monitoring device may comprise a transmitter housing attached to an underside of a cap, the transmitter housing configured to at least partially accept a cable, the transmitter housing comprising one or more alignment features disposed on a top surface of the transmitter housing, the one or more alignment features configured to index the transmitter housing to the cap. The fluid monitoring device may further comprise a printed circuit board (PCB) disposed within the transmitter housing, the PCB comprising a battery, a microprocessor, and a transmitter configured to wirelessly communicate with one or more peripheral devices. The fluid monitoring device may also comprise a linkage and a sensor assembly comprising a capacitive sensor, wherein the linkage tethers the sensor assembly to the transmitter housing, wherein the cable extends from the transmitter housing to the sensor assembly, wherein the microprocessor is configured to interpret a capacitance reading from the capacitive sensor, wherein, upon detecting the capacitance reading above a threshold capacitance reading, the microprocessor instructs the transmitter to transmit a flood signal.

According to other aspects of the present disclosure, the cap may be a sewer cleanout cap. The transmitter housing may further comprise a snap hook release. The transmitter housing may further comprise a stem extending through a vertical axis of the transmitter housing, the stem at least partially retaining the snap hook release. The transmitter housing may further comprise a cable clip, wherein the cable clip is configured to direct the cable beneath the transmitter housing. The transmitter housing may further comprise one or more finger nubs protruding from the transmitter housing, wherein rotation of the one or more finger nubs about a vertical axis of the transmitter housing causes the cable to retract or extend from the transmitter housing. The transmitter housing may be formed from a top body, a medial body, and a bottom body, wherein one or more retaining hooks are disposed on the medial body, wherein one or more retaining collars are disposed on the top body, the one or more retaining collars sized to reversibly engage with the one or more retaining hooks. The fluid monitoring device may further comprise one or more cable guides disposed on the medial body, the one or more cable guides configured to guide the cable from the medial body to the bottom body. The PCB may further comprise an internal seal disposed around a PCB aperture. The PCB may further comprise an external seal disposed around a perimeter of the PCB. The linkage may comprise a plurality of breakable units, each breakable unit comprising one or more latching features.

The snap hook release may be configured to capture the linkage, wherein the snap hook release interfaces with one of the one or more latching features via a latch on the snap hook. A PCB aperture disposed on the PCB may be sized to allow passage of the linkage. The sensor assembly may further comprise a plate receptacle, the plate receptacle housing the capacitive sensor. The sensor assembly may be formed from a top member and a bottom member, wherein an o-ring is disposed between the top member and the bottom member, the bottom member comprising a sensor slot sized to accept the capacitive sensor, a cable aperture disposed on the top member, the cable aperture forming passage for the cable from an environment to an internal cavity of the sensor assembly, an anchor index configured to index the linkage within the sensor assembly, and an anchor hook configured to engage with the linkage. The sensor assembly may further comprise ribs disposed on at least one of the top member and the bottom member, wherein the ribs protrude radially relative to said member.

According to another aspect of the present disclosure, a sewer monitoring system may be provided. The sewer monitoring system may comprise a sewer cap having an indentation and a water level sensor disposed within the indentation, the water level sensor including one or more probes extending from the indentation able to detect when a water level reaches a predetermined point. The sewer monitoring system may further comprise a transmitter communicatively coupled to the water level sensor able to transmit a signal to one or more user mobile devices indicating that the one or more probes have detected the water level has reached the predetermined point. The sewer monitoring system may also comprise one or more rechargeable batteries electrically connected to the water level sensor and one or more solar panels electrically connected to the one or more rechargeable batteries.

According to other aspects of the present disclosure, the one or more probes may be configured in a telescoping arrangement allowing the pair of probes to be extended and retracted to adjust the predetermined point. The sewer monitoring system may further comprise an inlet valve coupled to a receiver, wherein the receiver is able to receive the signal from the transmitter, wherein upon receipt of the signal, the inlet valve closes. The inlet valve may be a solenoid valve. The one or more probes may be comprised of a pair of probes that create a conductive path when the water level rises to the predetermined point. The sewer cap may reversibly couple to a sewer line clean-out.

According to another aspect of the present disclosure, a fluid detection monitoring and alarming system may be provided. The fluid detection monitoring and alarming system may comprise a fluid detection monitoring device comprising a transmitter housing attached to an underside of a cap, a printed circuit board disposed within the transmitter housing, the printed circuit board comprising a microprocessor and a transmitter configured to wirelessly communicate with one or more peripheral devices, a linkage, and a sensor assembly comprising a capacitive sensor, wherein the linkage tethers the sensor assembly to the transmitter housing, wherein the microprocessor is configured to interpret a capacitance reading from the capacitive sensor, wherein, upon detecting the capacitance reading above a threshold capacitance reading, the microprocessor instructs the transmitter to transmit a flood signal. The fluid detection monitoring and alarming system may further comprise a hub configured to receive the flood signal from the fluid detection monitoring device, a network communicatively coupled to the hub, and a client device communicatively coupled to the network, the client device configured to receive notifications associated with the flood signal from the fluid detection monitoring device.

According to other aspects of the present disclosure, the cap may be a sewer cleanout cap. The hub may comprise a processor configured to execute instructions to interpret signals received from the fluid detection monitoring device and determine appropriate responses, a receiver configured to receive wireless signals from the fluid detection monitoring device, a transmitter configured to relay information to the network, and an alarm configured to provide local alerting functionality. The hub may further comprise a cellular component enabling the hub to communicate over cellular network protocols, wherein a Wi-Fi communication protocol serves as a default communication method, wherein the cellular network protocol capability automatically initiates during periods of downed electricity or Wi-Fi outages, and wherein the hub further comprises a backup battery operatively connected to the processor, receiver, and transmitter, enabling the system to maintain functionality during periods of power outage and ensuring that flood detection and notification capabilities remain operational regardless of external power availability. The alarm may comprise light and sound outputs that initiate when the flood signal is detected by the fluid detection monitoring device, wherein the light output comprises one or more LEDs configured to emit visible indicators including flashing patterns, color changes, or steady illumination to convey alarm status or severity levels, wherein the sound output comprises a speaker or buzzer configured to generate audible alerts including beeps, tones, or voice messages to notify occupants of detected flood conditions, and wherein the alarm may be overridden or turned off via manual actuation of a button disposed on the hub, wherein the hub continues to maintain an alarm state in the memory and continues transmitting notifications to the client device even when the alarm has been manually silenced. The fluid detection monitoring and alarming system may further comprise a server communicatively coupled to the network, wherein the server is configured to receive data from the hub, process event logs, and coordinate control signals to peripheral components, wherein the server may be a server hosted by a municipality, a plumbing provider, a utility company, or a private entity, and wherein the system further comprises a valve communicatively coupled to the network, wherein, in response to the flood signal, a control signal is transmitted to the valve, thereby actuating the valve to close and preventing additional water from building up in a plumbing system.

It should be understood that although various types of water level sensors have been described herein, any suitable water level sensors may be incorporated into the sewer cap in order to determine the level of liquid flowing through the sewer line. Such water level sensors may include, but are not limited to pressure transducers, ultrasonic level sensors, float sensors, optical water level sensors, and the like.

Although the present disclosure has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A fluid monitoring device comprising:
a transmitter housing attached to an underside of a cap, the transmitter housing configured to at least partially accept a cable;
a printed circuit board (PCB) disposed within the transmitter housing, the PCB comprising a microprocessor and a transmitter configured to wirelessly communicate with one or more peripheral devices;
a linkage;
a sensor assembly comprising a capacitive sensor, wherein the linkage mechanically tethers the sensor assembly to the transmitter housing, wherein the cable extends from the transmitter housing to the sensor assembly, wherein, upon determination that a capacitance reading is above a threshold capacitance reading, the microprocessor instructs the transmitter to transmit a flood signal, the sensor assembly comprising a plate receptacle housing the capacitive sensor, wherein the plate receptacle forms a channel, the channel comprising an indentation disposed on a bottom of the sensor assembly, wherein the capacitive sensor comprises two capacitive plates positioned on interior walls of the channel, the channel configured to receive fluid during a flood event such that the fluid is positioned between the two capacitive plates.

2. The fluid monitoring device of claim 1, wherein the cap is a sewer cleanout cap.

3. The fluid monitoring device of claim 1, wherein the transmitter housing comprises one or more alignment features disposed on a top surface of the transmitter housing, the one or more alignment features configured to index the transmitter housing to the cap.

4. The fluid monitoring device of claim 3, the transmitter housing further comprising a snap hook release and a stem extending through a vertical axis of the transmitter housing, the stem at least partially retaining the snap hook release.

5. The fluid monitoring device of claim 1, the transmitter housing further comprising one or more finger nubs protruding from the transmitter housing, wherein rotation of the one or more finger nubs about a vertical axis of the transmitter housing causes the cable to retract or extend from the transmitter housing.

6. The fluid monitoring device of claim 1, wherein the transmitter housing is formed from a top body, a medial body, and a bottom body, wherein one or more retaining hooks are disposed on the medial body, wherein one or more retaining collars are disposed on the top body, the one or more retaining collars sized to reversibly engage with the one or more retaining hooks, and wherein one or more cable guides are disposed on the medial body, the one or more cable guides configured to guide the cable from the medial body to the bottom body.

7. The fluid monitoring device of claim 1, the transmitter housing further comprising an internal seal disposed around a PCB aperture and an external seal disposed around a perimeter of the PCB, wherein the PCB aperture disposed on the PCB is sized to allow passage of the linkage.

8. The fluid monitoring device of claim 4, wherein the linkage comprises a plurality of breakable units, each breakable unit comprising one or more latching features, and wherein the snap hook release is configured to capture the linkage, wherein the snap hook release interfaces with one of the one or more latching features via a latch on the snap hook release.

9. The fluid monitoring device of claim 1, wherein the linkage is an elongated member having a t-shaped cross-section with four distinct protruding sides extending along a vertical axis of the linkage, wherein the linkage is composed of a plurality of breakable units, each breakable unit bounded by at least one latching feature, wherein the latching feature comprises a series of indents disposed at a same vertical position in each of the four protruding sides such that a cross-sectional area of the linkage decreases at the latching feature.

10. The fluid monitoring device of claim 1, wherein the sensor assembly includes a sensor assembly microprocessor in informatic communication with the capacitive sensor, wherein the sensor assembly microprocessor is configured to interpret the capacitance reading from the capacitive sensor, and wherein the sensor assembly microprocessor is configured to transmit the capacitance reading to the microprocessor on the PCB of the transmitter housing.

11. A fluid detection monitoring and alarming system comprising:
a fluid detection monitoring device comprising a transmitter housing attached to an underside of a cap, the transmitter housing further comprising an internal seal disposed around a printed circuit board (PCB) aperture and an external seal disposed around a perimeter of a printed circuit board, the PCB disposed within the transmitter housing, the PCB comprising a microprocessor and a transmitter configured to wirelessly communicate with one or more peripheral devices, a linkage, and a sensor assembly comprising a capacitive sensor, wherein the linkage tethers the sensor assembly to the transmitter housing, wherein the PCB aperture disposed on the PCB is sized to allow passage of the linkage, wherein, upon determination that a capacitance reading is above a threshold capacitance reading, the microprocessor instructs the transmitter to transmit a flood signal;
a hub configured to receive the flood signal from the fluid detection monitoring device;
a client device communicatively coupled to the hub via a network, the client device configured to receive notifications associated with the flood signal from the fluid detection monitoring device.

12. The fluid detection monitoring and alarming system of claim 11, wherein the cap is a sewer cleanout cap.

13. The fluid detection monitoring and alarming system of claim 11, the hub comprising an alarm configured to provide local alerting functionality in accordance with the flood signal, wherein the alarm comprises sound outputs that initiate when the flood signal is detected by the fluid detection monitoring device.

14. The fluid detection monitoring and alarming system of claim 11, wherein the hub comprises a processor configured to execute instructions to interpret signals received from the fluid detection monitoring device and determine appropriate responses, a receiver configured to receive wireless signals from the fluid detection monitoring device, and a transmitter configured to relay information to the network.

15. The fluid detection monitoring and alarming system of claim 14, wherein the hub further comprises a cellular component enabling the hub to communicate over cellular network protocols, wherein a Wi-Fi communication protocol serves as a default communication method.

16. The fluid detection monitoring and alarming system of claim 15, wherein the cellular network protocol capability automatically initiates during periods of downed electricity or Wi-Fi outages, and wherein the hub further comprises a backup battery operatively connected to the processor, receiver, and transmitter, enabling the system to maintain functionality during periods of power outage.

17. The fluid detection monitoring and alarming system of claim 11, further comprising a server communicatively coupled to the network, wherein the server is configured to receive data from the hub, wherein the server is a server hosted by one of a municipality, a plumbing provider, or a utility company.

18. The fluid detection monitoring and alarming system of claim 11, wherein the system further comprises a valve communicatively coupled to the hub, wherein, in response to the flood signal, a control signal is transmitted to the valve, thereby actuating the valve to close.

19. A fluid monitoring device comprising:

a transmitter housing attached to an underside of a cap, the transmitter housing configured to at least partially accept a cable, the transmitter housing comprising one or more alignment features disposed on a top surface of the transmitter housing, the one or more alignment features configured to index the transmitter housing to the cap, transmitter housing comprising a snap hook release and a stem extending through a vertical axis of the transmitter housing, the stem at least partially retaining the snap hook release;

a printed circuit board (PCB) disposed within the transmitter housing, the PCB comprising a microprocessor and a transmitter configured to wirelessly communicate with one or more peripheral devices;

a linkage, wherein the linkage comprises a plurality of breakable units, each breakable unit comprising one or more latching features, and wherein the snap hook release is configured to capture the linkage, wherein the snap hook release interfaces with one of the one or more latching features via a latch on the snap hook release;

a sensor assembly comprising a capacitive sensor, wherein the linkage mechanically tethers the sensor assembly to the transmitter housing, wherein the cable extends from the transmitter housing to the sensor assembly, wherein, upon determination that a capacitance reading is above a threshold capacitance reading, the microprocessor instructs the transmitter to transmit a flood signal.

20. The fluid monitoring device of claim 19, the sensor assembly formed from a top member and a bottom member, wherein an o-ring is disposed between the top member and the bottom member, the bottom member comprising a sensor slot sized to accept the capacitive sensor, a cable aperture disposed on the top member, the cable aperture forming passage for the cable from an environment to an internal cavity of the sensor assembly, an anchor index configured to index the linkage within the sensor assembly, and an anchor hook configured to engage with the linkage.

\* \* \* \* \*